(12) United States Patent
Girondi

(10) Patent No.: US 12,472,454 B2
(45) Date of Patent: Nov. 18, 2025

(54) AIR FILTRATION ASSEMBLY

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 470 days.

(21) Appl. No.: 17/924,286

(22) PCT Filed: May 6, 2021

(86) PCT No.: PCT/IB2021/053846
§ 371 (c)(1),
(2) Date: Nov. 9, 2022

(87) PCT Pub. No.: WO2021/229379
PCT Pub. Date: Nov. 18, 2021

(65) Prior Publication Data
US 2023/0226480 A1    Jul. 20, 2023

(30) Foreign Application Priority Data

May 11, 2020   (IT) .......................... 102020000010546

(51) Int. Cl.
*B01D 46/24*    (2006.01)
*B01D 46/00*    (2022.01)
*B01D 46/58*    (2022.01)

(52) U.S. Cl.
CPC ..... *B01D 46/2414* (2013.01); *B01D 46/0009* (2013.01); *B01D 46/0047* (2013.01);
(Continued)

(58) Field of Classification Search
CPC .......................... B01D 46/2414; B01D 46/58; B01D 46/0009; B01D 46/0047; B01D 2271/02;
(Continued)

(56) References Cited

U.S. PATENT DOCUMENTS

2016/0222928 A1* 8/2016 Girondi ............ F02M 35/02441

FOREIGN PATENT DOCUMENTS

| DE | 100 32 384 A1 | 1/2002 |
| EP | 0 522 245 A1 | 1/1993 |
| WO | 2013/117988 A1 | 8/2013 |

OTHER PUBLICATIONS

International Search Report and Written Opinion of the International Searching Authority for International Patent Application No. PCT/IB2021/053846 mailed Jun. 17, 2021, 12 pages.
(Continued)

*Primary Examiner* — Jennifer Dieterle
*Assistant Examiner* — Qianping He
(74) *Attorney, Agent, or Firm* — Merchant & Gould P.C.

(57) ABSTRACT

A vehicle air filtration assembly includes a box having a longitudinal axis and a wall extending along first and second axes. A filter cartridge includes tubular filter media operatively connected to a plate group. The plate group has a first face with a sealing profile and a second face having at least two contact profiles. The filter cartridge is insertable into the box along an insertion direction substantially parallel to the first or second axis. The box includes a housing region between the wall and contact elements longitudinally spaced from the wall and axially spaced from each other. The plate group is housed in the housing region with the a sealing profile engaged with the wall and the contact profiles engaged to the contact elements. The sealing profile or contact profiles are shaped/positioned at variable vertical distances relative to an imaginary extension plane.

22 Claims, 42 Drawing Sheets

(52) U.S. Cl.
CPC .......... *B01D 46/58* (2022.01); *B01D 2271/02* (2013.01); *B01D 2279/60* (2013.01)

(58) Field of Classification Search
CPC ............ B01D 2279/60; B01D 46/2411; B01D 2265/025; B01D 2265/026; B01D 46/0005; F02M 35/02416; F02M 35/0201; F02M 35/0215; F02M 35/10144; F01N 3/0217
USPC .......................... 55/414, DIG. 31, 350.1, 355
See application file for complete search history.

(56) References Cited

OTHER PUBLICATIONS

Italian Search Report for Italian Patent Application No. 102020000010546 mailed Sep. 15, 2020, 2 pages.

\* cited by examiner

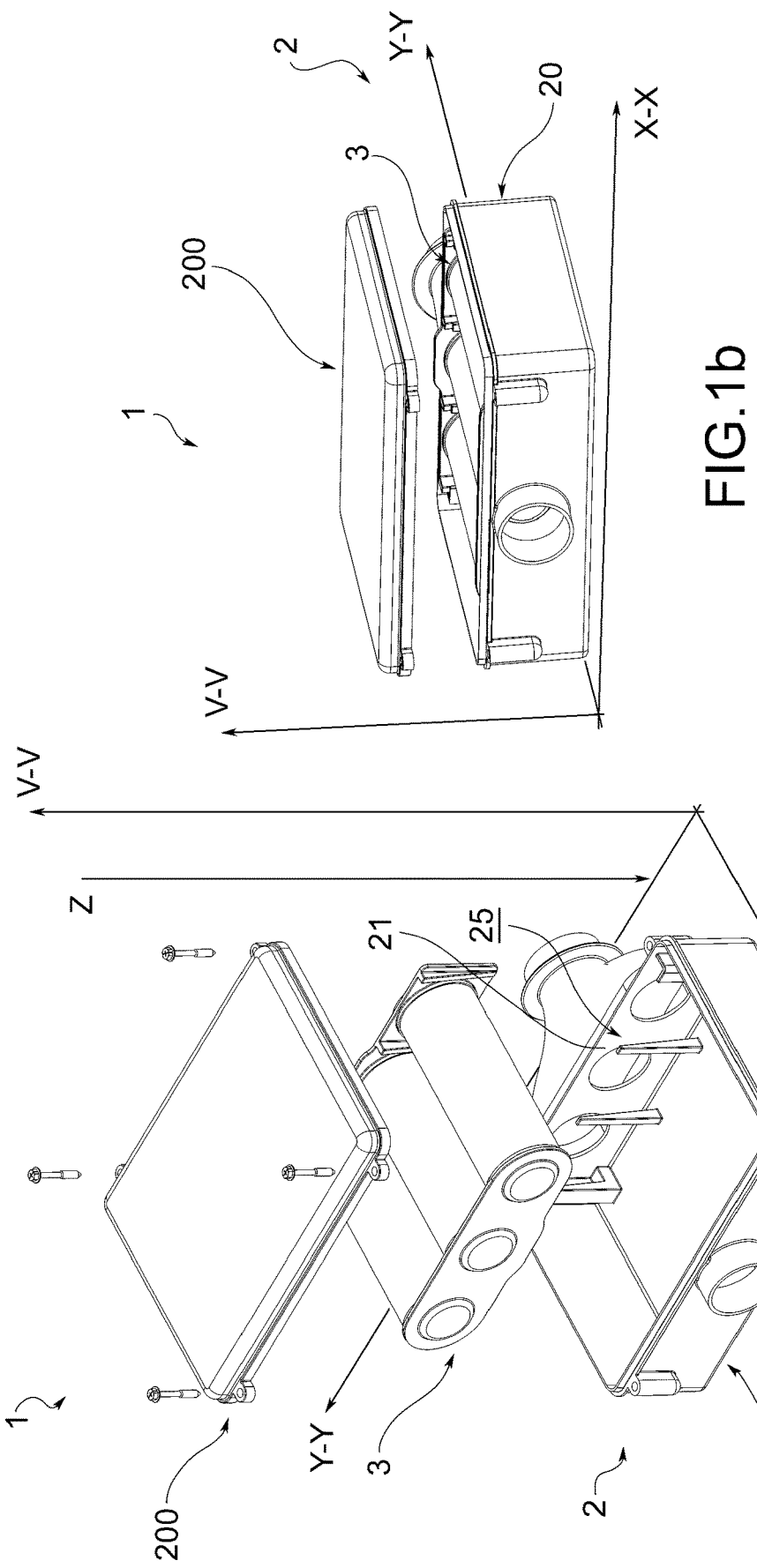

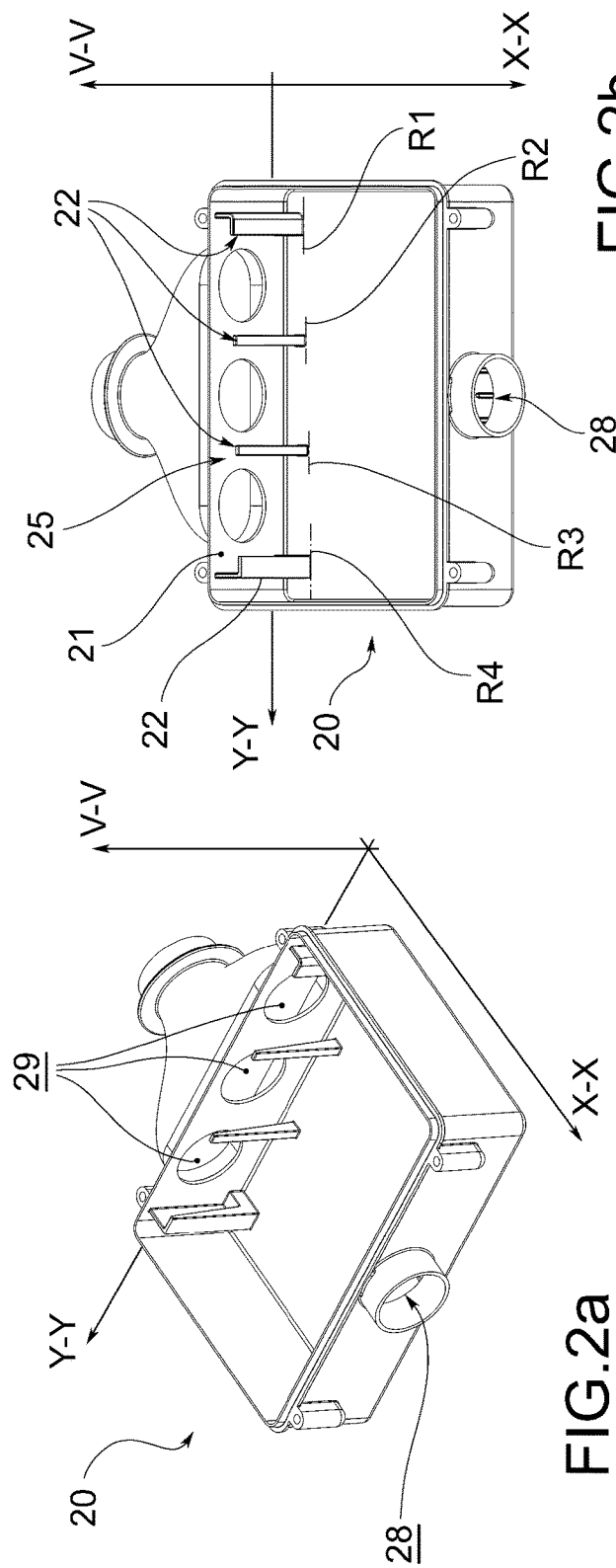
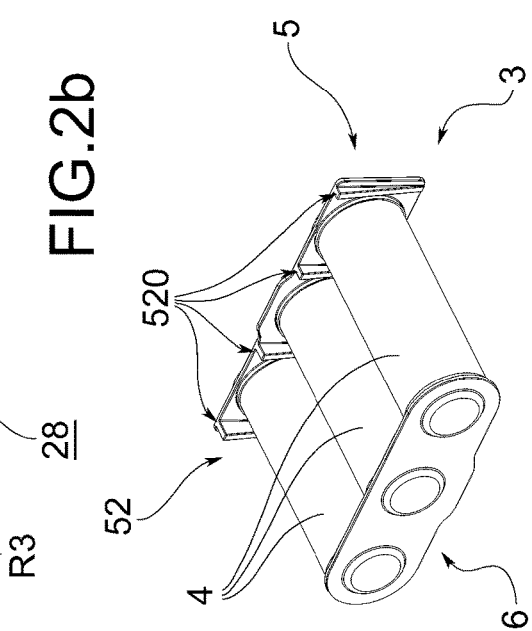
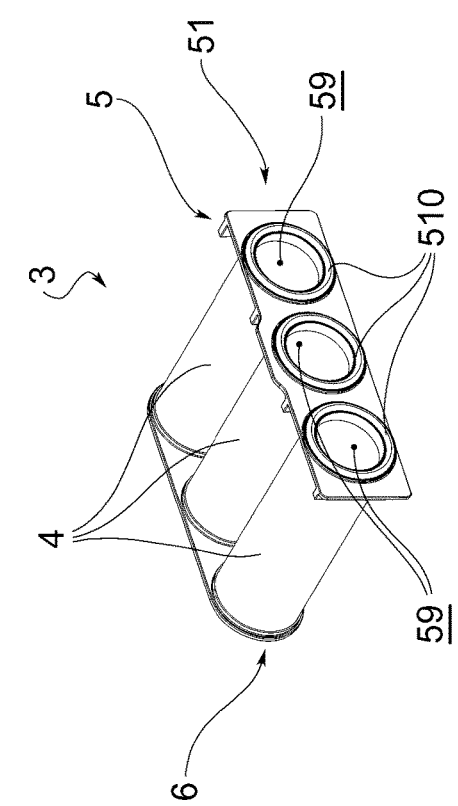
FIG.2a FIG.2b FIG.3a FIG.3b

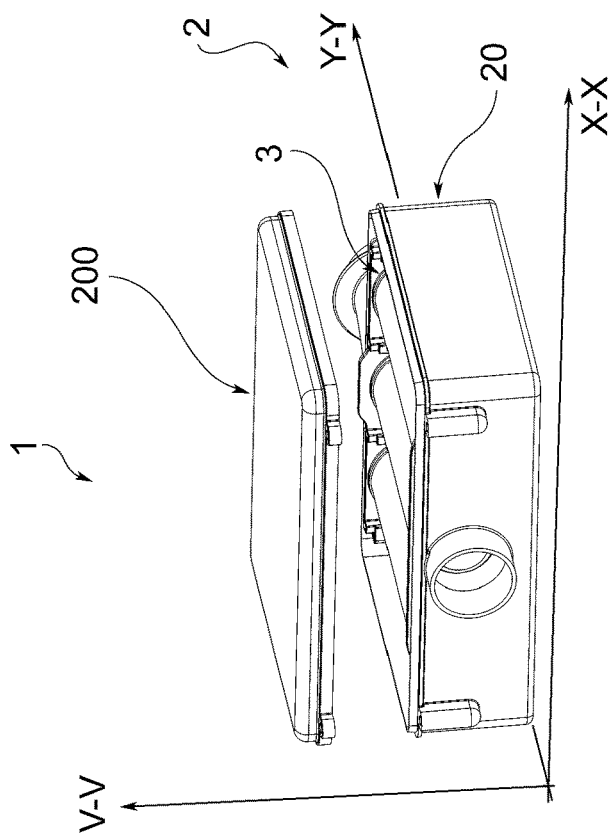
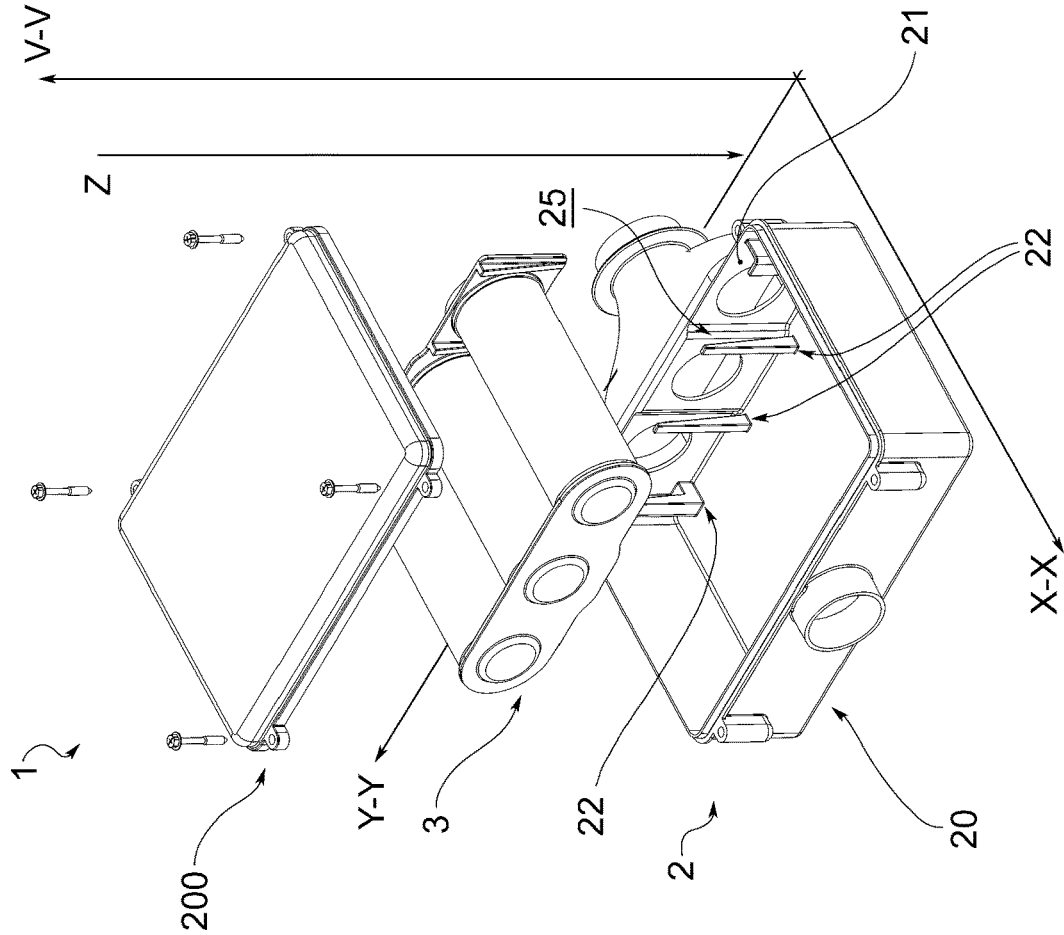

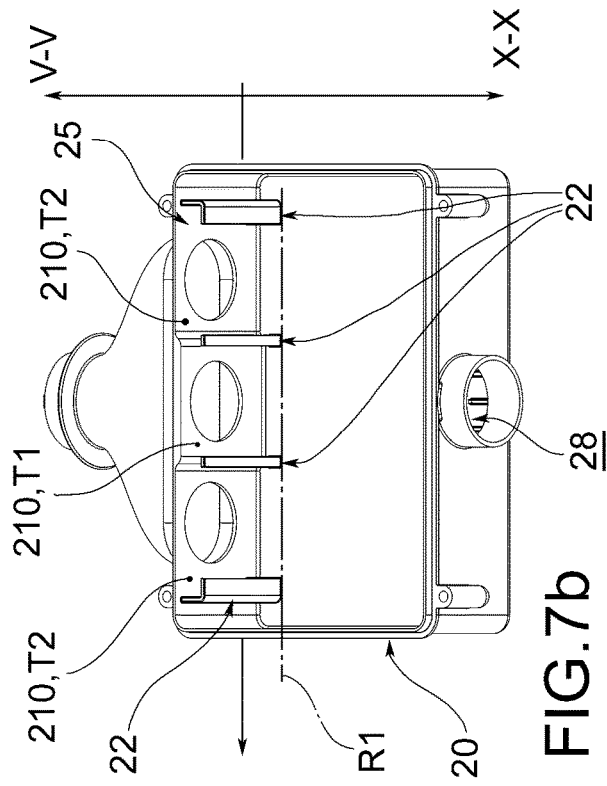
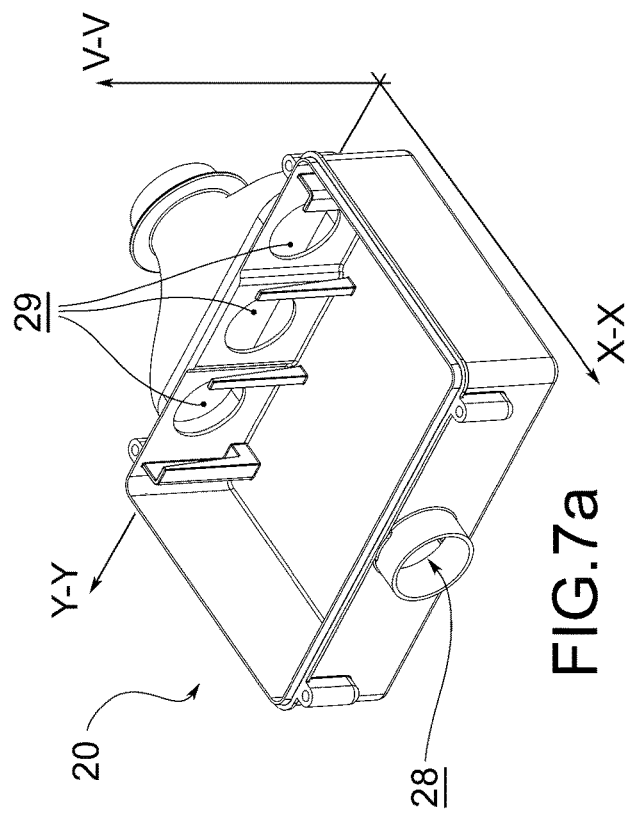
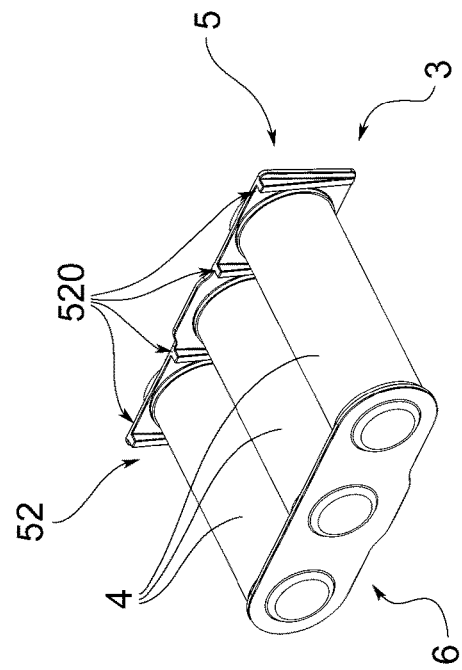
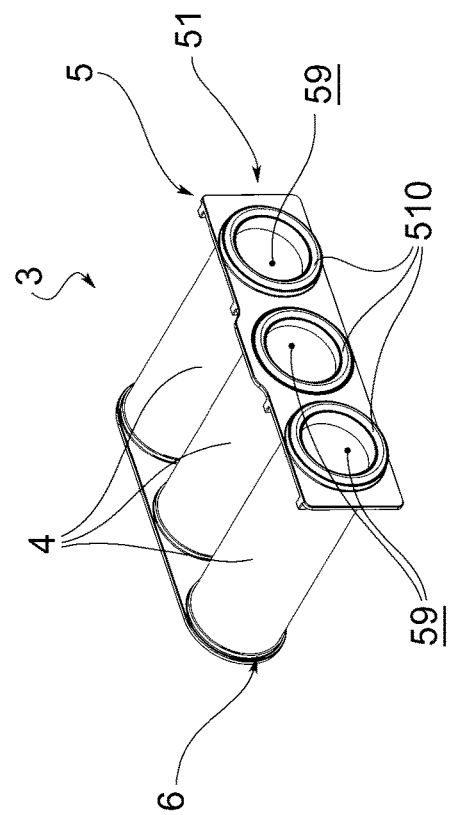

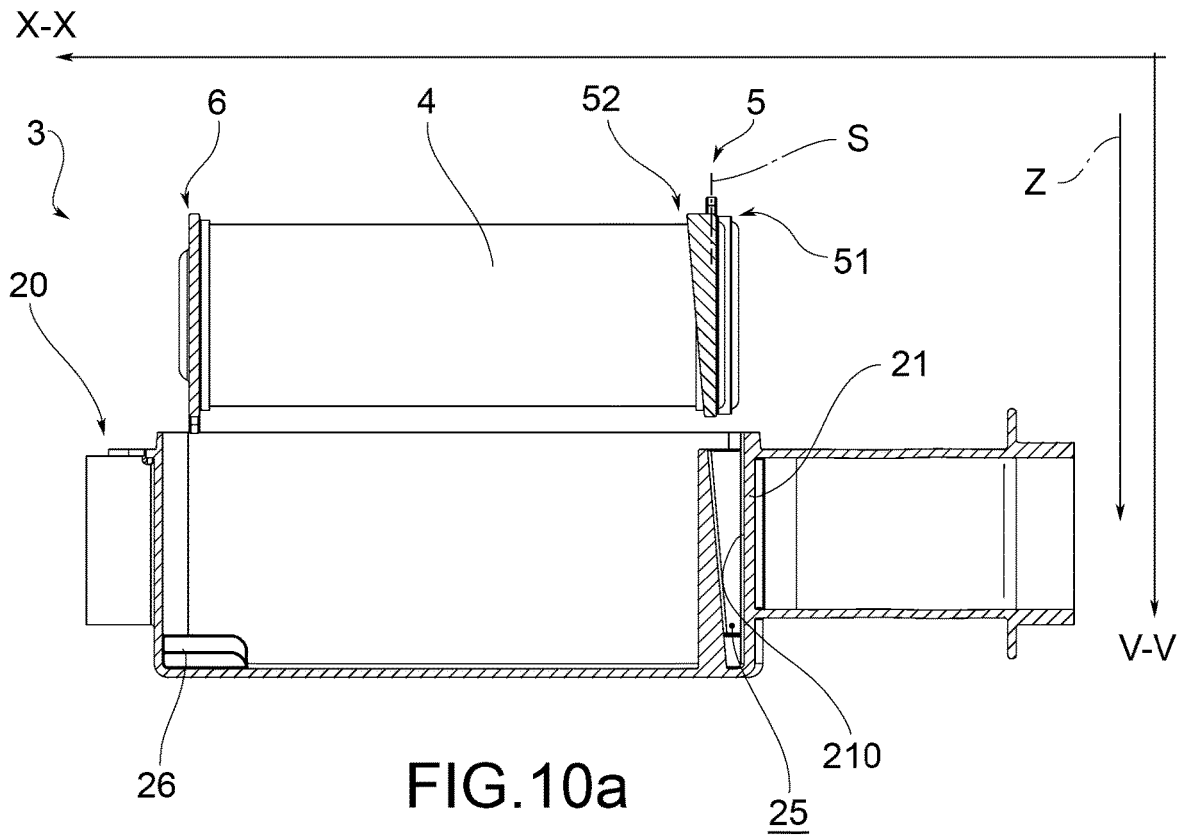
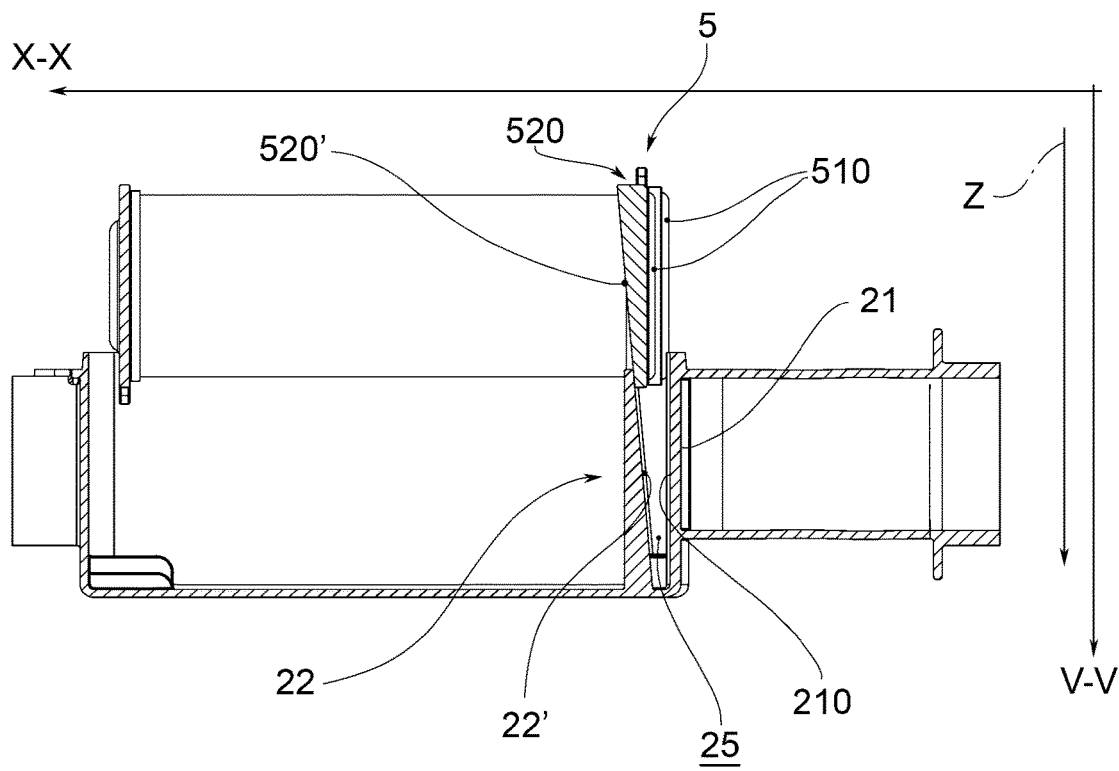

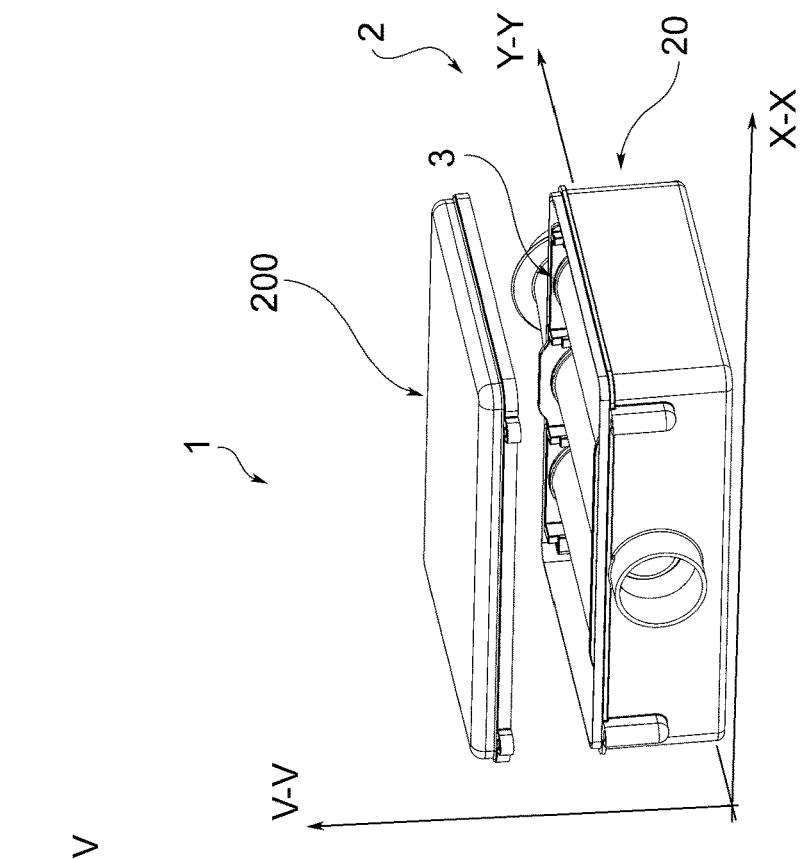
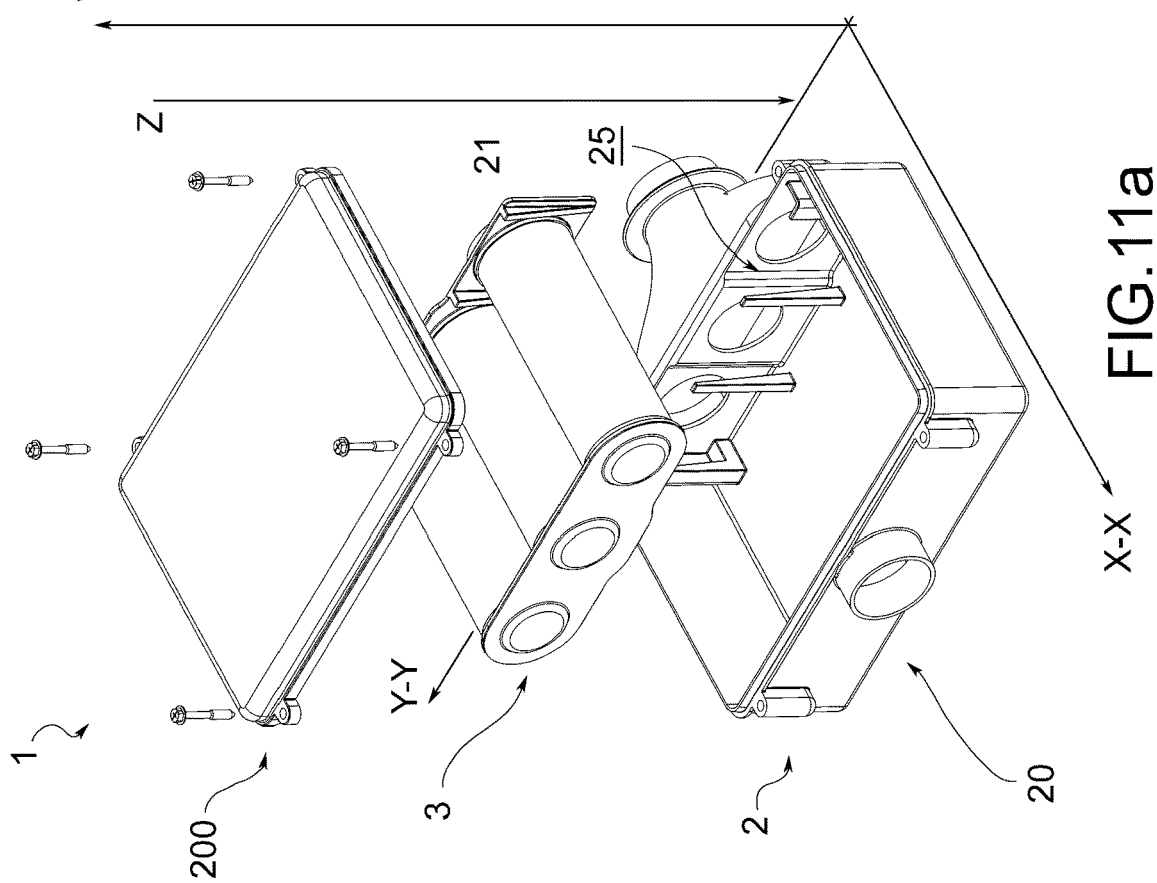
FIG.11b
FIG.11a

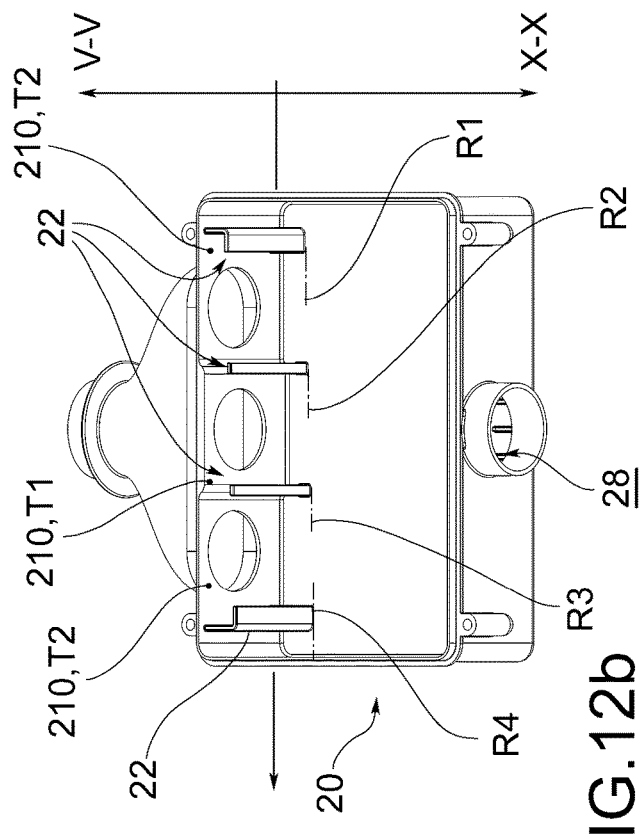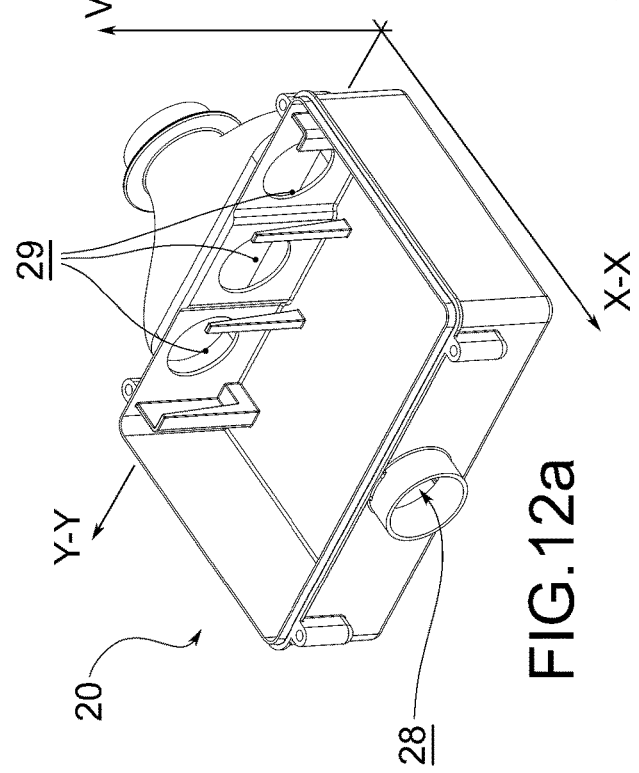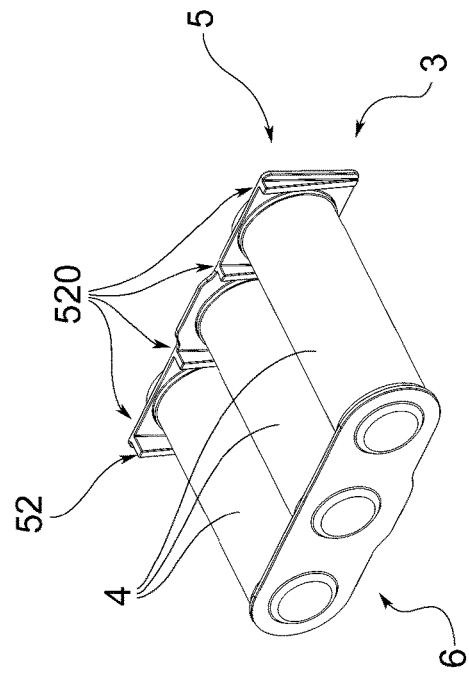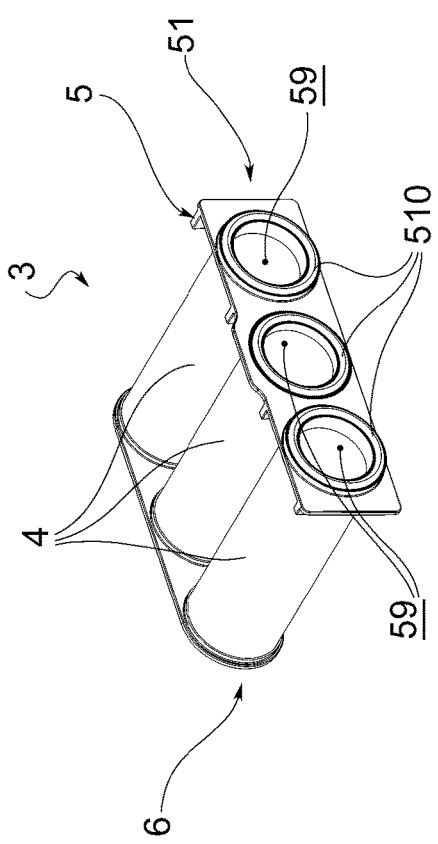

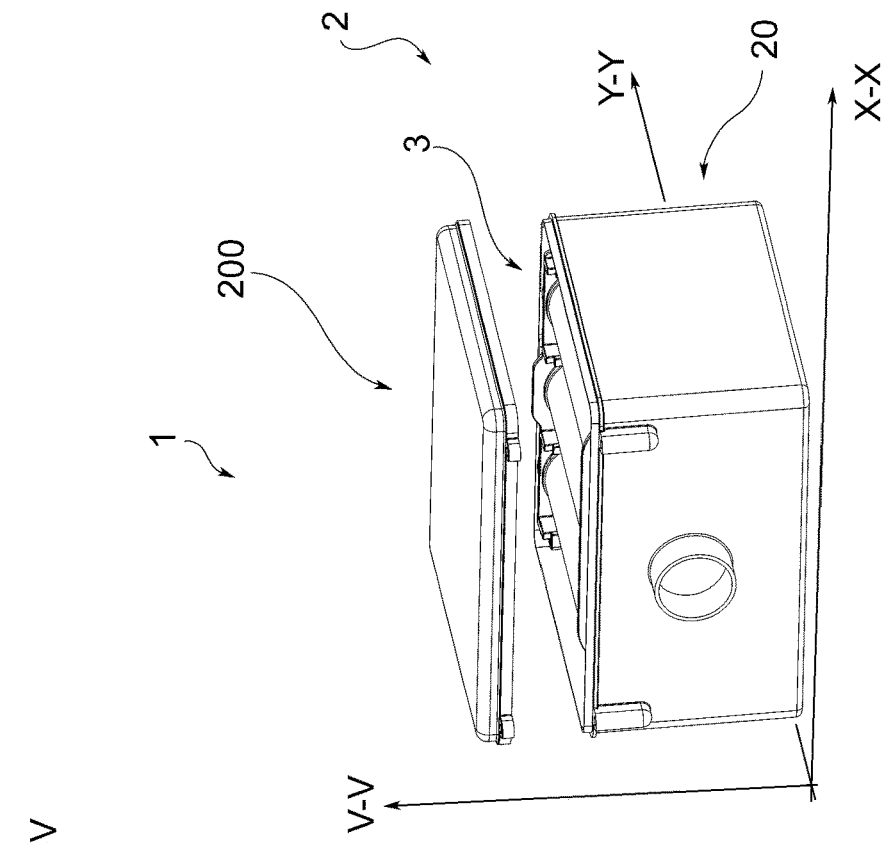
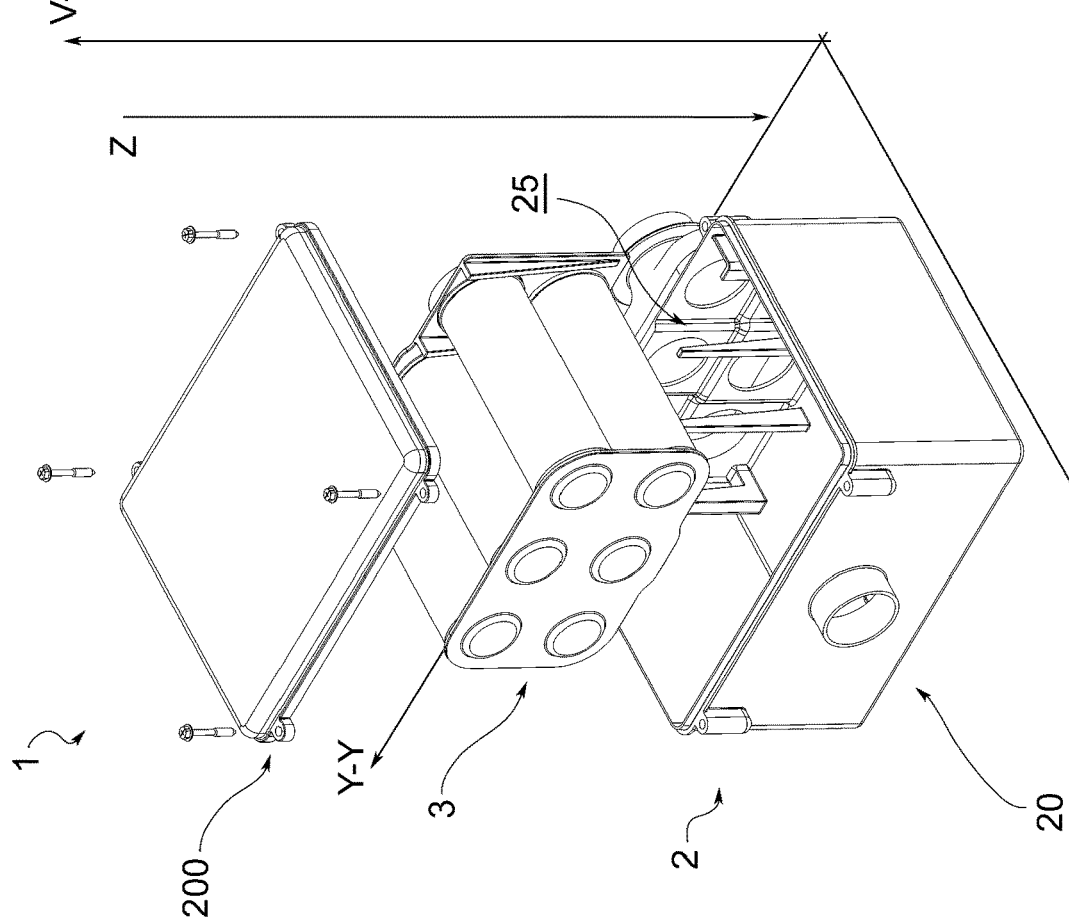

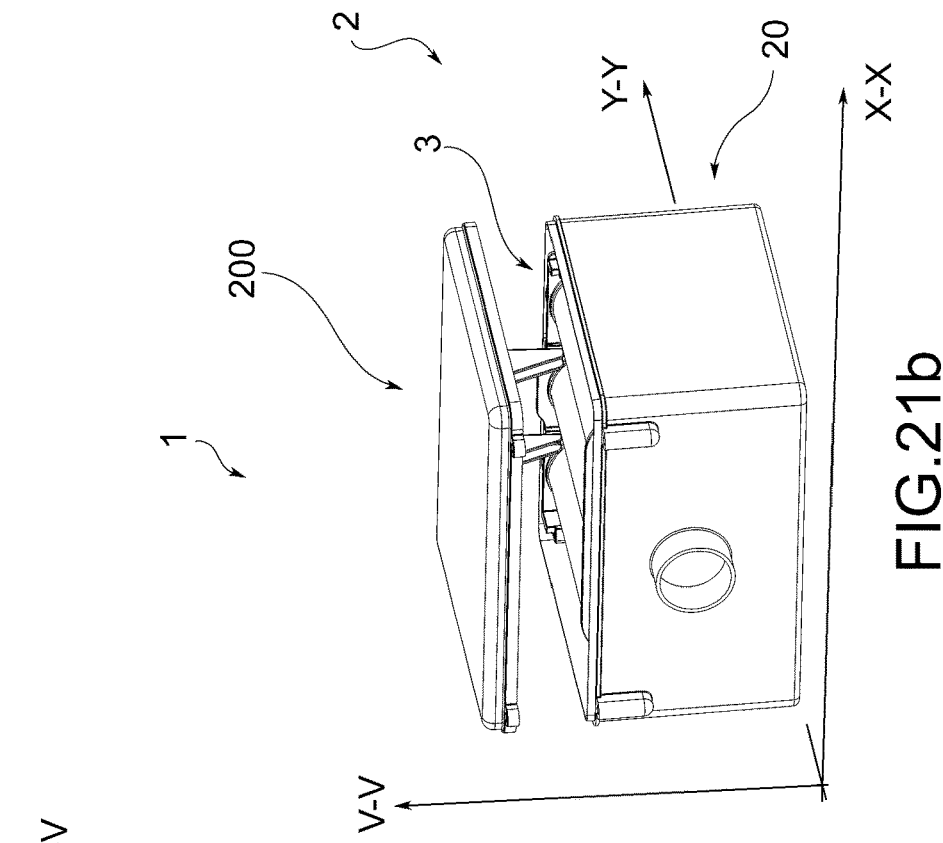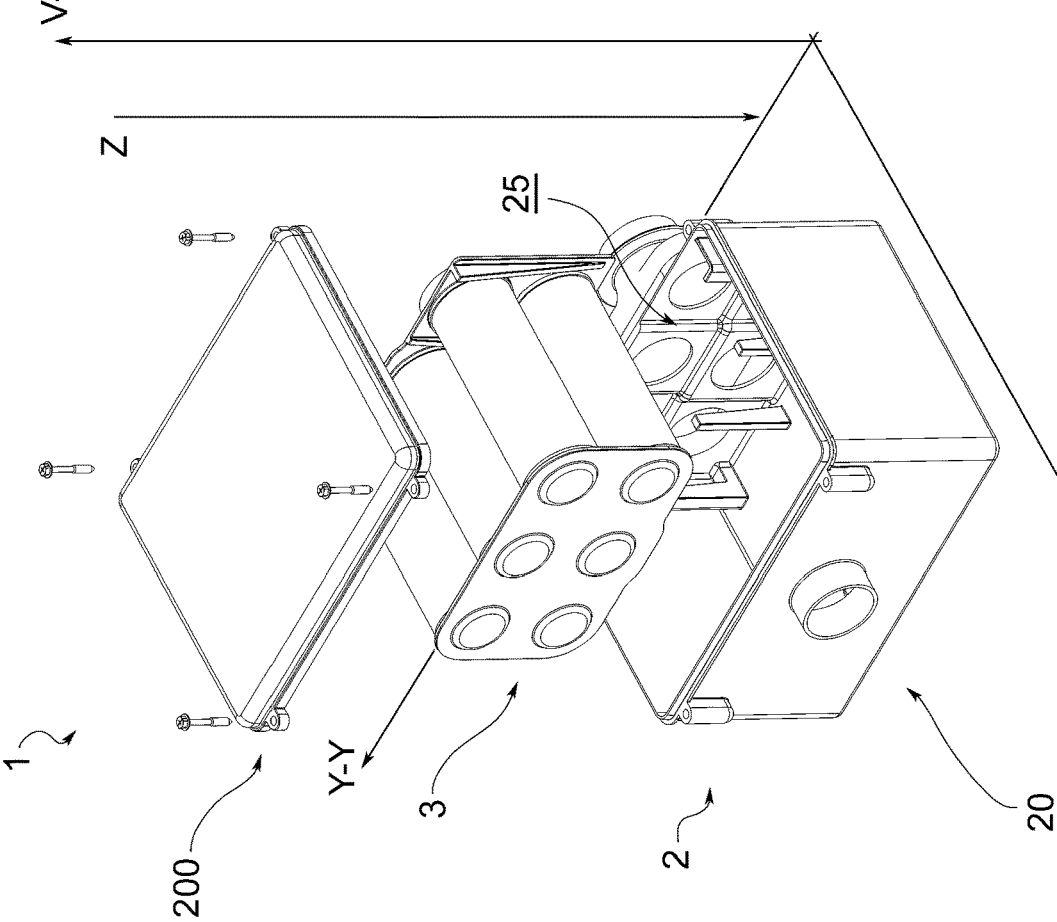

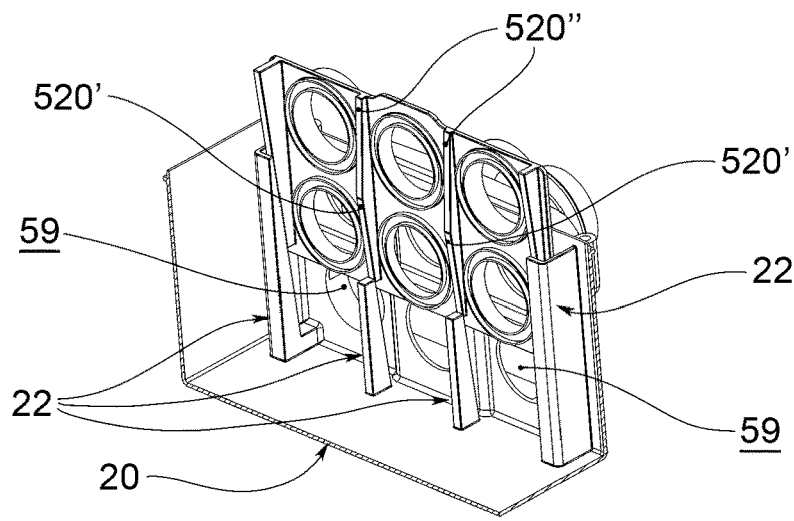
FIG.25'
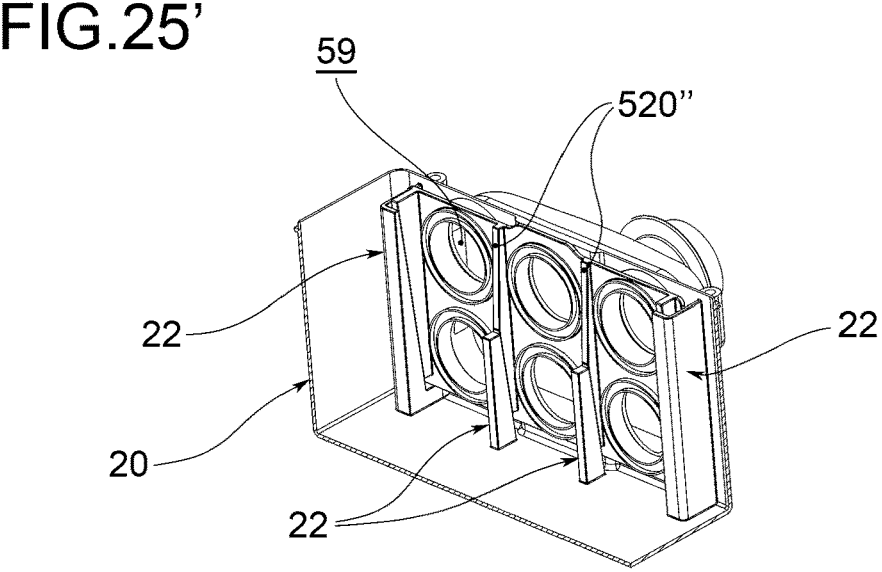
FIG.25"
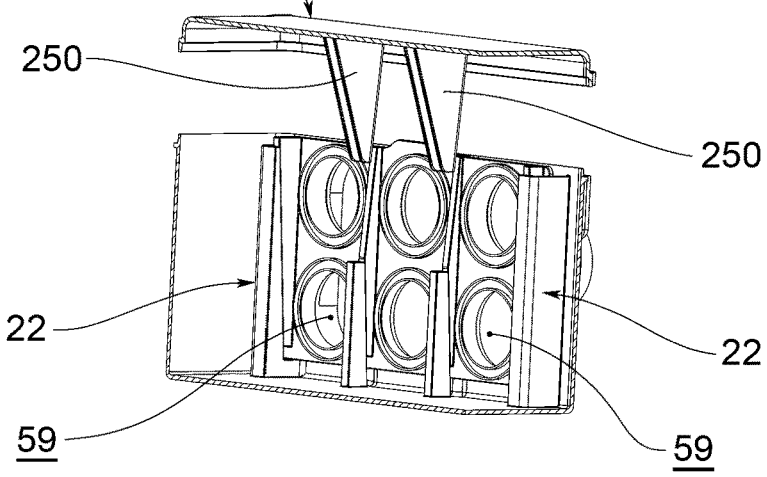
FIG.25'''

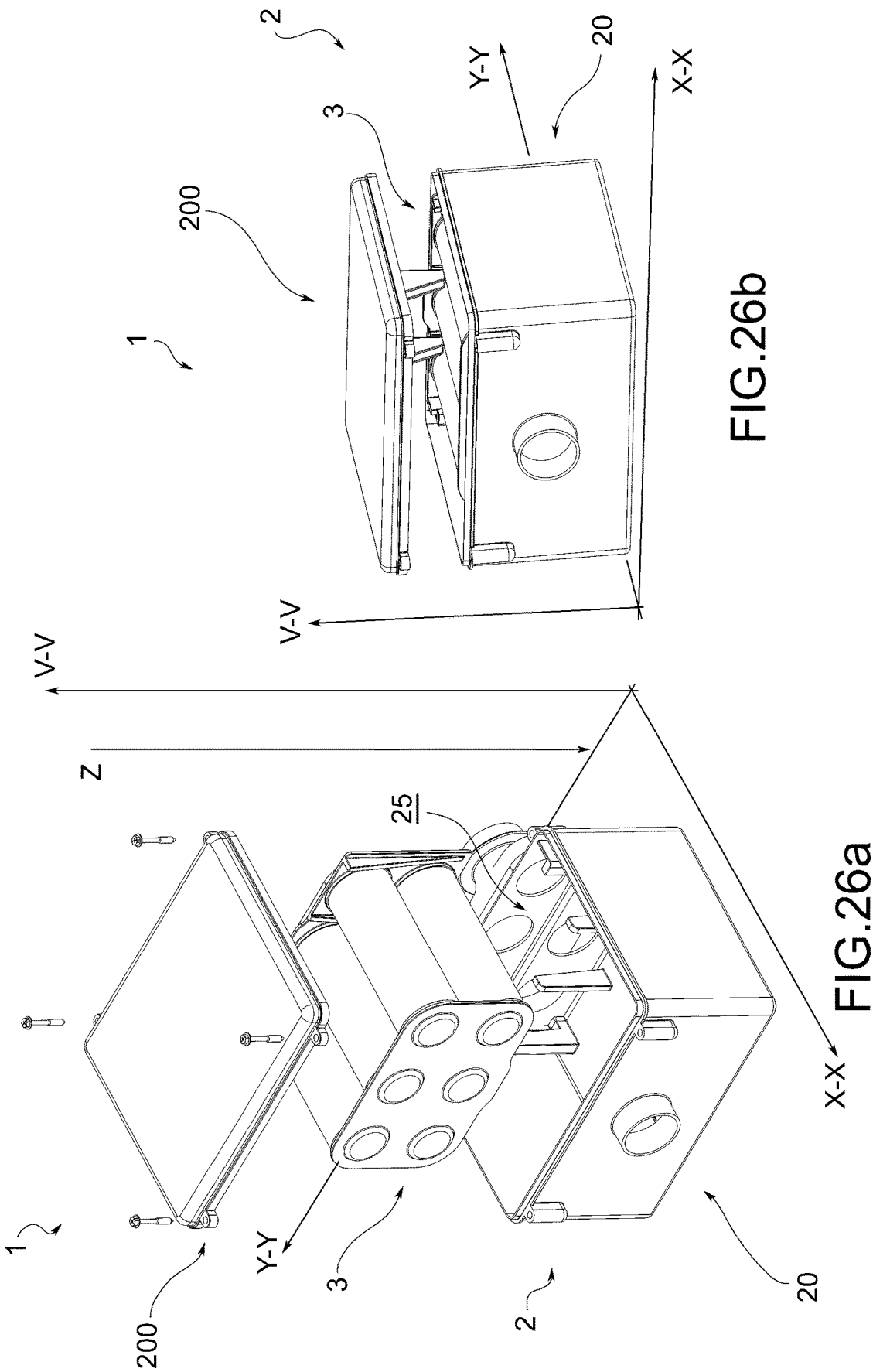

AIR FILTRATION ASSEMBLY

This application is a National Stage Application of PCT/IB2021/053846, filed 6 May 2021, which claims benefit of Ser. No. 10/202,0000010546, filed 11 May 2020 in Italy, and which applications are incorporated herein by reference. To the extent appropriate, a claim of priority is made to each of the above-disclosed applications.

FIELD OF APPLICATION

The present invention relates to an air filtration assembly of a vehicle. In addition, the present invention also relates to an engine air intake system of a vehicle comprising the air filtration assembly of a vehicle.

The context which the present invention lies in is that of air filtration assemblies in the automotive sector. Specifically, it refers to air filtration assemblies suitable to filter the air sucked in from the environment to the combustion chamber of the internal combustion engine.

In particular, the purpose of these assembles is to filter the air in such a way as to eliminate suspended particles from it which by arriving in the combustion chamber could damage the engine (or components thereof) or cause inefficient combustion.

It is therefore essential that air filtration is carried out efficiently and effectively, avoiding the possibility of leakage and thereby avoiding the possibility for dirt to reach the combustion chamber.

The known air filtration assemblies comprise specific boxes and specific filter cartridges, typically, panel elements, housed in said boxes.

The main problem of the known air filtration assemblies lies precisely in the failure of the filter cartridge to work properly, typically due to incorrect positioning inside the box.

Specifically, in fact, in the known solutions of the state of the art the problem related to the incorrect positioning of the filter cartridge, which engages the box with an ineffective seal, thus presenting a partial air leakage, resulting in inefficient filtration, is typical. In addition, incorrect insertion of the filter cartridge into the box entails potential damage to the filter cartridge and/or its sealing profiles, again causing ineffective air filtration.

In order to overcome this problem, in the state of the art, numerous embodiments of air filtration assemblies have been implemented in which the filter cartridges and/or special filter cartridge housing components, such as drawer elements, and/or filter cartridge housing boxes are subject to specific movements in order to perform a correct mutual positioning of the parts.

However, it has been observed that these solutions do not fully solve the technical drawback mentioned above. In fact, these known solutions fail to provide simple maintenance operations, and therefore fail to provide simple insertion methods of new filter cartridges into the respective boxes, thus presenting a high probability of error, leading to the possibility that a filter cartridge is incorrectly housed inside its box.

Solution According to the Invention

The need is therefore strongly felt to provide an air filtration assembly that has a box and a filter cartridge that housable in said box, wherein the filter cartridge has efficient filtering properties, and at the same time insertable in the box in a simple and intuitive but, above all, correct manner, preventing its possible incorrect positioning and therefore any unwanted leakage or breakage.

The purpose of the present invention is precisely to provide an air filtration assembly in which the aforesaid need is satisfied and which also responds efficiently and effectively to the needs of the specific sphere of application.

DESCRIPTION OF THE DRAWINGS

Further characteristics and advantages of the invention will, in any case, be evident from the description given below of its preferred embodiments, made by way of a non-limiting example with reference to the appended drawings, wherein:

FIGS. 1a and 1b shows two perspective views in separate parts of the air filtration assembly according to a first preferred embodiment;

FIGS. 2a and 2b illustrate two perspective views of a box, in particular of a container, comprised in the air filtration assembly as in FIGS. 1a and 1b;

FIGS. 3a and 3b represent two perspective views of a filter cartridge comprised in the air filtration assembly as in FIGS. 1a and 1b, according to a preferred embodiment;

FIG. 3a' illustrates a perspective view of a filter cartridge comprised in the air filtration assembly as in FIGS. 1a and 1b, according to a further preferred embodiment;

FIGS. 6a and 6b shows two perspective views in separate parts of the air filtration assembly according to a second preferred embodiment;

FIGS. 7a and 7b illustrate two perspective views of a box, in particular of a container, comprised in the air filtration assembly as in FIGS. 6a and 6b;

FIGS. 8a and 8b represent two perspective views of a filter cartridge comprised in the air filtration assembly as in FIGS. 6a and 6b, according to a preferred embodiment;

FIGS. 10a, 10b, 10c, 10d, 10e, 10f, represent longitudinal cross-sections of the air filtration assembly, in different stages of assembly;

FIGS. 11a and 11b shows two perspective views in separate parts of the air filtration assembly according to a third preferred embodiment;

FIGS. 12a and 12b illustrate two perspective views of a box, in particular of a container, comprised in the air filtration assembly as in FIGS. 11a and 11b;

FIGS. 13a and 13b represent two perspective views of a filter cartridge comprised in the air filtration assembly as in FIGS. 11a and 11b, according to a preferred embodiment;

FIGS. 16a and 16b shows two perspective views in separate parts of the air filtration assembly according to a fourth preferred embodiment;

FIGS. 21a and 21b shows two perspective views in separate parts of the air filtration assembly according to a fifth preferred embodiment;

FIGS. 25', 25", 25'" illustrate in perspective some assembly steps of the filter cartridge, in particular of the assembly, in the box, comprised in the air filtration assembly as in FIGS. 21a and 21b;

FIGS. 26a and 26b shows two perspective views in separate parts of the air filtration assembly according to a sixth preferred embodiment;

DETAILED DESCRIPTION

Figure 3A:
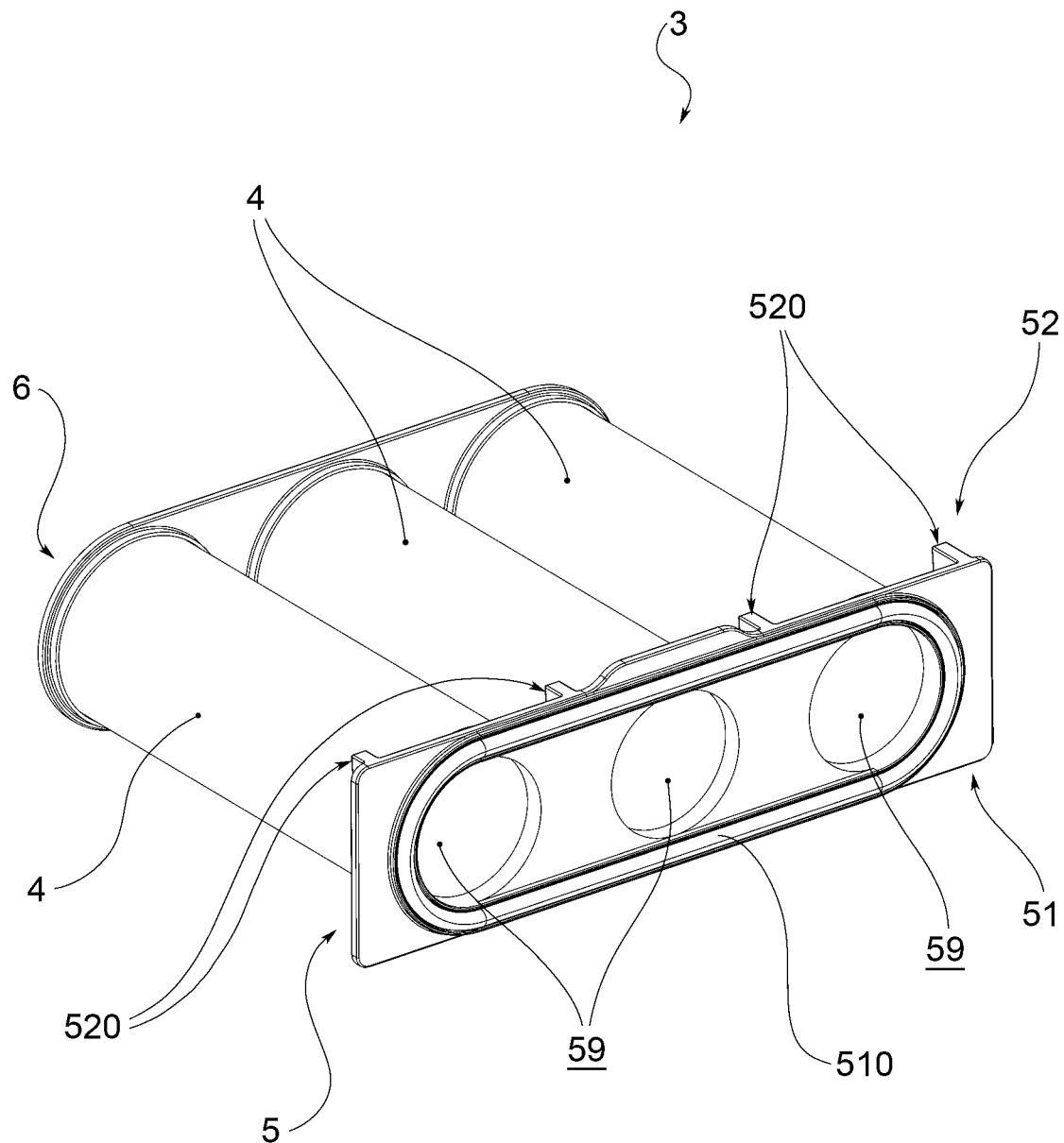

In the appended drawings, reference numeral 1 denotes an air filtration assembly according to the present invention.

According to the present invention, the air filtration assembly 1 is suitable to be part of a vehicle. In particular, the air filtration assembly 1 is suitable to be part of the engine air intake system of a vehicle. Preferably, the air filtration assembly 1 is therefore suitable to be connected to a vehicle air intake manifold. Preferably, the air filtration assembly 1 is fluidically connected to the combustion chamber of a vehicle combustion engine by means of the said air intake manifold.

Preferably, the air in intake from the environment can pass through the air filtration assembly 1. Inside the air filtration assembly 1 the ambient air is thus separated from the undesirable elements suspended in it.

As said, the present invention also relates to the engine air intake system of a vehicle comprising the air filtration assembly 1.

According to the present invention, the air filtration assembly 1 of a vehicle comprises a box 2 and a filter cartridge 3 housed in said box 2.

Preferably, said box 2 is fluidically connected on one side to the external environment and on the other side to a vehicle air intake manifold.

Inside the box 2 the filtration of the air takes place.

According to the present invention, the box 2 comprises a wall 21. Preferably, said wall 21 comprises at least one outflow mouth 29 which the air can pass through. Preferably, the filtered air comes out of the box 2 from the outflow mouth 29. Preferably, the outflow mouth 29 is suitable to be fluidically connected to the air intake manifold.

According to the invention, the box 2 extends along a first axis V-V, preferably vertical, and a second axis Y-Y, preferably transverse. According to a preferred embodiment, the first axis V-V is orthogonal to the second axis Y-Y.

Preferably, the wall 21 extends along said first axis V-V and said second axis Y-Y.

According to the present invention, the box 2 also extends along a longitudinal axis X-X. The longitudinal axis X-X is incident to the first axis V-V and the second axis Y-Y. In other words, the longitudinal axis X-X extends from the wall 21. Preferably, the longitudinal axis X-X extends orthogonally to the first axis V-V and the second axis Y-Y, so preferably, the longitudinal axis X-X is orthogonal to the wall 21.

According to a preferred embodiment, the box 2 has a substantially parallelepiped shape.

According to a preferred embodiment, the filter cartridge 3 comprises a plurality of tubular filter media 4 and a plate group 5, to which said tubular filter media 4 are integrally connected.

According to the present invention, the filter cartridge 3 comprises at least two tubular filter media 4 that can be crossed, preferably radially, in filtration. Preferably, the tubular filter media 4 can be passed through radially in filtration from the outside to the inside, so as to identify the dirty side of the filter cartridge 3 on the outside of the tubular filter media 4 and the clean side of the filter cartridge 3 on the inside, preferably in the inner cavities 40 of the tubular filter media 4.

According to a preferred embodiment, the filter cartridge 3 comprises at least two tubular filter media 4 positioned aligned with each other along the first axis V-V or the second axis Y-Y.

According to a preferred embodiment, the filter cartridge 3 comprises at least two parallel rows wherein each row comprises at least two tubular filter media 4.

In a preferred embodiment, the filter cartridge 3 comprises three tubular filter media 4 per row.

As said, according to the present invention, the filter cartridge 3 further comprises a plate group 5 to which the tubular filter media 4 are operatively connected. In particular, the plate group 5 is suitable to support the tubular filter media 4.

The plate group 5 comprises at least one outflow opening 59 suitable for placing the tubular filter media 4 in fluidic communication, in particular their internal cavity 40, with at least one outflow opening 29.

According to a preferred embodiment, the plate group 5 comprises at least one outflow opening 59 for each tubular filter septum 4. Preferably, the wall 21 also comprises an outflow mouth 29 at each outflow opening 59.

In other words, according to a preferred embodiment, the outflow opening 59 is a duct that extends longitudinally between the second face 52 and the first face 51. Preferably, the plate group 5 comprises a number of ducts equal to the number of tubular filter media 4.

According to an embodiment variant, at least one outflow opening 59 is shaped so as to extend longitudinally between the second face 52 and the first face 51 to fluidically connect the tubular filter media 4 to at least one outflow mouth 29. In other words, in such embodiment, the outflow opening 59 is an internal fluidic manifold suitable for connecting the tubular filter media 4 with at least one outflow mouth 29. Preferably, therefore, the outflow opening 59 has a number of fluidic passages on the second face 52 equal to the number of tubular filter media 4 and a plurality of fluidic passages on the first face 51, for example comprising a number of fluidic passages on the first face 51 equal to the number of outflow mouths 29 present in the wall 21.

According to the present invention, the plate group 5 extends with respect to an imaginary extension plane S.

Preferably, said imaginary extension plane S is positioned at the centreline of the thickness of the plate group 5.

Preferably, the plate group 5 comprises a plate body 50. According to a preferred embodiment, the plate group 5 is obtained by means of a plastic moulding operation, such as injection moulding.

According to the present invention, on opposite sides of said imaginary extension plane S, the plate group 5 comprises a first face 51 and a second face 52. The first face 51 is also called the sealing face. The second face 52 is also called the contact or thrust face.

According to a preferred embodiment the at least two tubular filter media are operatively connected to the plate body 50 of the plate group 5.

According to a preferred embodiment, at least two tubular filter media 4 are integrally connected to the plate group 5.

Preferably, according to a preferred embodiment at least two tubular filter media 4 are integrally connected to the second face 52.

According to the present invention, the first face 51 comprises at least one sealing profile 510.

According to a preferred embodiment, the plate group 5 comprises a single sealing profile 510 which extends around the outflow opening 59 or the outflow openings in the plate group 5, identifying a single sealing region with the wall 21.

According to a preferred embodiment the plate group 5, for each outflow opening 59, comprises a respective sealing profile 510 that extends around the respective outflow opening 59. In other words, for example, embodiments of the filter cartridge 3 in which the plate group 5 comprises three outflow openings 59, comprise three sealing profiles 510 identifying three sealing regions.

In some embodiment variants, the plate group 5 comprises sealing profiles 510 that extend around a plurality of outflow openings 59. For example, a sealing profile 510 extends around a plurality of outflow openings 59, preferably aligned with each other.

According to a preferred embodiment, each sealing profile 510 is an elastically yielding element.

According to a preferred embodiment the sealing profile 510 is a removable element, e.g. suitable to be housed in a specially-shaped seat, comprised in the plate body 50. Preferably, as shown in the appended drawings, the sealing profile 510 is a gasket element.

According to other embodiments, the sealing profile 510 is integrated in the plate body 50. In particular, the sealing profile 510 is a collar or sealing lip made integrally with the plate body 50, e.g. in the same material as the plate body 50.

According to other preferred embodiments, the sealing profile 510 is integrated into the plate body by overmoulding.

Preferably, the sealing profile 510 acts in the axial direction (parallel to the longitudinal direction X-X).

Preferably, in the case of multiple sealing profiles 510, each sealing profile 510 acts in an axial direction (parallel to the longitudinal direction X-X).

According to the present invention, the second face 52 comprises at least two contact profiles 520.

Preferably, said contact profiles 520 are elements protruding orthogonally with respect to the imaginary extension plane S, positioned axially spaced from each other. This means that the contact profiles 520 extend in height orthogonally to the insertion direction, i.e. in the longitudinal direction X-X, and are mutually axially spaced with respect to the first axis V-V or with respect to the second axis Y-Y, preferably with respect to the second axis Y-Y, i.e. with respect to the axis orthogonal to the insertion direction.

According to the present invention, the contact profiles 520 are mutually spaced with respect to the first axis V-V or with respect to the second axis Y-Y in such a way that at least one tubular filter septum 4 is positioned between two consecutive contact profiles 520 (along the first axis or along the second axis).

According to a preferred embodiment the contact profiles 520 are sufficient in number to comprise end contact profiles 520, axially distal, and at least one central contact profile positioned between the two end contact profiles.

Preferably, an contact profile 520 is placed between two consecutive tubular filter media 4.

In the embodiments comprising three tubular filter media 4, preferably per row, there are two end contact profiles 520 and two central contact profiles 520, so that one central contact profile 520 is positioned between the first and second tubular filter media 4, and the other central contact profile 520 is positioned between the second and third tubular filter media 4.

According to the present invention, the filter cartridge 3 is insertable into the box 2 along an insertion direction Z substantially parallel to the first axis V-V or the second axis Y-Y.

In other words, the filter cartridge 3 insertable into the box in a one-way insertion operation.

According to a preferred embodiment, the tubular filter media 4 and rows of tubular filter media 4 extend in particular along the axis incident to the insertion direction Z; preferably, the tubular filter media 4 and rows of tubular filter media 4 extend orthogonally to the insertion direction Z.

According to a preferred embodiment the insertion direction Z is substantially the first axis V-V corresponding to the vertical direction, so that the insertion operation also benefits from the action of gravity.

According to other embodiment variants (not shown in the appended drawings), the rows of tubular filter media 4 extend parallel to the insertion direction Z.

According to the present invention, the box 2 comprises a housing region 25 between the wall 21 and at least two contact elements 22 longitudinally spaced from the wall 21 and axially spaced from each other.

The plate group 5 is housed in said housing region 25 with at least one sealing profile 510 sealingly engaged to the wall 21 and contact profiles 520 engaged to the respective contact elements 22.

Preferably, the contact elements 22 comprised in the box 2 are in number and position a function of the contact profiles 520 comprised in the plate group 5.

In other words, in said housing region 25, the plate group 5 insertable axially along the insertion direction Z in such a way that the plate group 5 engages the wall 21 with the first face 51 and in such a way that it is engaged by the contact elements 22 on the second face 52. Preferably, the contact on the second face 52 involves an axial thrust, in the longitudinal direction, such as to push and hold the first face 51 against the wall 21.

As amply described below, the plate group 5 (in particular some of its components) and in a complementary manner the housing region 25, are specially, mutually shaped both in a longitudinal direction and in a direction parallel to the insertion direction. In particular, therefore, this coupling allows a unique mutual positioning.

According to a preferred embodiment according to the present invention (not shown in the appended drawings), at least one sealing profile 510 is shaped with respect to the imaginary extension plane S presenting variable vertical distances dz1, dz1' measured in a direction orthogonal to the insertion direction Z, along said insertion direction Z.

That is to say that the sealing profile 510 is shaped in such a way as to have specific portions at a first vertical distance dz1 from the imaginary extension plane S and other portions at a different vertical distance dz1' from the imaginary extension plane S.

Figure 24A:
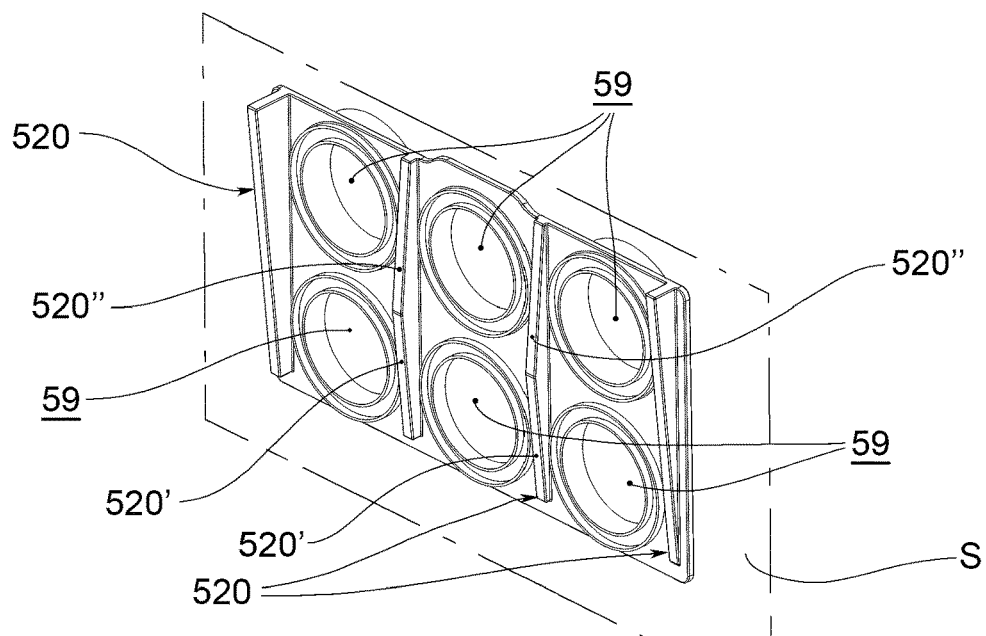
FIGS. 24a, 24b, 24c, show a perspective view, a top view and a side view of a plate group comprised in the filter cartridge in FIGS. 23a and 23b.
Figure 24B:
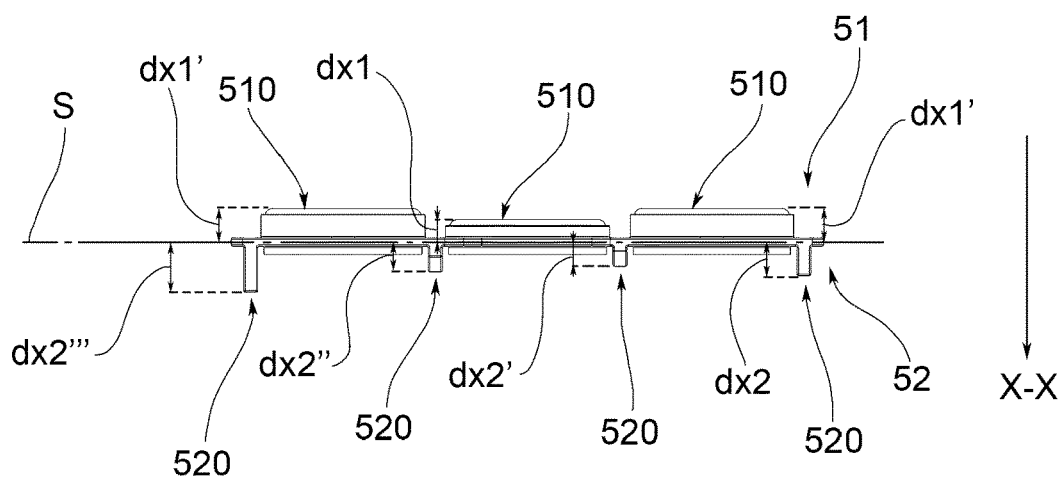
Figure 24C:
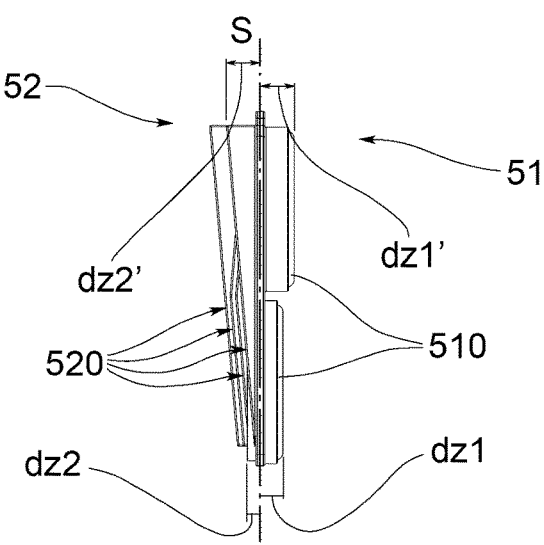
Figure 25A:
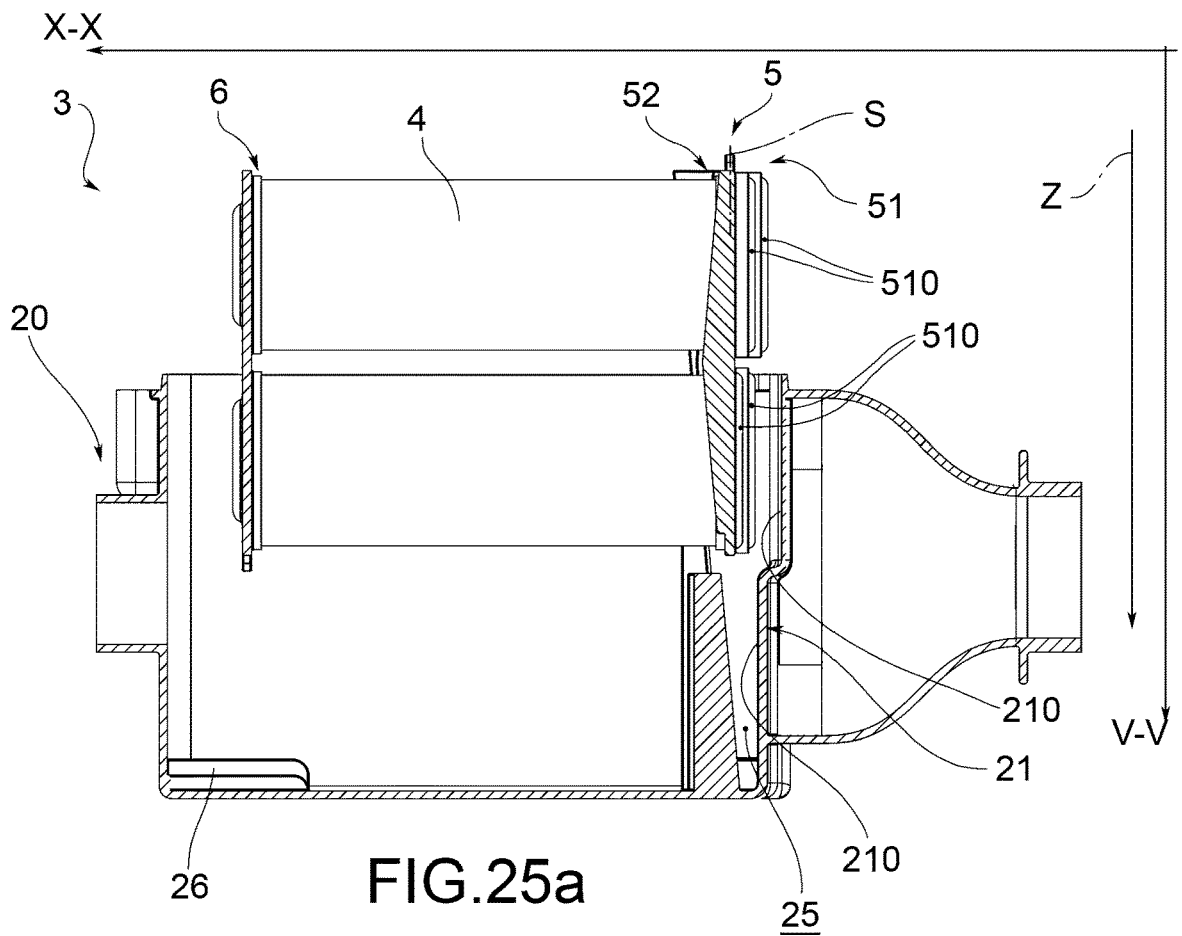
FIGS. 25a, 25b, 25c, 25d, 25e, 25f, represent longitudinal cross-sections of the air filtration assembly, in different stages of assembly.
Figure 25B:
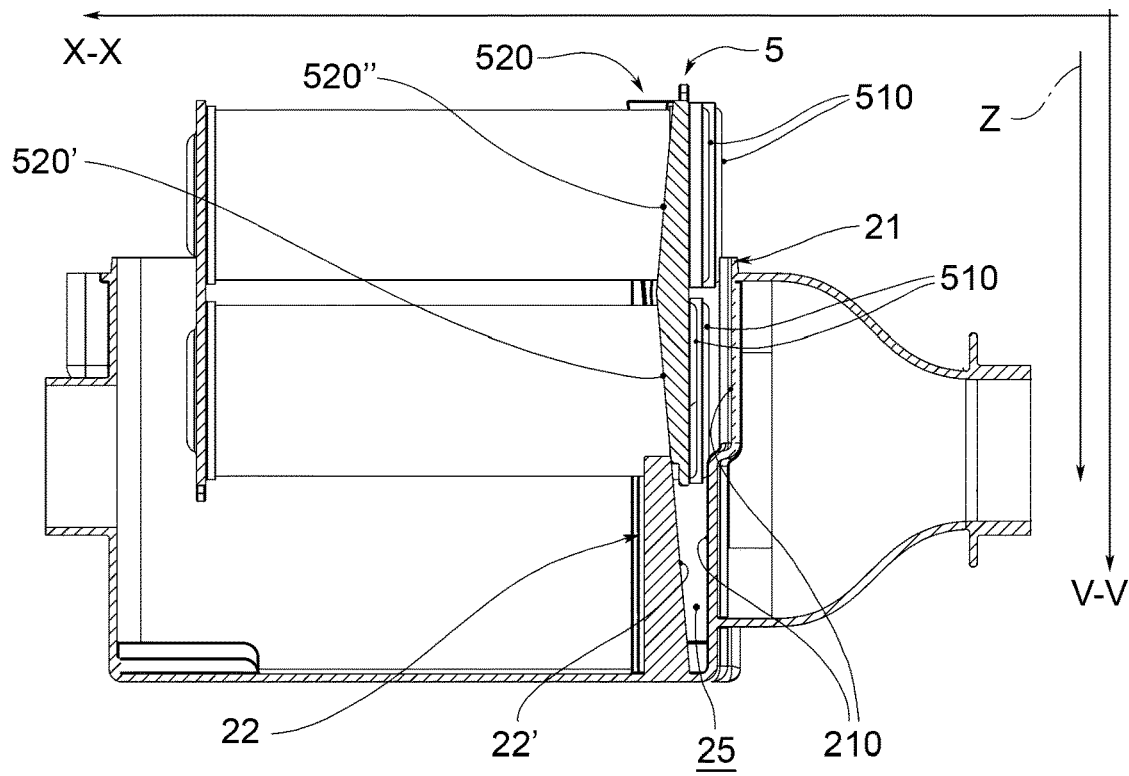
Figure 25C:
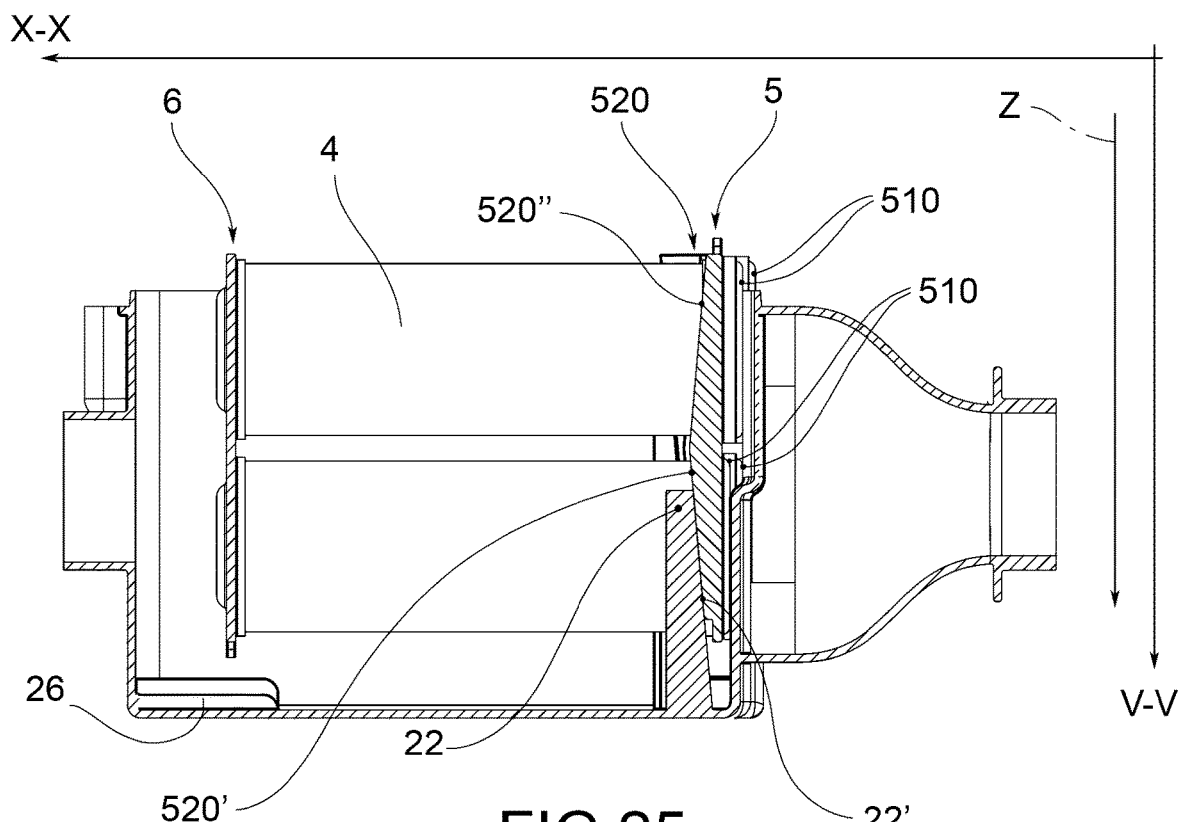
Figure 25D:
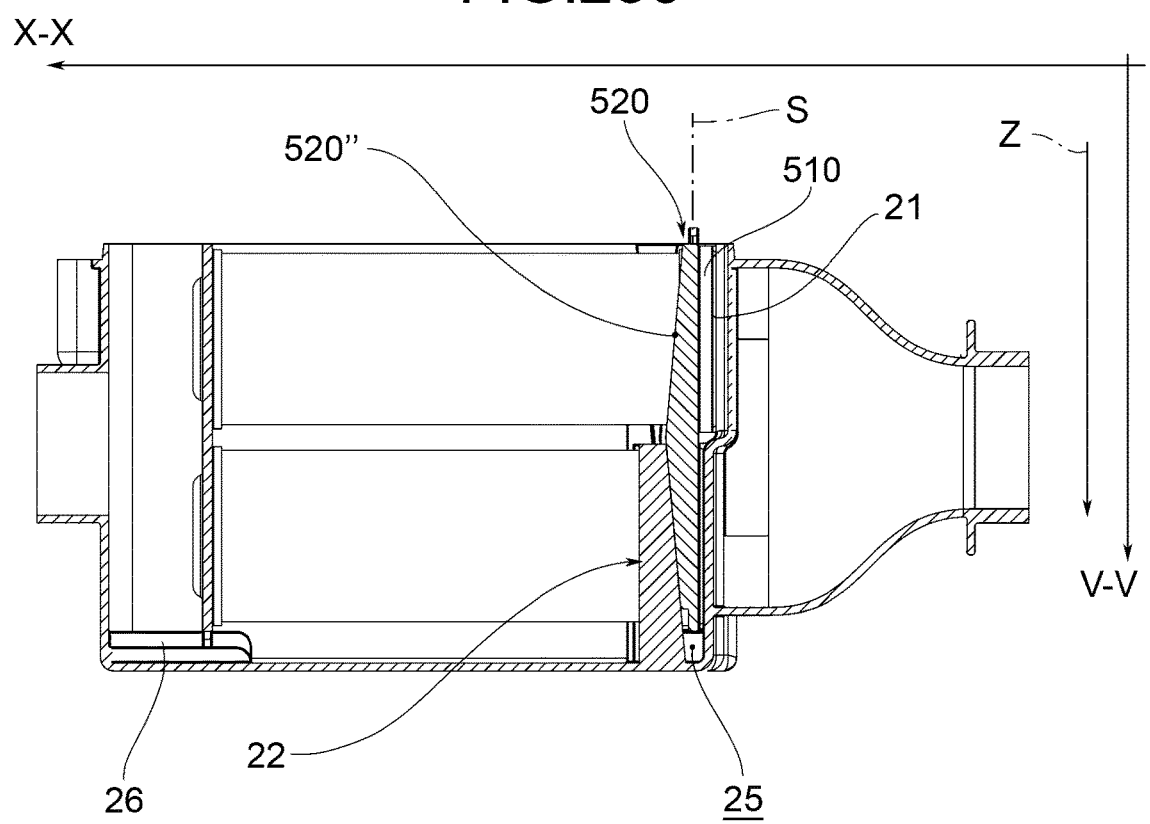
Figure 25E:
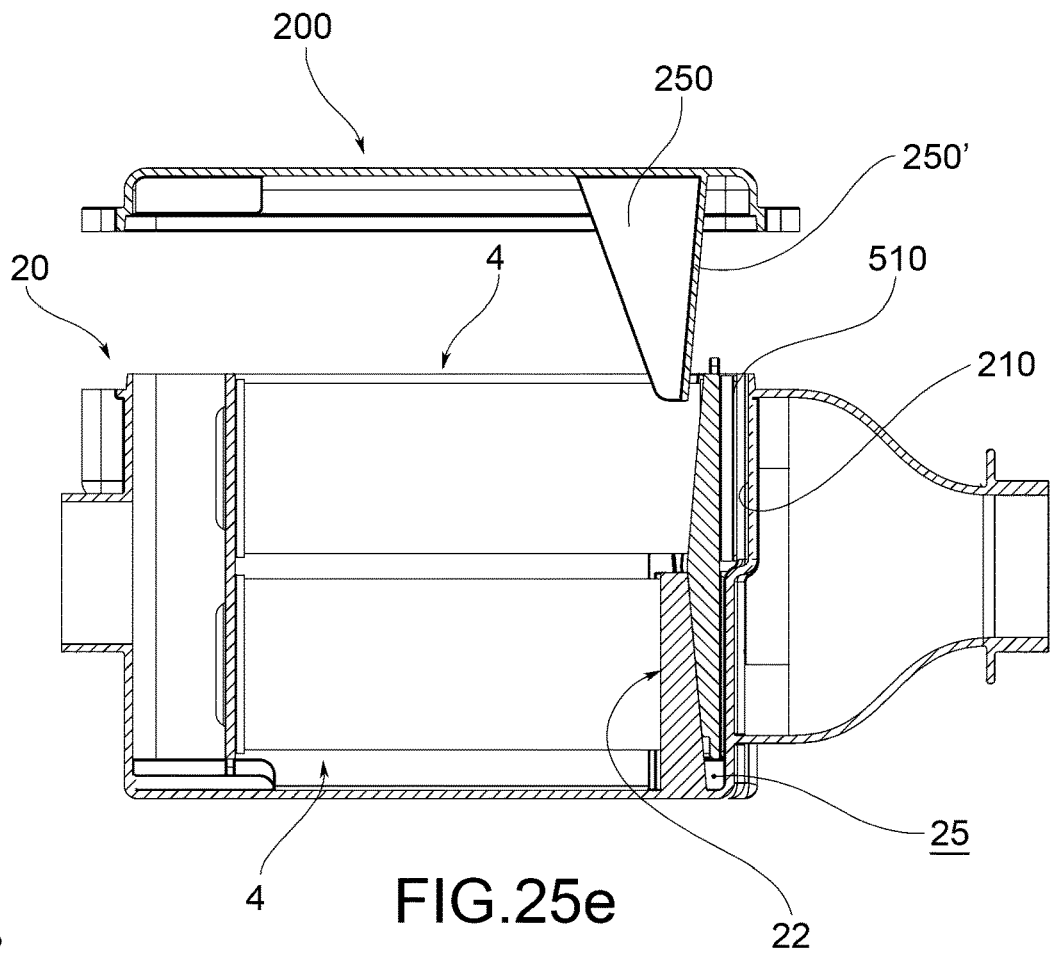
Figure 25F:
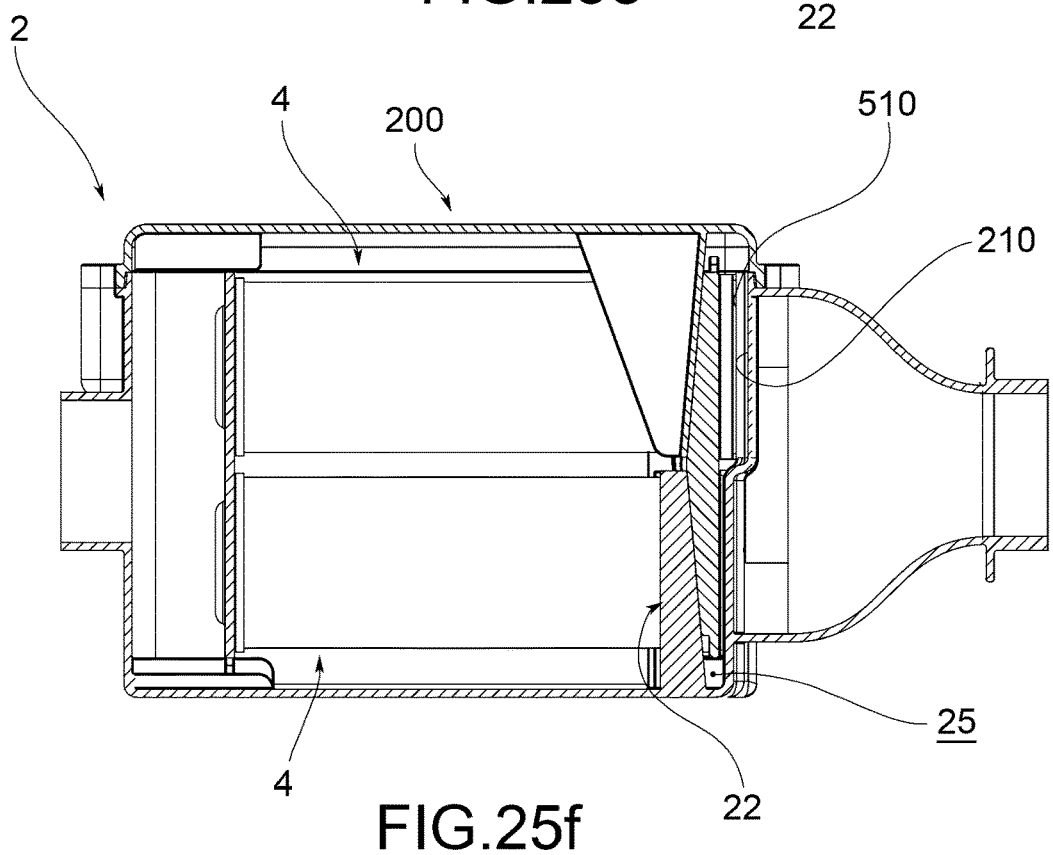
Figure 27A:
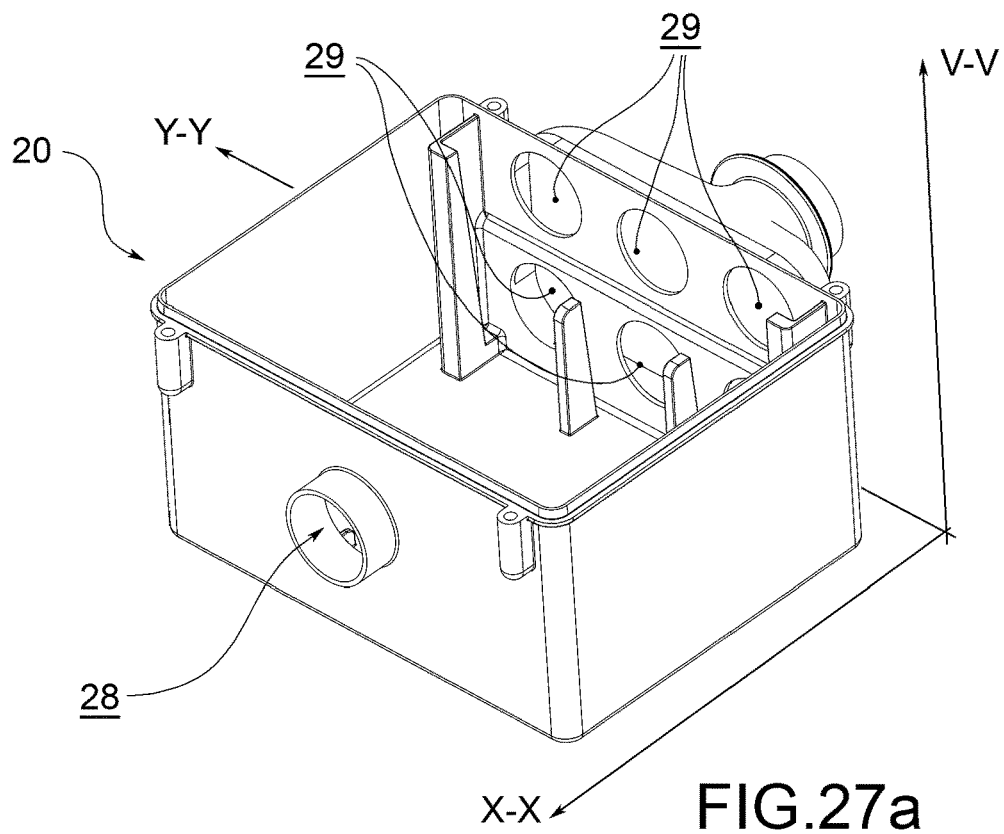
FIGS. 27a and 27b illustrate two perspective views of a box, in particular of a container, comprised in the air filtration assembly as in FIGS. 26a and 26b.
Figure 27B:
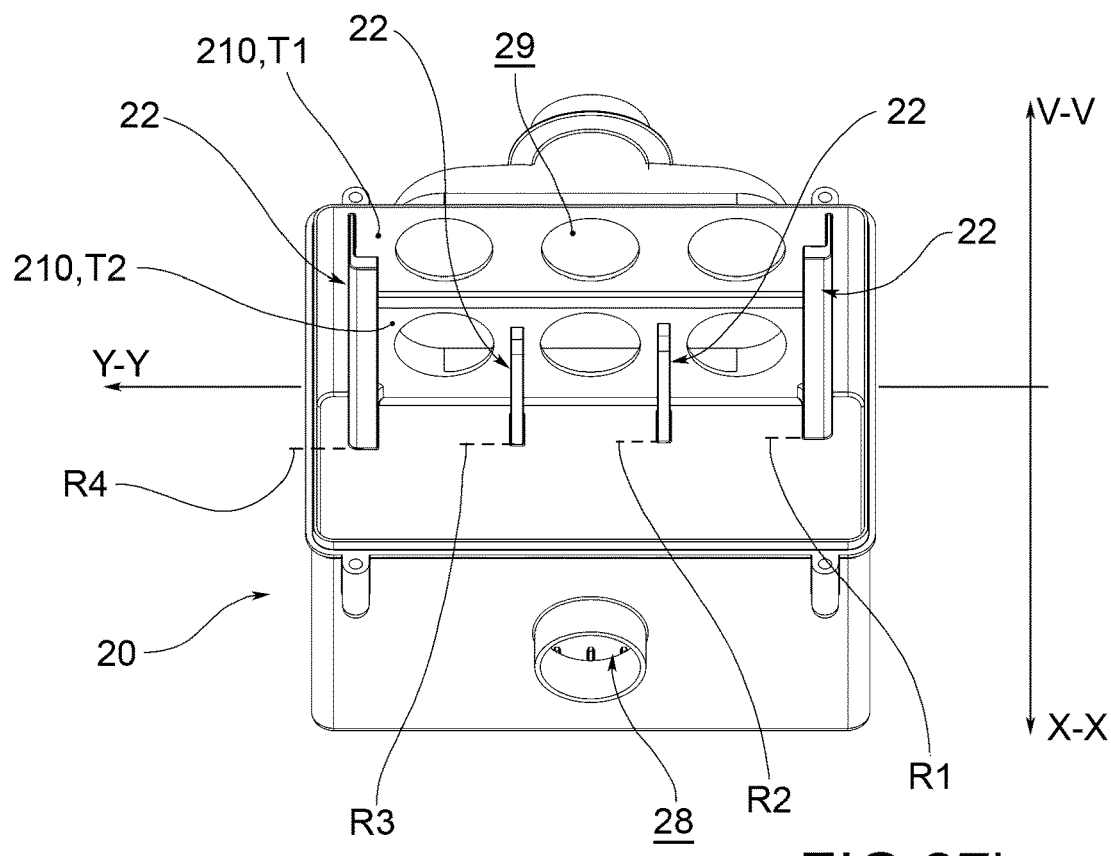
Figure 28A:
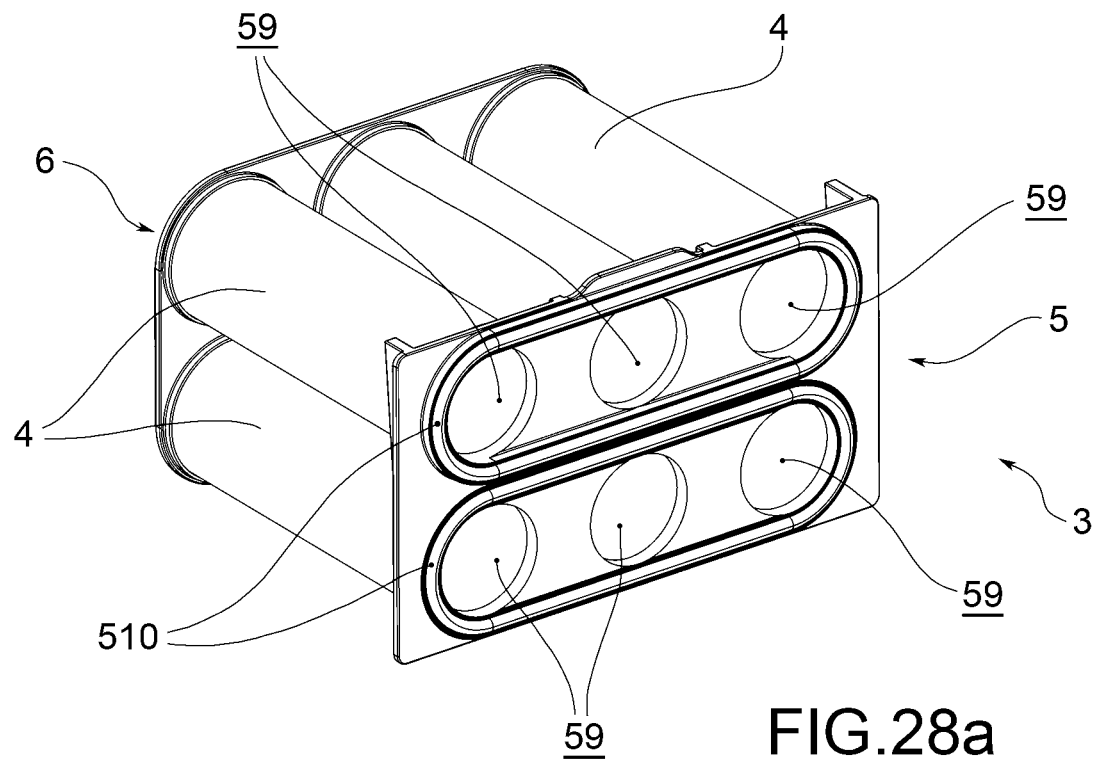
FIGS. 28a and 28b represent two perspective views of a filter cartridge comprised in the air filtration assembly as in FIGS. 26a and 26b, according to a preferred embodiment.
Figure 28B:
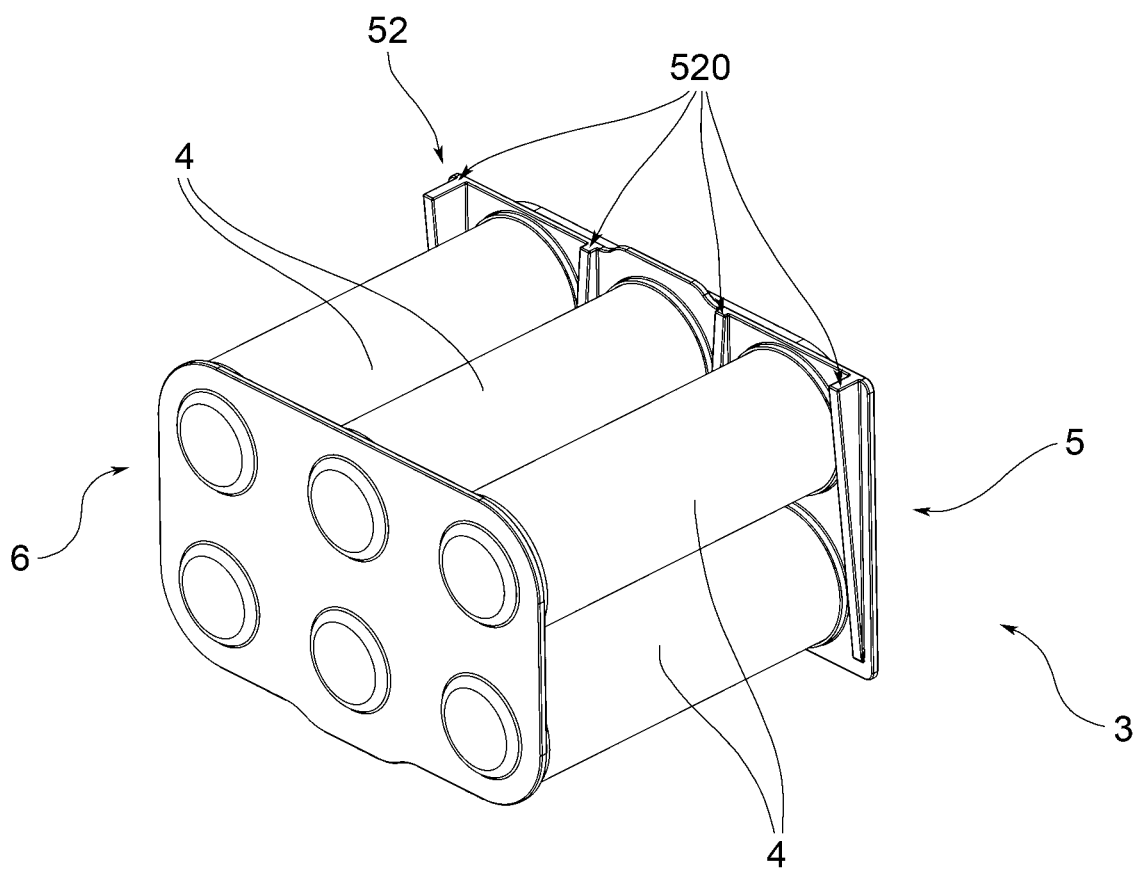
Figure 29A:
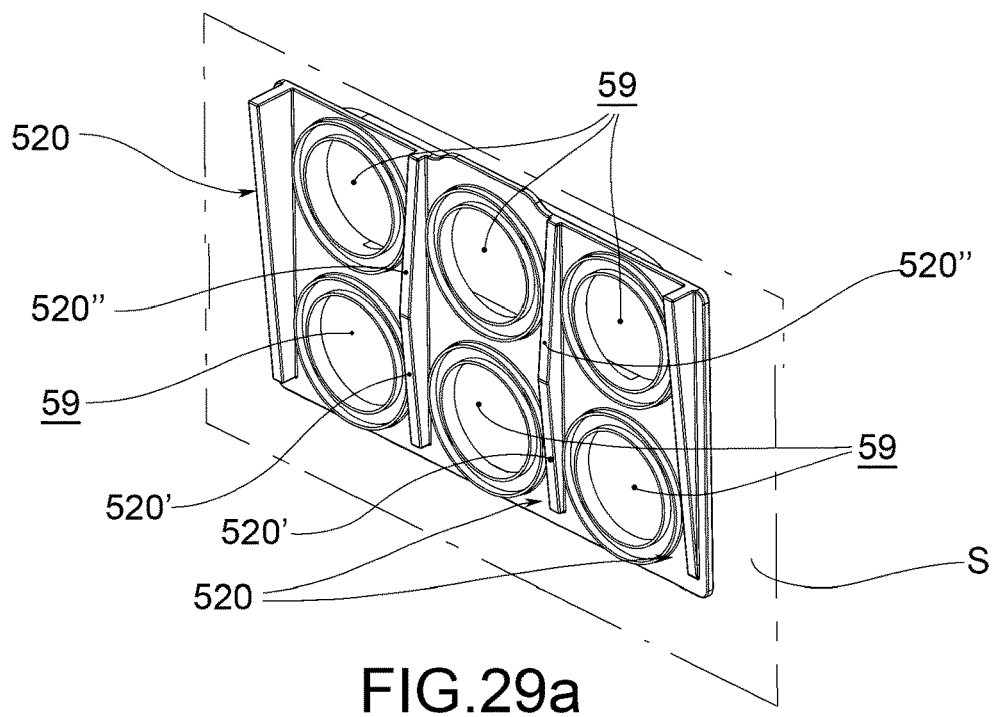
FIGS. 29a, 29b, 29c, show a perspective view, a top view and a side view of a plate group comprised in the filter cartridge in FIGS. 28a and 28b.
Figure 29B:
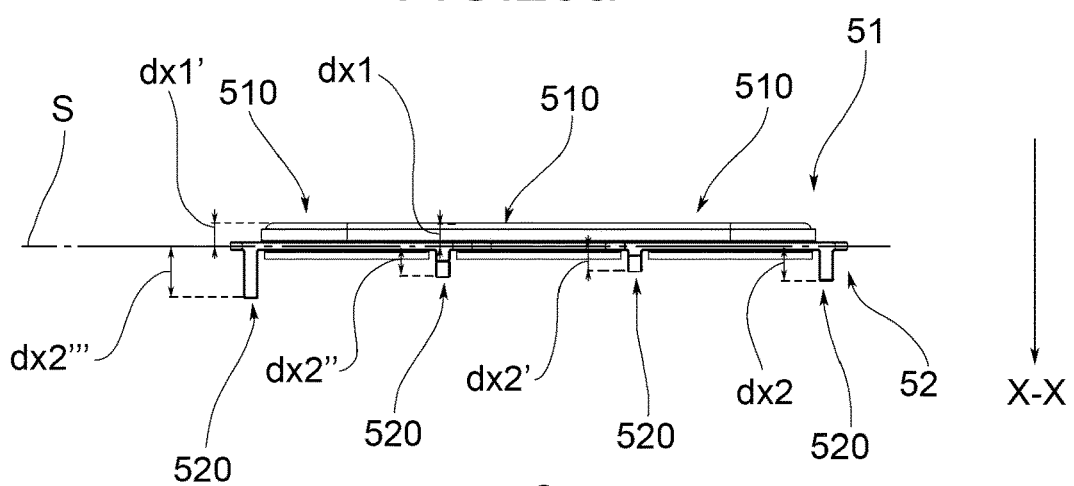
Figure 29C:
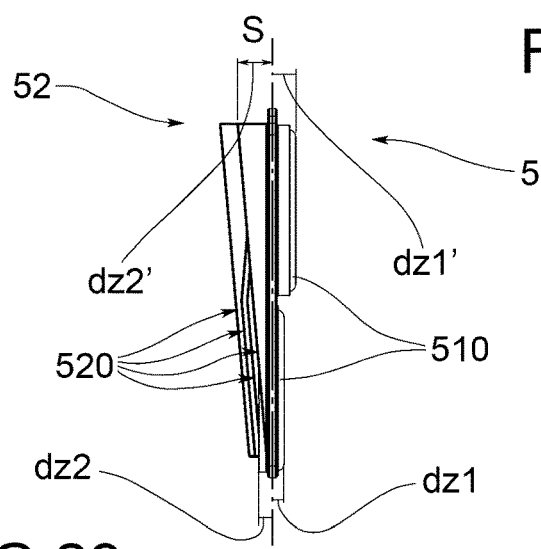
Figure 30A:
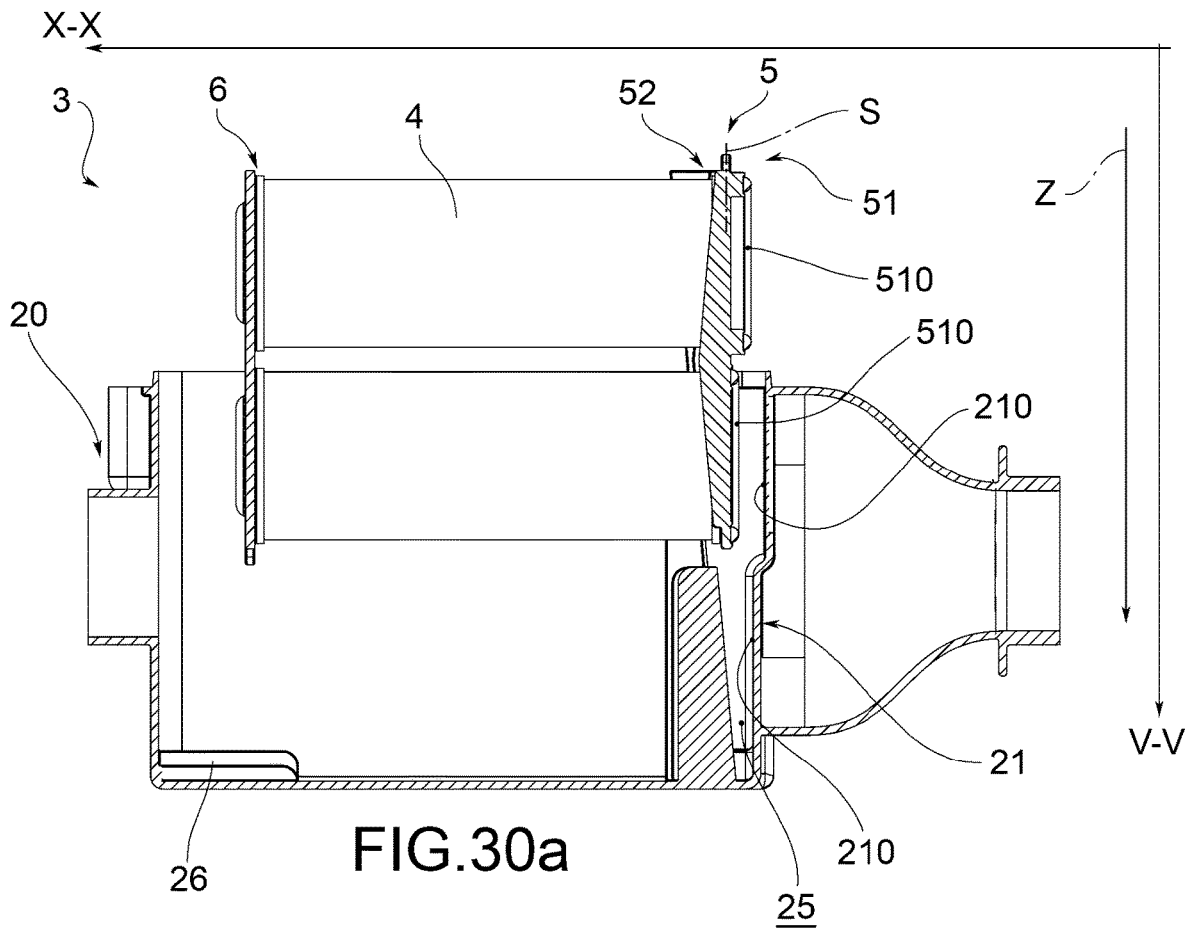
FIGS. 30a, 30b, 30c, 30d, 30e, 30f, represent longitudinal cross-sections of the air filtration assembly, in different stages of assembly.
Figure 30B:
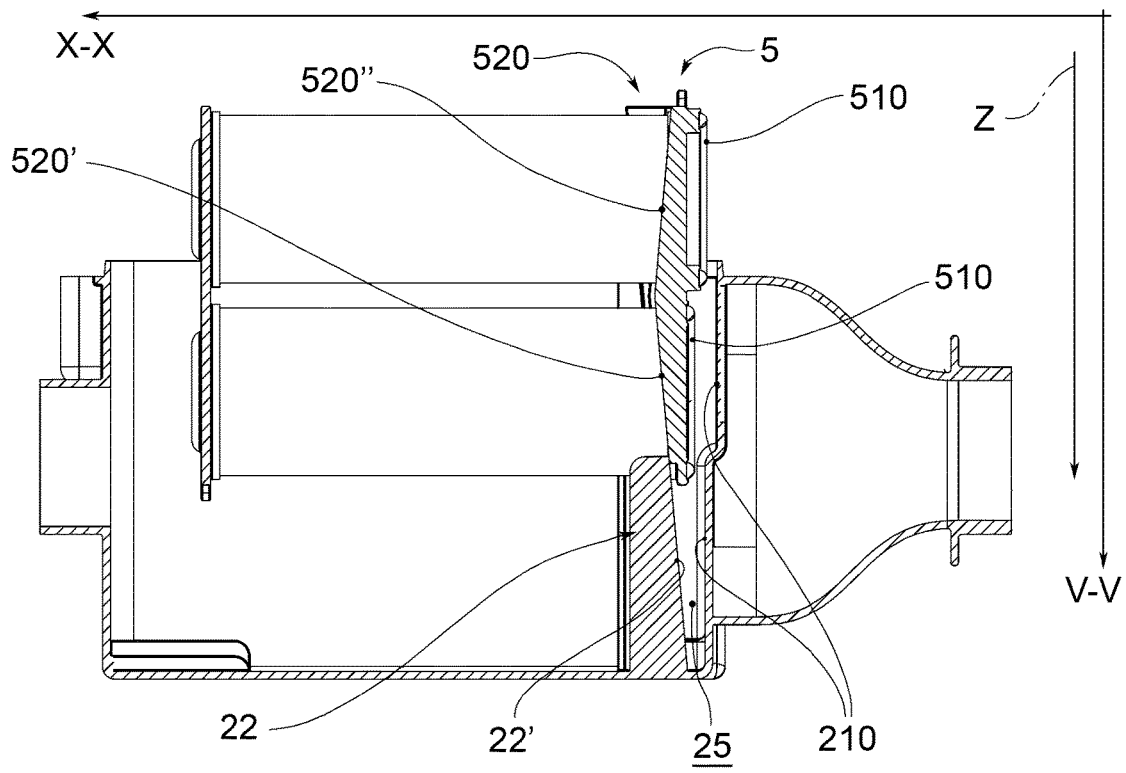
Figure 30C:
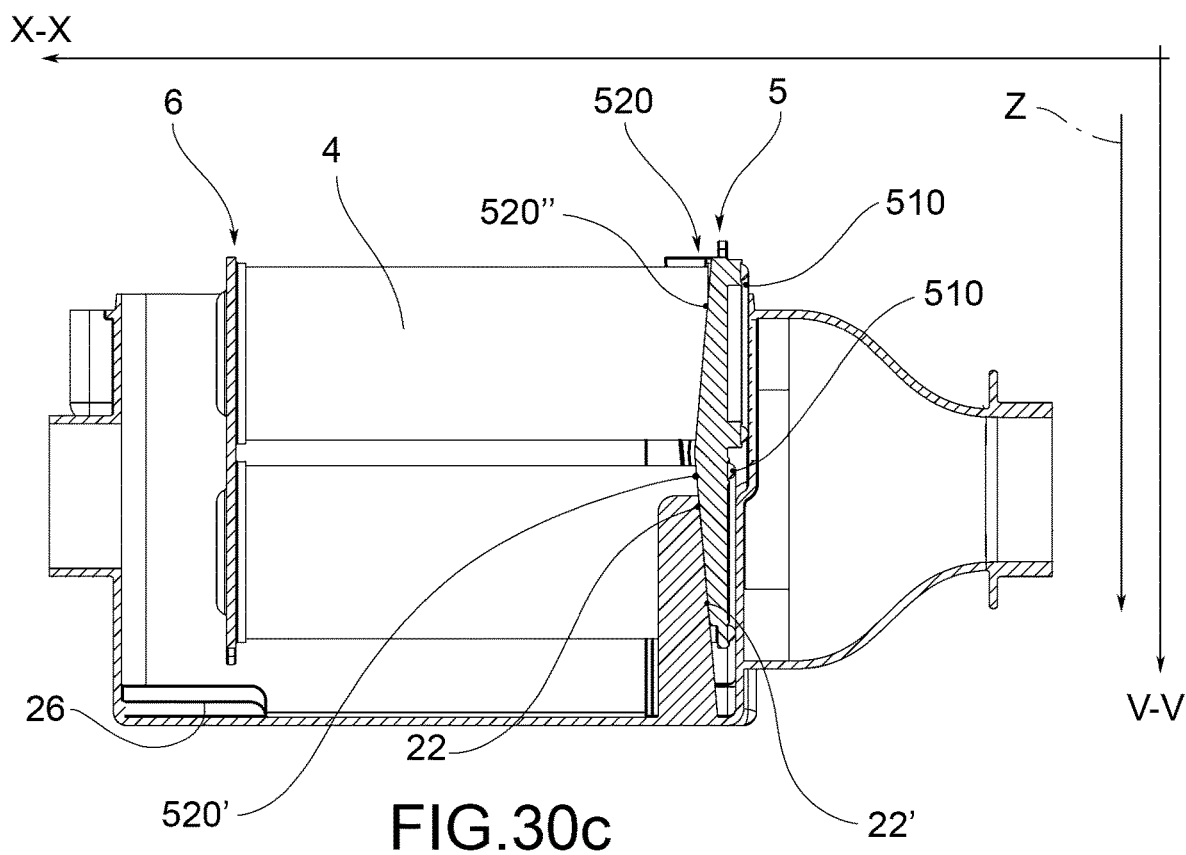
Figure 30D:
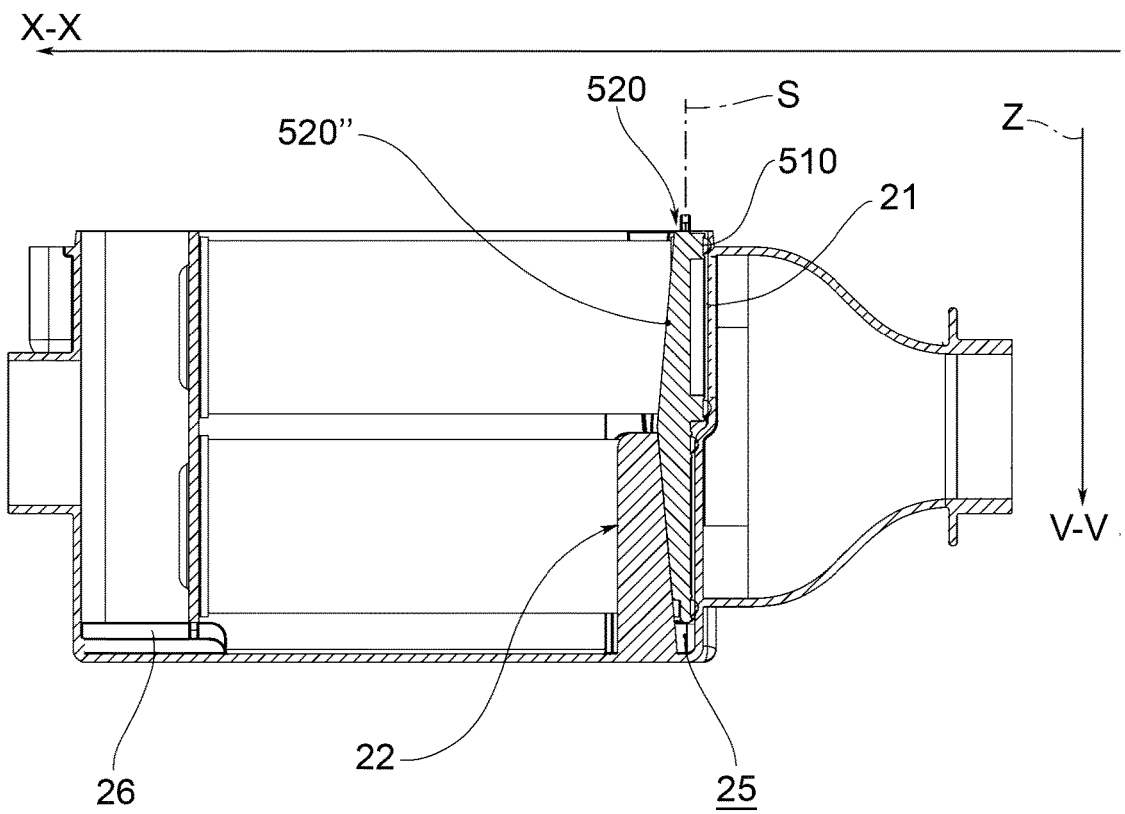
Figure 30E:
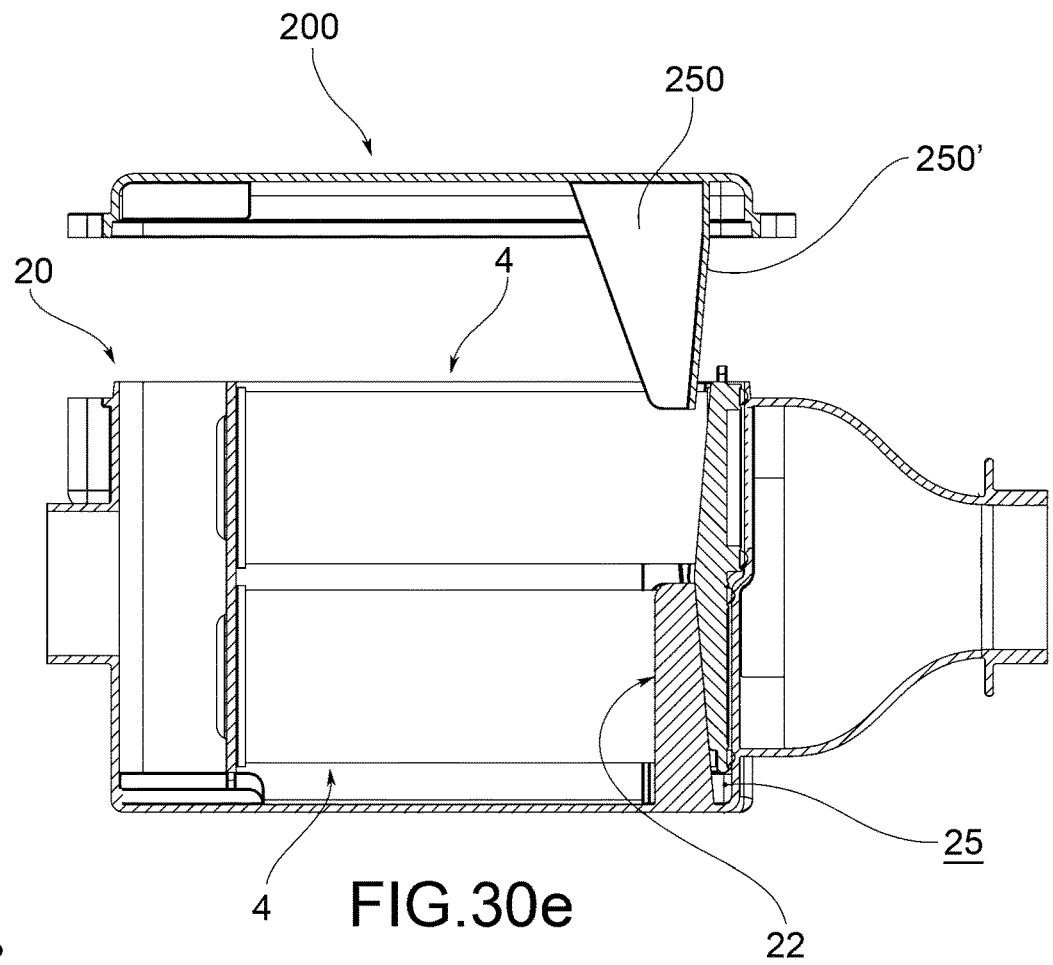
Figure 30F:
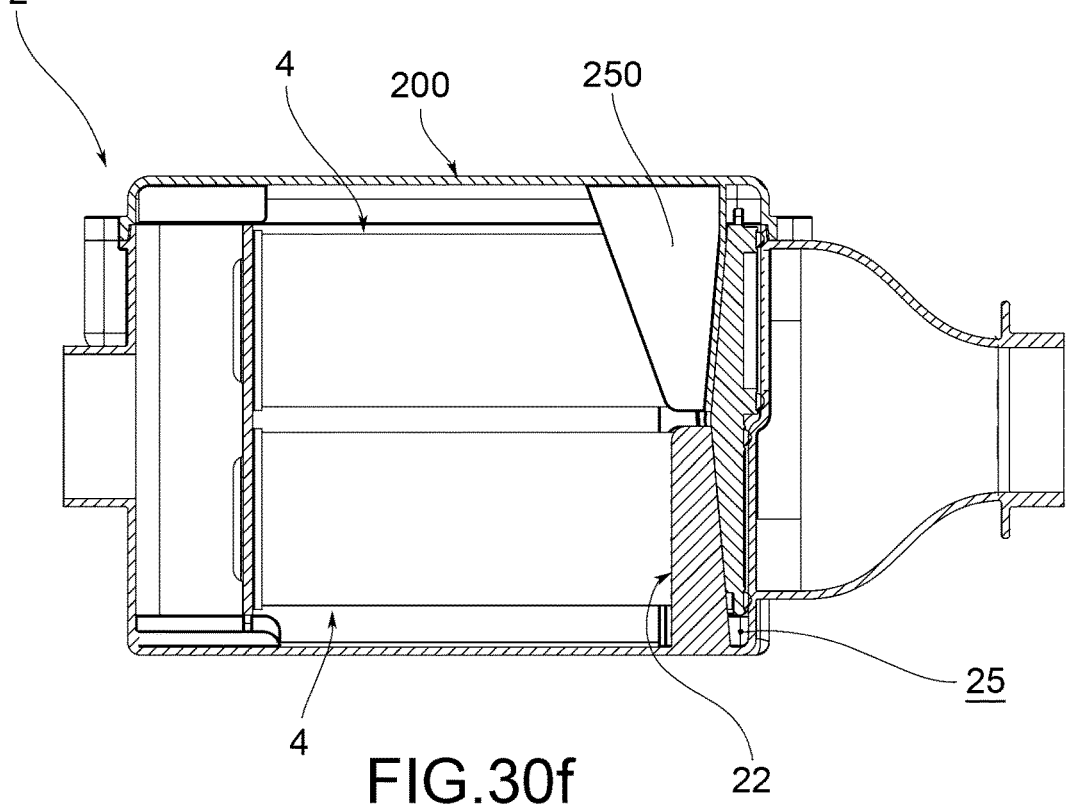
Figure 30:
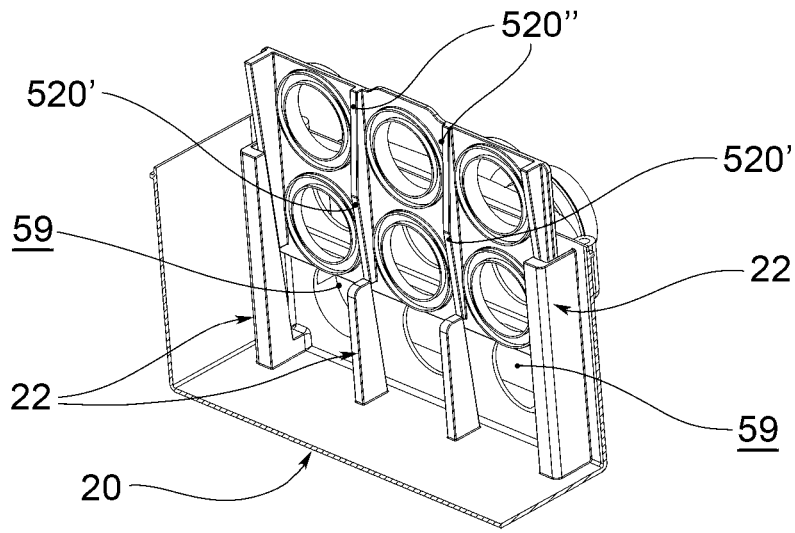
FIGS. 30', 30", 30'" illustrate in perspective some assembly steps of the filter cartridge, in particular of the plate group, in the box, comprised in the air filtration assembly as in FIGS. 26a and 26b.
Figure 30:
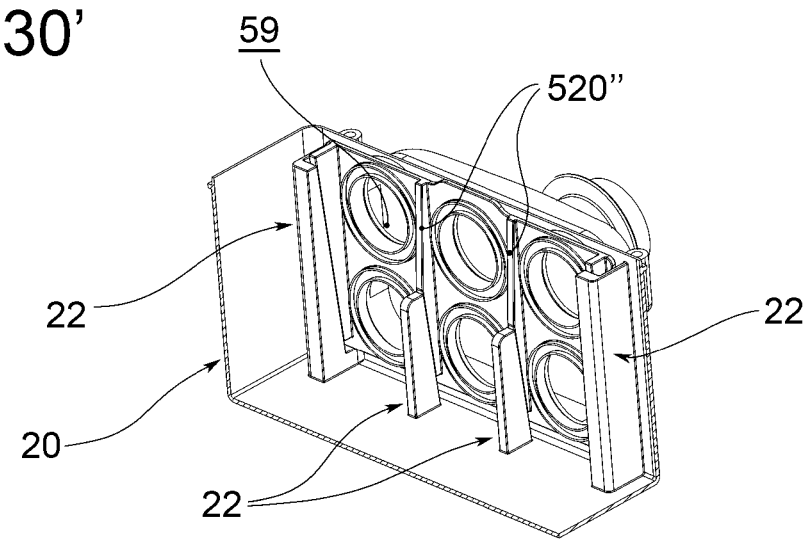
Figure 30:
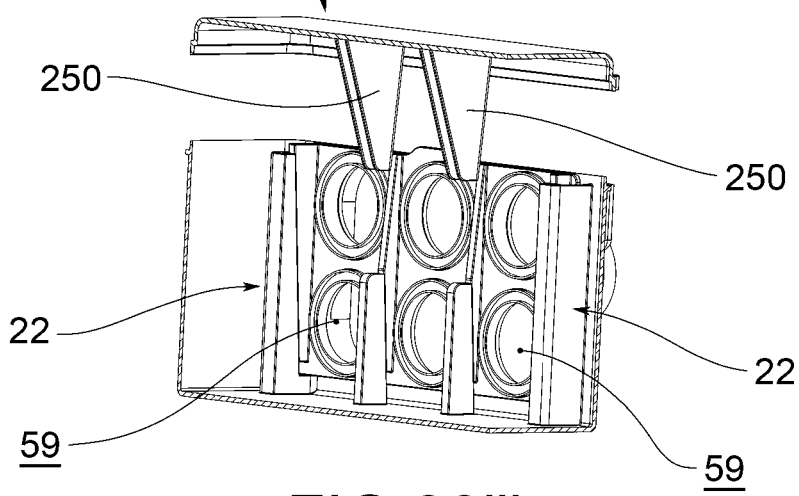

Or according to a preferred embodiment according to the present invention, (shown in the appended drawings, for example in FIGS. 19c, 24c, 29c), the sealing profiles 510 are reciprocally positioned with respect to the imaginary extension plane S at variable vertical distances dz1, dz1' measured in a direction orthogonal to the insertion direction Z, along said insertion direction Z.

That is to say, by comprising a number of sealing profiles 510, each sealing profile 510 is positioned in such a way that it is at a specific vertical distance from the imaginary extension plane S. Preferably, therefore, two consecutive sealing profiles 510, in the direction parallel to the insertion direction Z, are located at two different distances from such imaginary extension plane S. Preferably, the lower sealing profiles 510 or the lower portions of the sealing profiles 510 which are the first to access the box 2 during the insertion operations, are in a position preferably proximal to the imaginary extension plane S compared to the upper sealing profiles 510 or the upper portions of the sealing profiles 510.

According to the above description relative to the shape and position of the sealing profiles 510, the wall 21 is specially shaped in a complementary manner.

According to a preferred embodiment according to the present invention (as shown in the appended drawings, for example in FIGS. 4c, 9c, 14c, 19c, 24c, 29c), the contact profiles 520 are shaped with respect to the imaginary extension plane S presenting variable vertical distances dz2, dz2' measured in a direction orthogonal to the insertion direction Z, along said insertion direction Z.

That is to say that the contact profile 520 is shaped in such a way as to have specific portions at a first vertical distance dz2 from the imaginary extension plane S and other portions at a different vertical distance dz2', dz2" from the imaginary extension plane S.

Moreover, according to a preferred embodiment according to the present invention (not shown in the appended drawings), the contact profiles 520 are reciprocally positioned with respect to the imaginary extension plane S presenting variable vertical distances dz2, dz2' measured in a direction orthogonal to the insertion direction Z, along said insertion direction Z. In other words, the contact profiles have a "serrated profile".

According to the above description with regard to the shape and position of the contact profiles 520, the contact elements 22 are specially shaped in a complementary manner.

According to a preferred embodiment, the contact profiles 520 and the contact elements 22 comprise respective contact and thrust surfaces 520', 22' mutually engaging in scovering in the insertion operations of the cartridge 3 into the box 2.

Preferably, the contact and thrust surfaces 520', 22' are shaped so that the cartridge 3 is pushed in the longitudinal direction, and is held in place, against the wall 21.

In other words, according to the present invention, the plate group 5 dissected orthogonally to the extension plane S, presents elements, or portions of elements, proximal to said extension plane S and elements, or portions of elements, distal to said extension plane S. In other words, according to the present invention, the plate group 5 sectioned orthogonally to the extension plane S presents, on the first side 51 and/or on the second side 52, elements, or portions of elements, proximal to said imaginary extension plane S and elements, or portions of elements, distal from said imaginary extension plane S.

According to the present invention, the plate group 5 is shaped so that it is tapered in the first region that enters, in the insertion operations, the housing region 25. According to a preferred embodiment, the plate group has a tapered shape at the bottom.

According to a preferred embodiment according to the present invention (not shown in the appended drawings), at least one sealing profile 510 is shaped with respect to the imaginary extension plane S presenting variable longitudinal distances dx1, dx1' measured in the direction parallel to the longitudinal axis X-X, along the first axis V-V or the second axis Y-Y, preferably along the axis orthogonal to the insertion direction Z.

That is to say that the sealing profile 510 is shaped in such a way as to have specific portions at a first longitudinal distance dx1 from the imaginary extension plane S and other portions at a different longitudinal distance dx1' from the imaginary extension plane S.

Or according to a preferred embodiment according to the present invention (shown for example in FIGS. 9b, 14b, 19b, 24b), the sealing profiles 510 are mutually positioned with respect to the imaginary extension plane S presenting variable longitudinal distances dx1, dx1' measured in the direction parallel to the longitudinal axis X-X, along the first axis V-V the second axis Y-Y, preferably, along the axis orthogonal to the insertion direction Z.

That is to say, by comprising a number of sealing profiles 510, each sealing profile 510 is positioned in such a way that it is at a specific longitudinal distance from the imaginary extension plane S. Preferably, therefore, two mutually consecutive sealing profiles 510 are located at two different longitudinal distances.

According to a preferred embodiment according to the present invention (not shown in the appended drawings), the contact profiles 520 are shaped with respect to the imaginary extension plane S presenting variable longitudinal distances dx2, dx2' measured in the direction parallel to the longitudinal axis X-X, along the first axis V-V the second axis Y-Y, preferably along the axis orthogonal to the insertion direction Z.

That is to say that the contact profile 520 is shaped in such a way as to have specific portions at a first longitudinal distance from the imaginary extension plane S and other portions at a different longitudinal distance from the imaginary extension plane S.

Or according to a preferred embodiment according to the present invention (shown for example in FIGS. 4b, 14b, 19b, 24b, 29b), the contact profiles 520 are mutually positioned with respect to the imaginary extension plane S presenting variable longitudinal distances dx2, dx2', dx2", dx2''' measured in the direction parallel to the longitudinal axis X-X, along the first axis V-V the second axis Y-Y, preferably, along the axis orthogonal to the insertion direction Z.

That is to say, by comprising a number of contact profiles 520, each contact profile 520 is positioned in such a way that it is at a specific longitudinal distance from the imaginary extension plane S. Preferably, therefore, two contact profiles 520 mutually consecutive along the insertion axis Z are located at two different longitudinal distances.

In other words, according to the present invention, the plate group 5 sectioned along the extension plane S, presents elements, or portions of elements, longitudinally proximal to said plane and elements, or portions of elements, longitudinally distal from said plane. In other words, according to the present invention, the plate group 5 sectioned orthogonally to the plane of extension S orthogonal to the direction of insertion, presents on the first face 51 and/or on the second face 52, elements, or portions of elements, longitudinally proximal to said imaginary extension plane S and elements, or portions of elements, longitudinally distal to said imaginary extension plane S.

According to the present invention, the plate group 5 has a shape such as to present a variable cross-section preferably with a tapered course in a preferred axial direction. Or, again according to the present invention, the plate group 5 has such a shape as to present itself with a variable cross-section presenting itself centrally concave or convex.

As said, the box 2 (its housing region 25) in particular, the wall 21 and the contact elements 22 are specially designed for use with sealing profiles 510 and contact profiles 520.

For example in an embodiment with cartridge 3 comprising a variety of sealing profiles 510 the wall 21 is specially shaped to comprise sealing planes 210 suitable to be engaged by said sealing profiles 510.

For example, according to a preferred embodiment, the wall 21 comprises a plurality of sealing planes 210 positioned on different imaginary sealing planes T1, T2, T3, T4 which in a direction parallel to the insertion direction Z, with filter cartridge 3 housed, are in turn at variable longitudinal distances and variable vertical distances (or respectively different) with respect to the imaginary extension plane S.

Or again, by way of example, according to a preferred embodiment, the contact elements 22 are located on different imaginary contact planes R1, R2, R3, R4, which, with the filter cartridge 3 housed in the box 2 and therefore the plate group 5 housed in the housing region 25, are in turn at variable longitudinal distances and variable vertical distances with respect to the imaginary extension plane S.

In other words, according to the present invention, the plate group 5 observed from the side has a variable shape along the vertical axis and the plate group 5 observed from above has a variable shape along the longitudinal axis.

Preferably, at least one between the first face 51 and the second face 52 has said variable contour along the vertical axis and at least one between the first face 51 and the second face 52 said variable contour along the longitudinal axis.

According to a preferred embodiment, the box 2 comprises a container 20, in which at least part of the filter cartridge 3 housable and a cover 200 suitable to close the container 20.

Preferably, the cover 200 can be fitted on the container 20 parallel to the insertion direction Z. According to a preferred embodiment, the cover 200 can be fixed to the container 20 by means of screws or clips.

According to a preferred embodiment, the cover 200 is suitable to engage the filter cartridge 3 in the direction parallel to the insertion direction Z.

Preferably, the cover 200 is suitable to engage the plate group 5 in the direction parallel to the insertion direction.

In other words, preferably the cover 200 is suitable to act as an axial contact in the insertion direction.

According to a preferred embodiment, the cover 200 comprises one or more lugs 250 suitable to engage the second face 52 of the plate group 5 to keep the cartridge 3 in its longitudinal position or to keep the cartridge 3, in particular the one or more sealing profiles 510, pushed in the longitudinal direction towards the wall 21.

According to a preferred embodiment, one or more lugs 250 engage the contact profiles 520.

According to a preferred embodiment, the lugs 250 have the same purpose as the contact elements 22. Preferably, the contact profile 520 is shaped and/or positioned so that it interacts in a lower portion thereof with the contact element 22 and with an upper portion thereof with the lug 250.

Preferably, the contact profiles 520 and contact lugs 250 have auxiliary contact and thrust surfaces 520", 250".

Preferably, one or more contact lugs 250 are positioned at the central contact profiles 520. In other words, according to a preferred embodiment, the central contact profiles 520 have a wedge shape comprising both an contact and thrust surface suitable for engaging the contact elements 22 and an auxiliary contact and thrust surface suitable for engaging the contact lugs 250.

According to a preferred embodiment, the box 2 comprises at least one inflow mouth 28. Preferably, said at least one inflow mouth 28 is longitudinally spaced from the at least one outflow mouth 29.

According to a preferred embodiment, the container 20 and/or cover 200 comprise directional flanges suitable for directing the external air flow towards the tubular filter media 4. In other words, according to a preferred embodiment, the container 20 and/or the cover 200 comprise inside them directional flanges suitable to direct the incoming air flow towards the external walls of the tubular filter media 4.

According to a preferred embodiment, the filter cartridge 3 also comprises an auxiliary plate group 6. Preferably, the auxiliary plate group 6 is longitudinally opposite the plate group 5. Preferably, the tubular filter media 4 are integrally connected to the auxiliary plate group 6.

According to a preferred embodiment, the box 2 also comprises support elements 26 to support the auxiliary plate 6.

According to a preferred embodiment, the plate group 5 comprises elastically yielding teeth, suitable for engaging the external contact elements, preferably in special snap-in housings. Preferably, the snap-in engagement takes place when the filter cartridge 3 is inserted in the insertion direction into the box 2. Preferably, the extraction of the cartridge from the box 2 is performed by a pulling action that exceeds the elastic action of said elastically yielding teeth.

Preferably, the elastically yielding teeth act in a direction orthogonal to the longitudinal direction X-X.

According to the present invention, described above, further embodiments are possible, e.g., in a preferred embodiment, the plate group 5 consists of a plurality of distinct components mutually assembled. For example, in a preferred embodiment, the plate group comprises a first component to which the tubular filter media are operatively connected and which comprises the at least one sealing profile and a second component, which can be fitted to the first, comprising the contact profiles.

In addition, according to a preferred embodiment, the end contact profiles are longitudinally further away from the imaginary extension plane S (as shown for example in FIG. 24*b*) with respect to the at least one central contact profile.

Or according to a preferred embodiment, the end contact profiles are each at different longitudinal distances from the imaginary extension plane S.

Figure 14A:
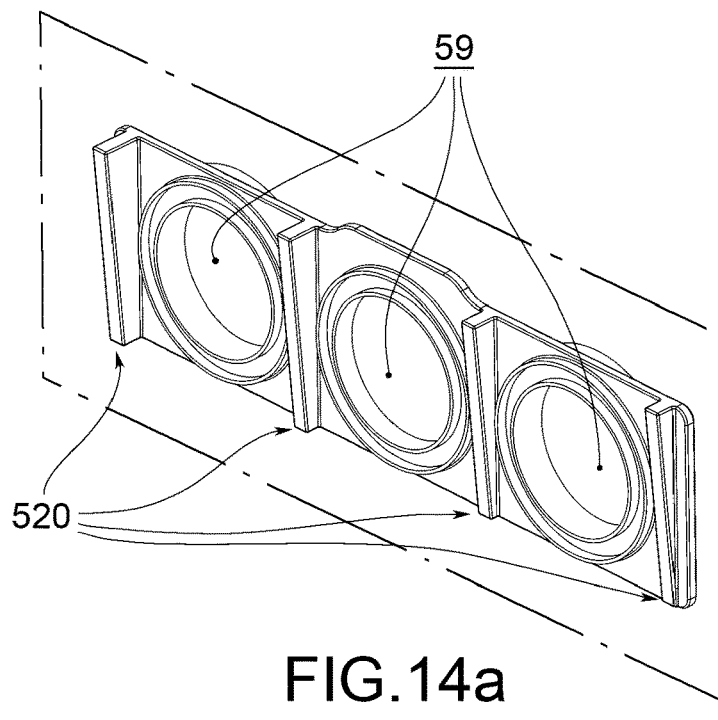
FIGS. 14a, 14b, 14c, show a perspective view, a top view and a side view of a plate group comprised in the filter cartridge in FIGS. 13a and 13b.
Figure 14B:
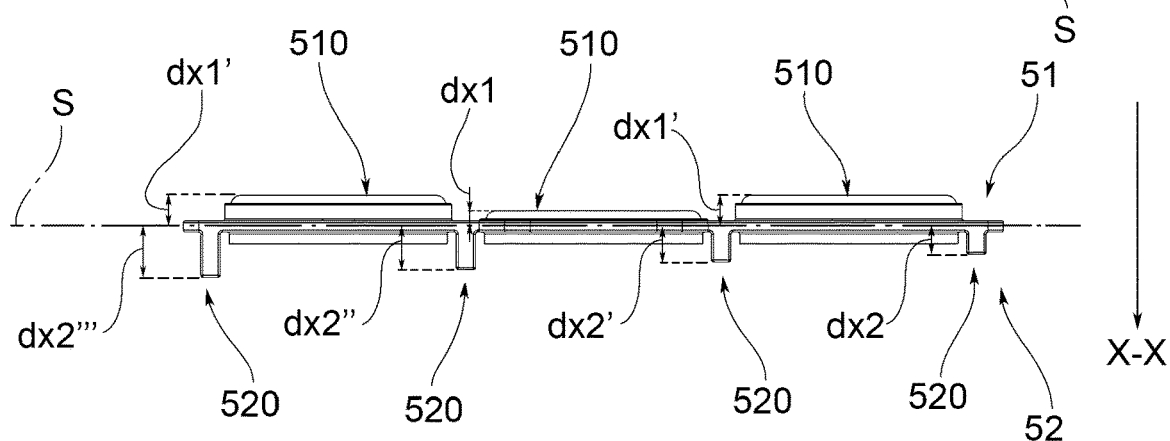
Figure 14C:
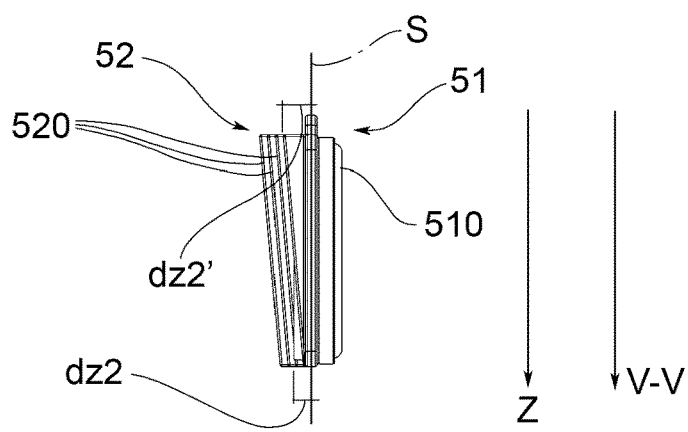
Figure 15A:
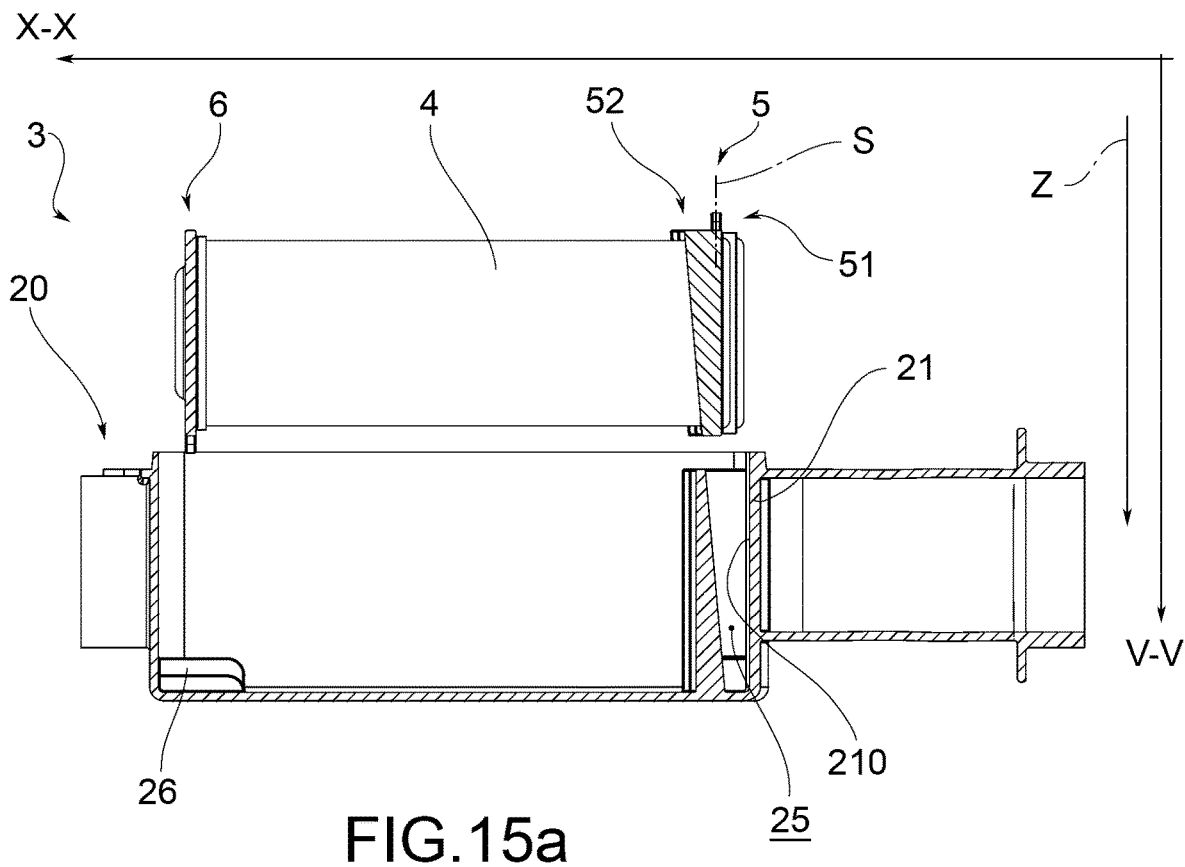
FIGS. 15a, 15b, 15c, 15d, 15e, 15f, represent longitudinal cross-sections of the air filtration assembly, in different stages of assembly.
Figure 15B:
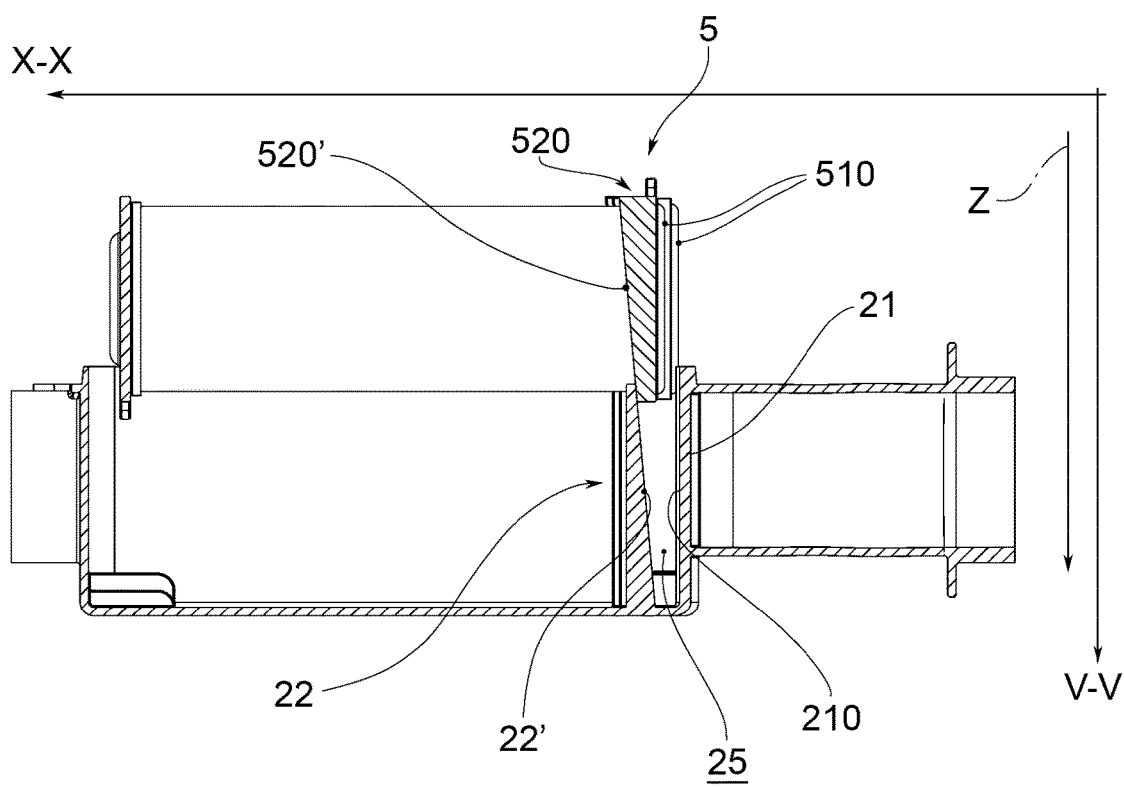
Figure 15C:
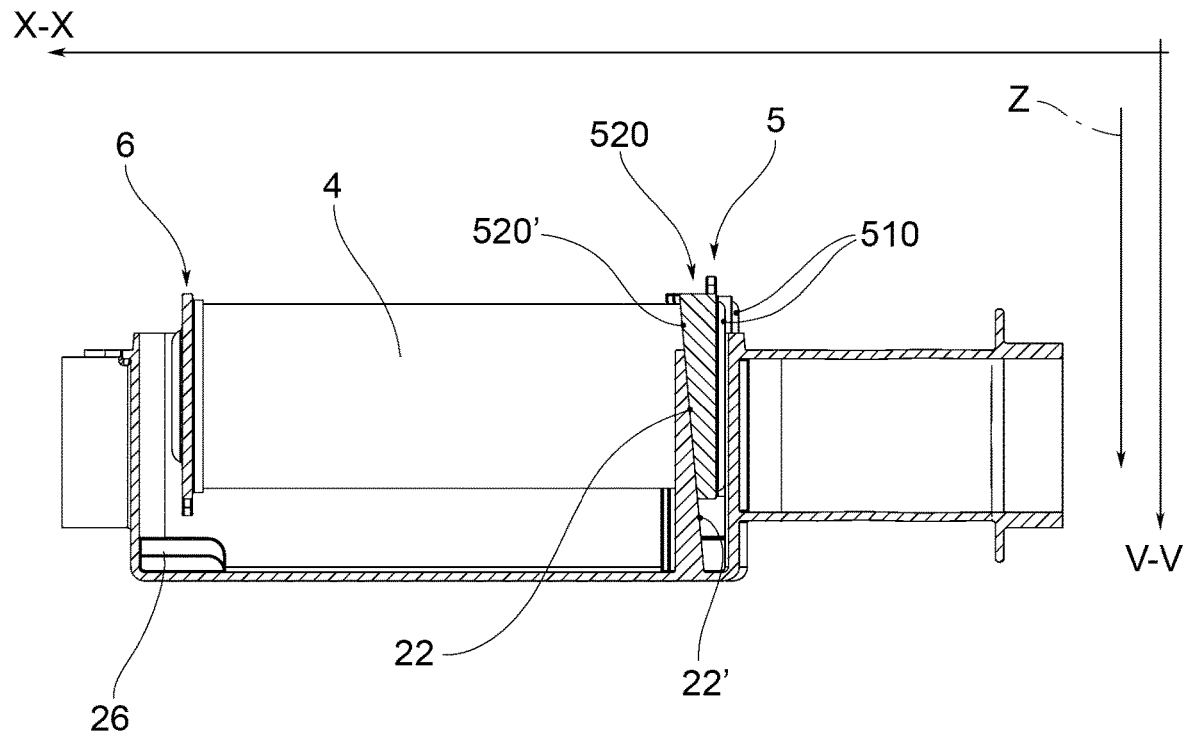
Figure 15D:
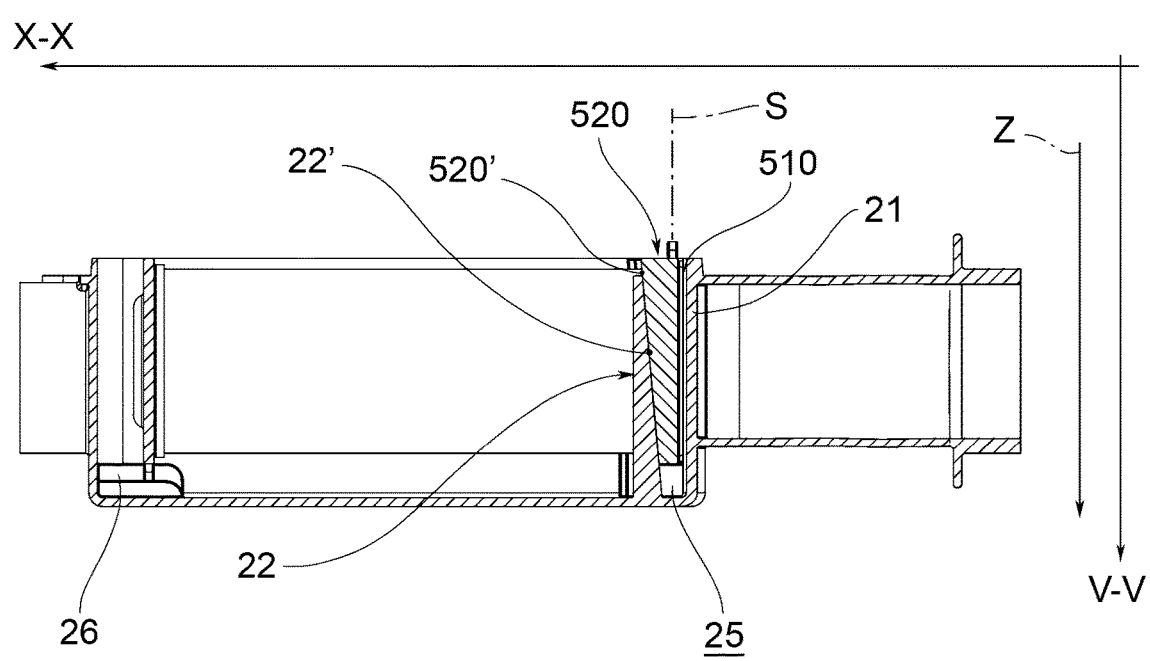
Figure 15E:
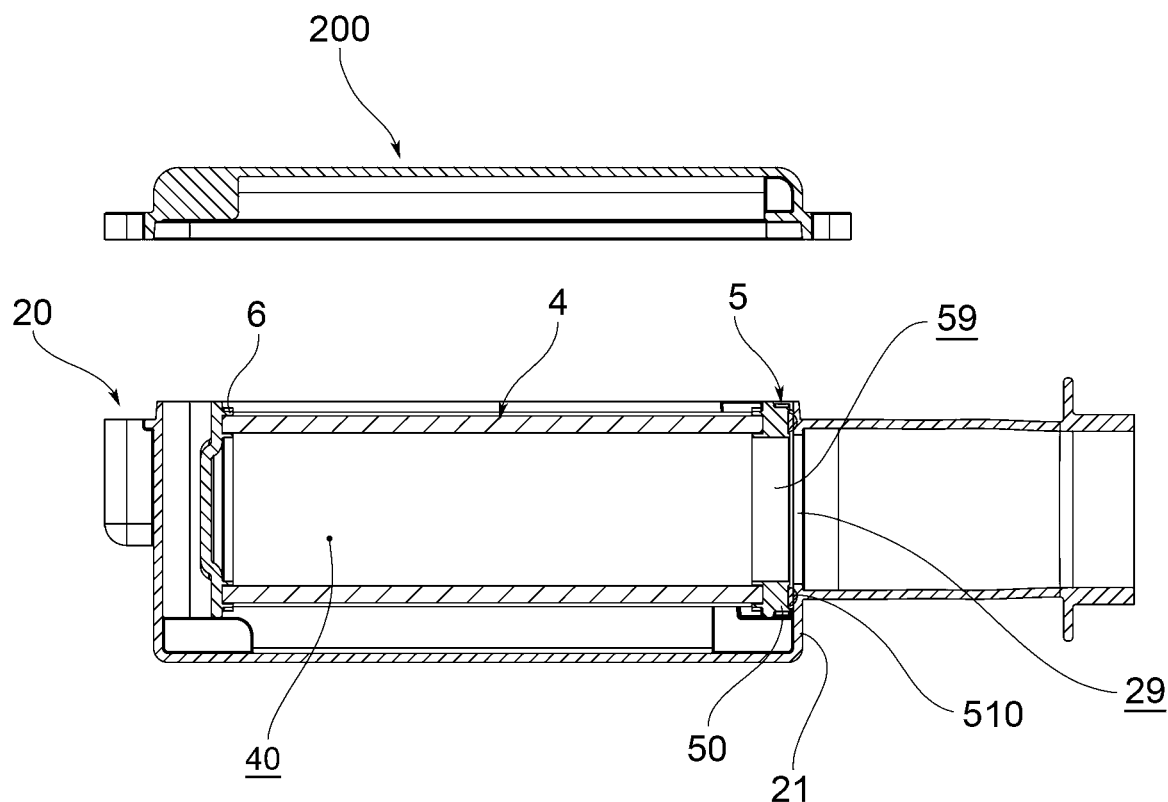
Figure 15F:
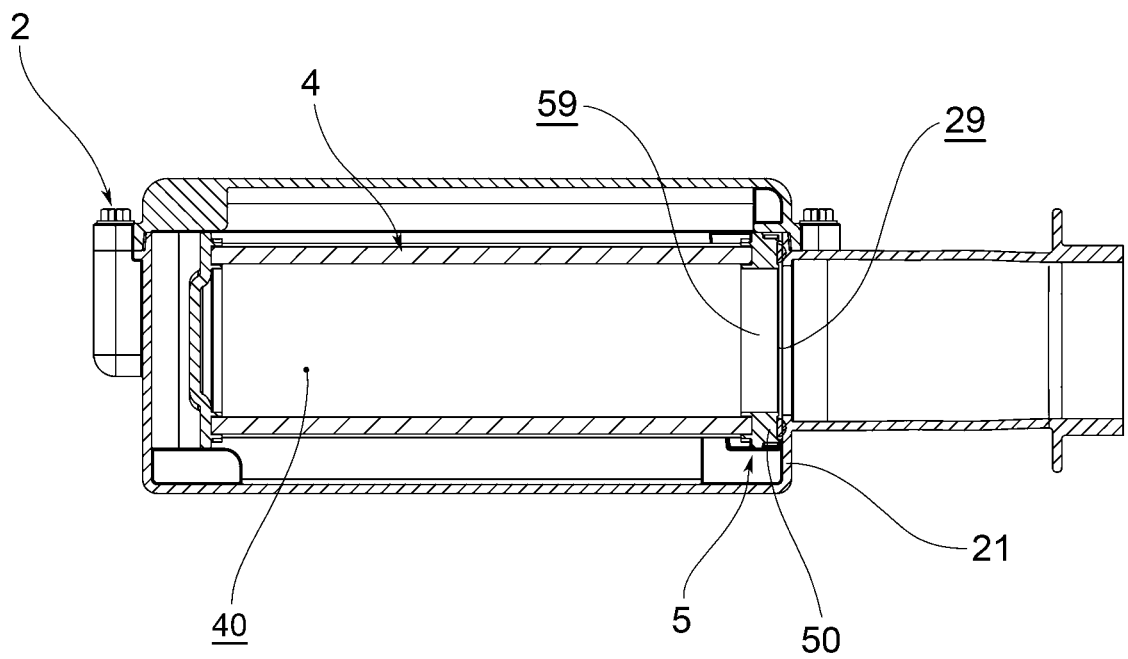
Figure 17A:
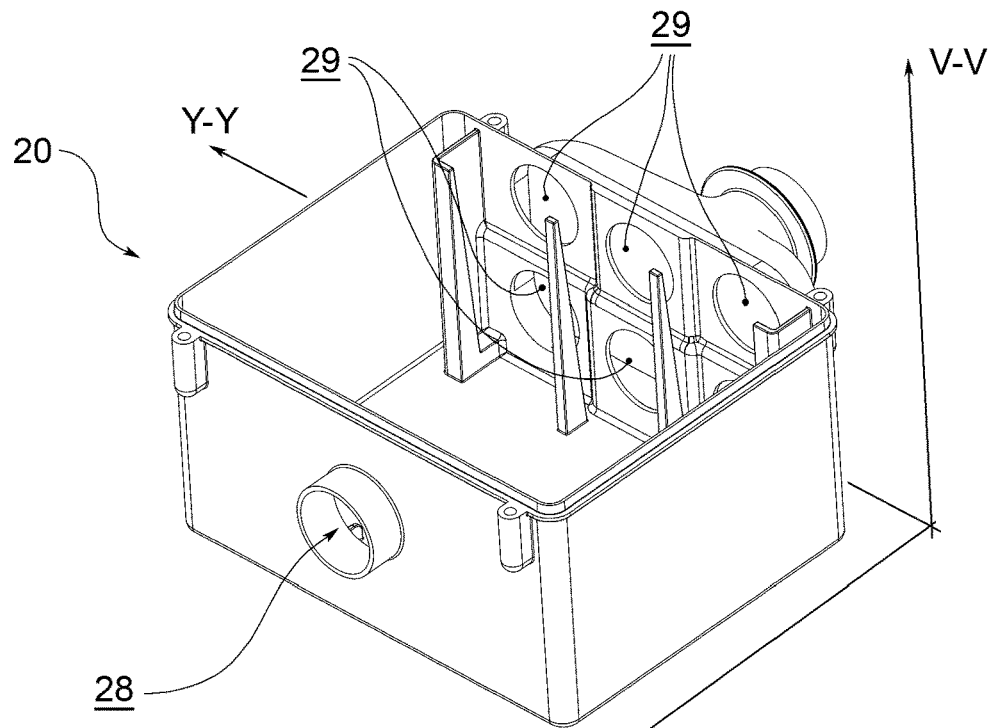
FIGS. 17a and 17b illustrate two perspective views of a box, in particular of a container, comprised in the air filtration assembly as in FIGS. 16a and 16b.
Figure 17B:
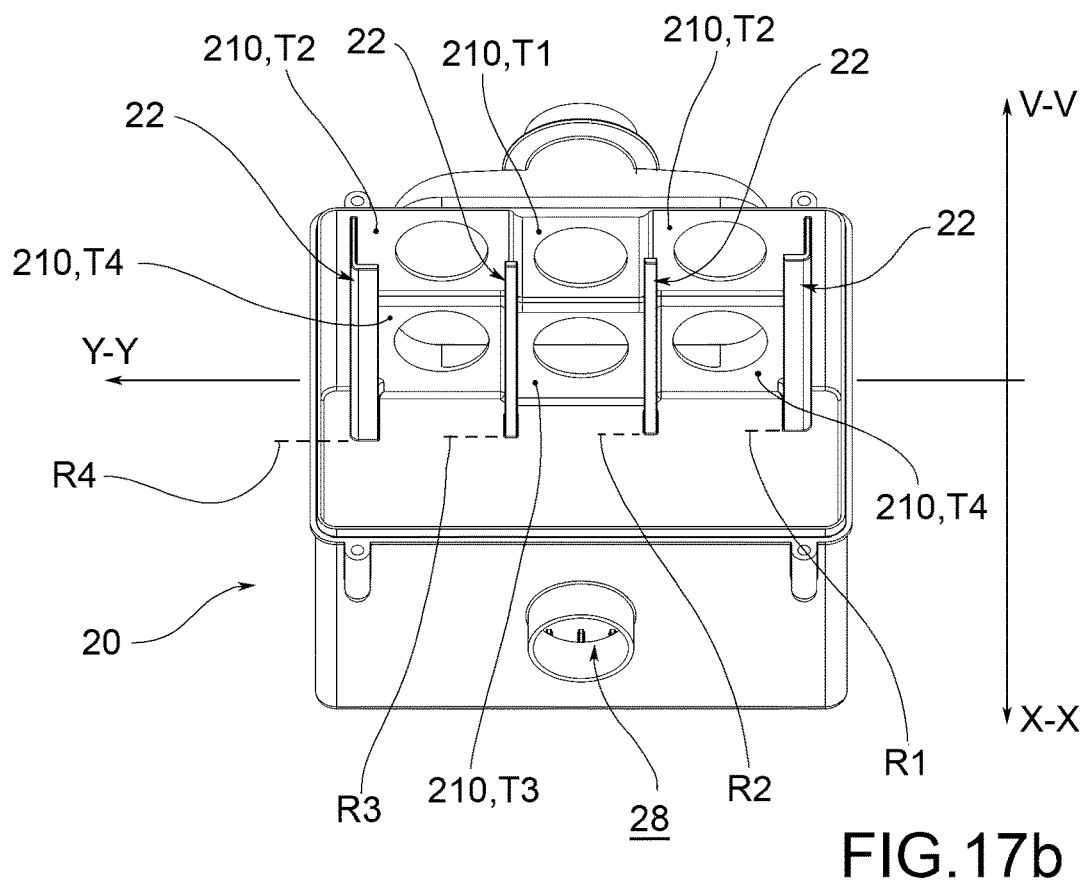
Figure 18A:
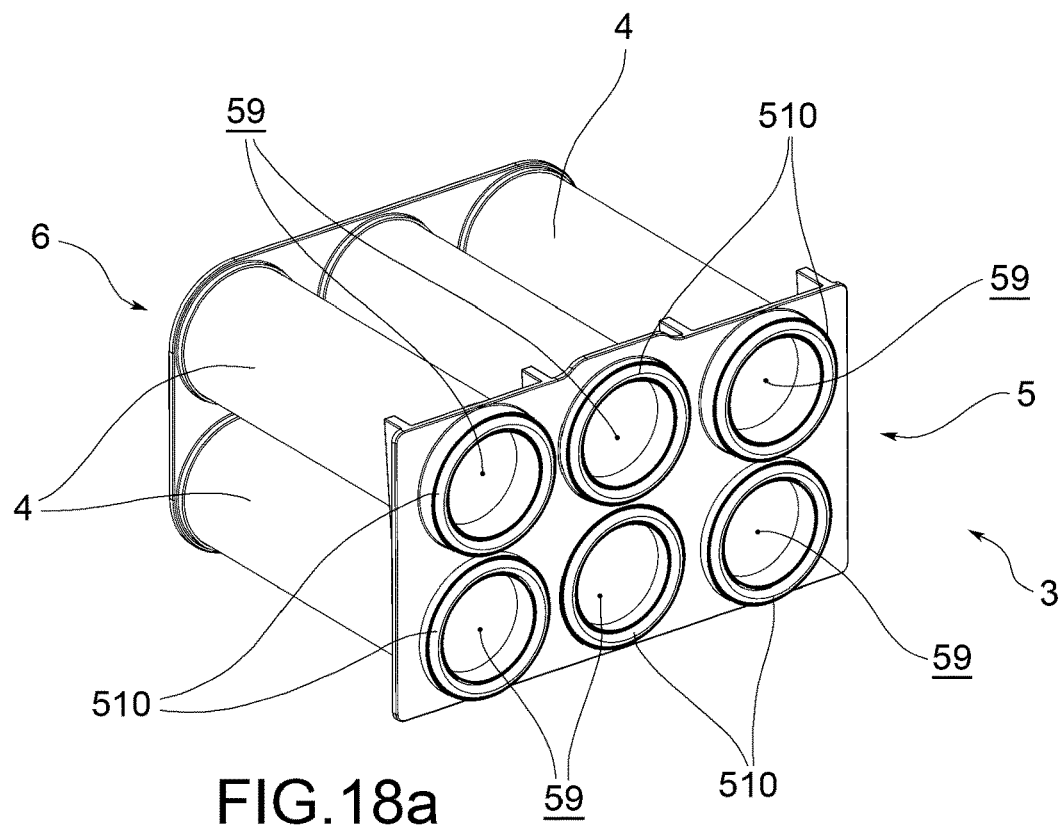
FIGS. 18a and 18b represent two perspective views of a filter cartridge comprised in the air filtration assembly as in FIGS. 16a and 16b, according to a preferred embodiment.
Figure 18B:
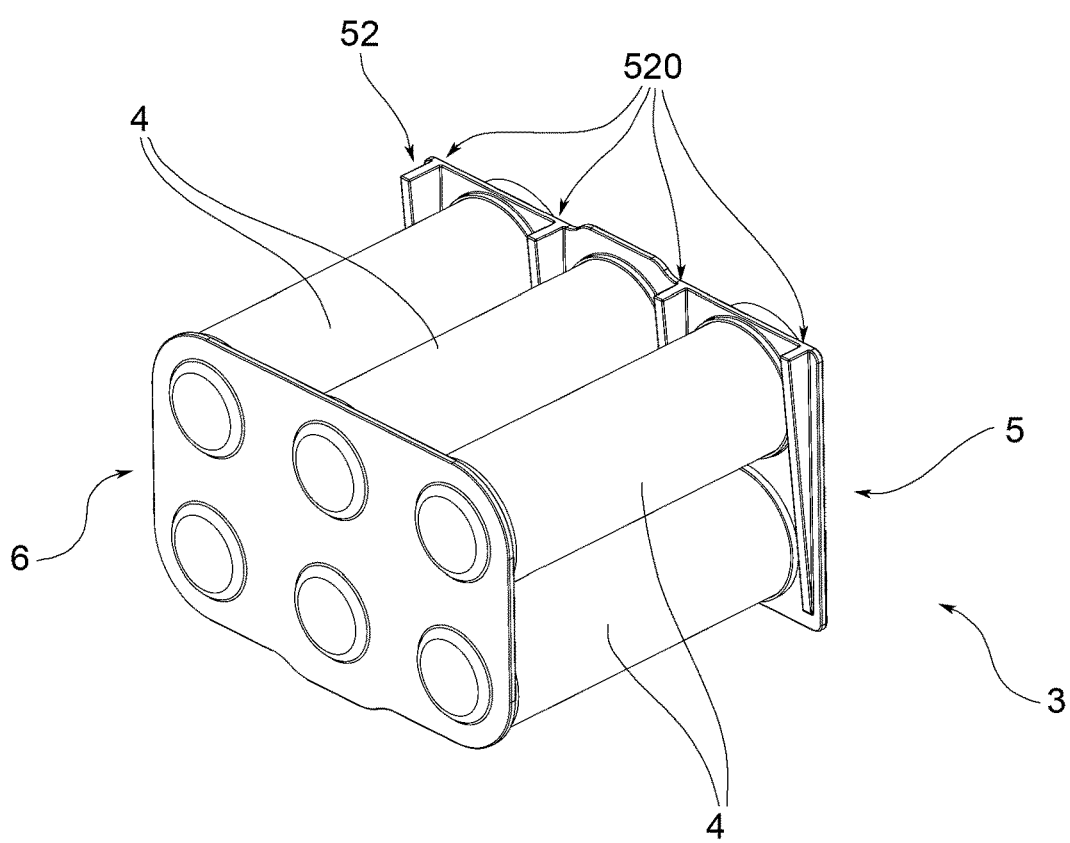
Figure 19A:
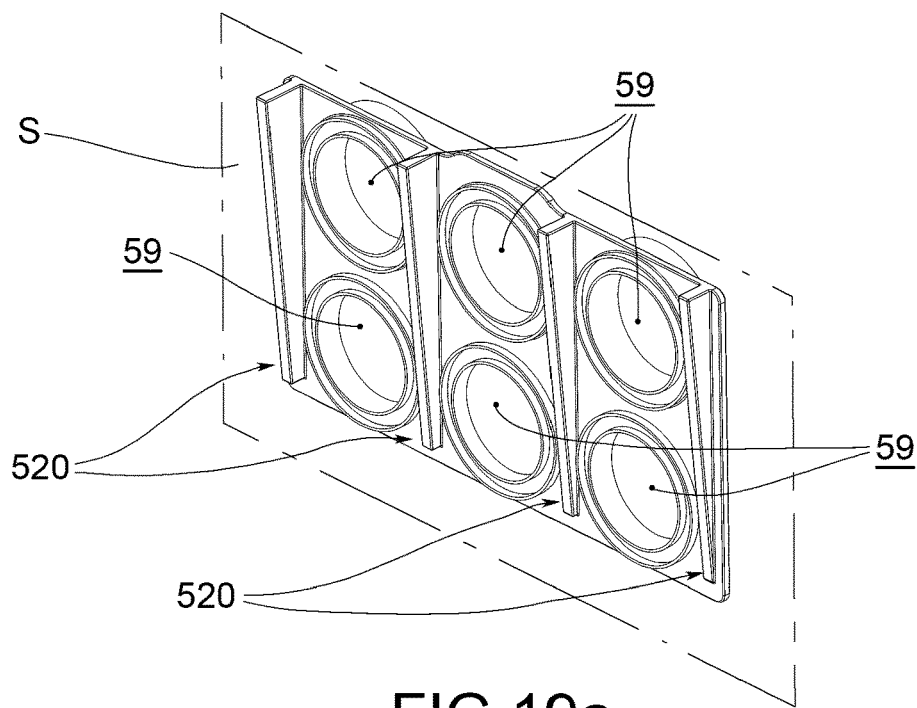
FIGS. 19a, 19b, 19c, show a perspective view, a top view and a side view of a plate group comprised in the filter cartridge in FIGS. 18a and 18b.
Figure 19B:
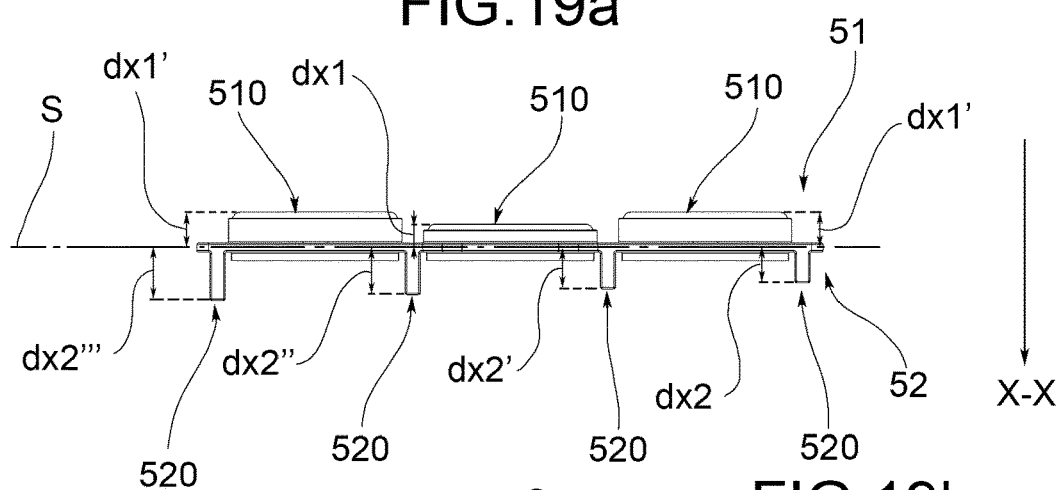
Figure 19C:
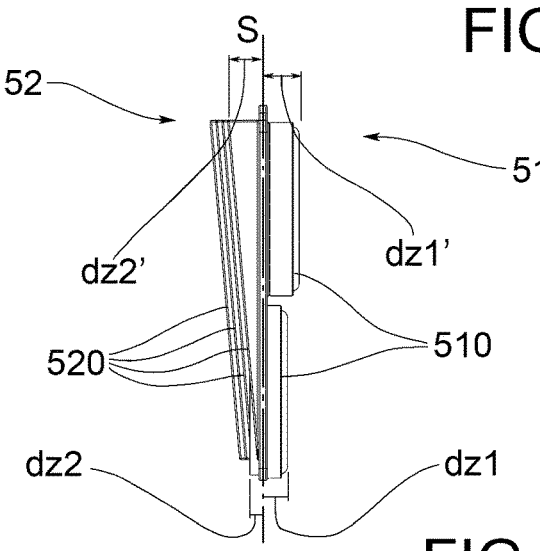
Figure 20A:
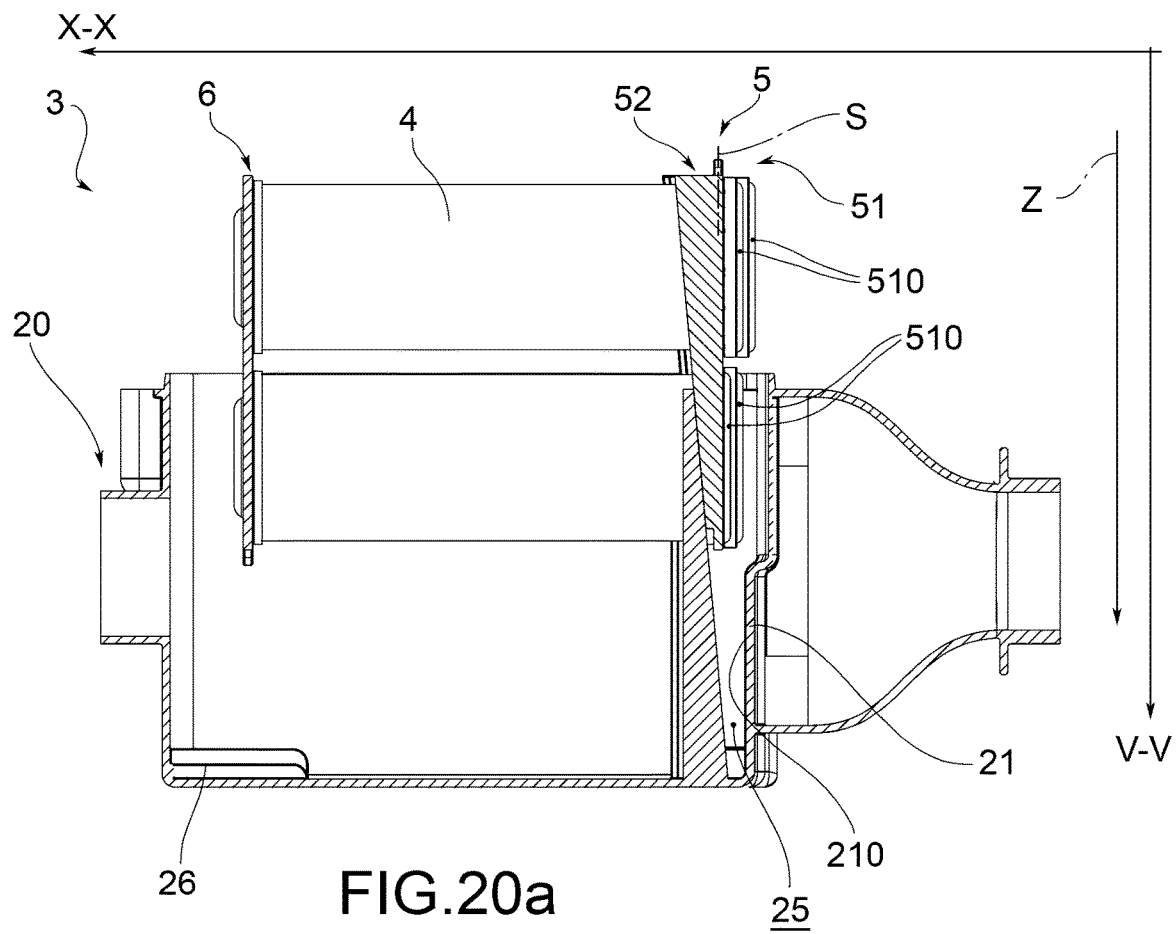
FIGS. 20a, 20b, 20c, 20d, 20e, 20f, represent longitudinal cross-sections of the air filtration assembly, in different stages of assembly.
Figure 20B:
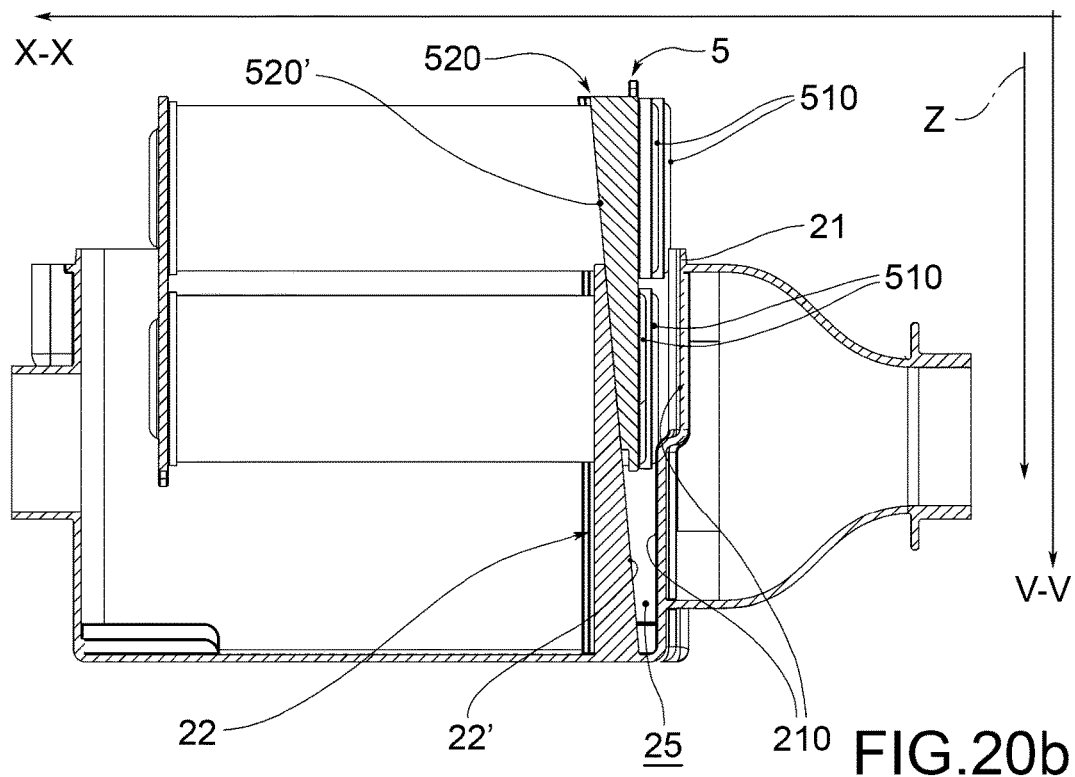
Figure 20C:
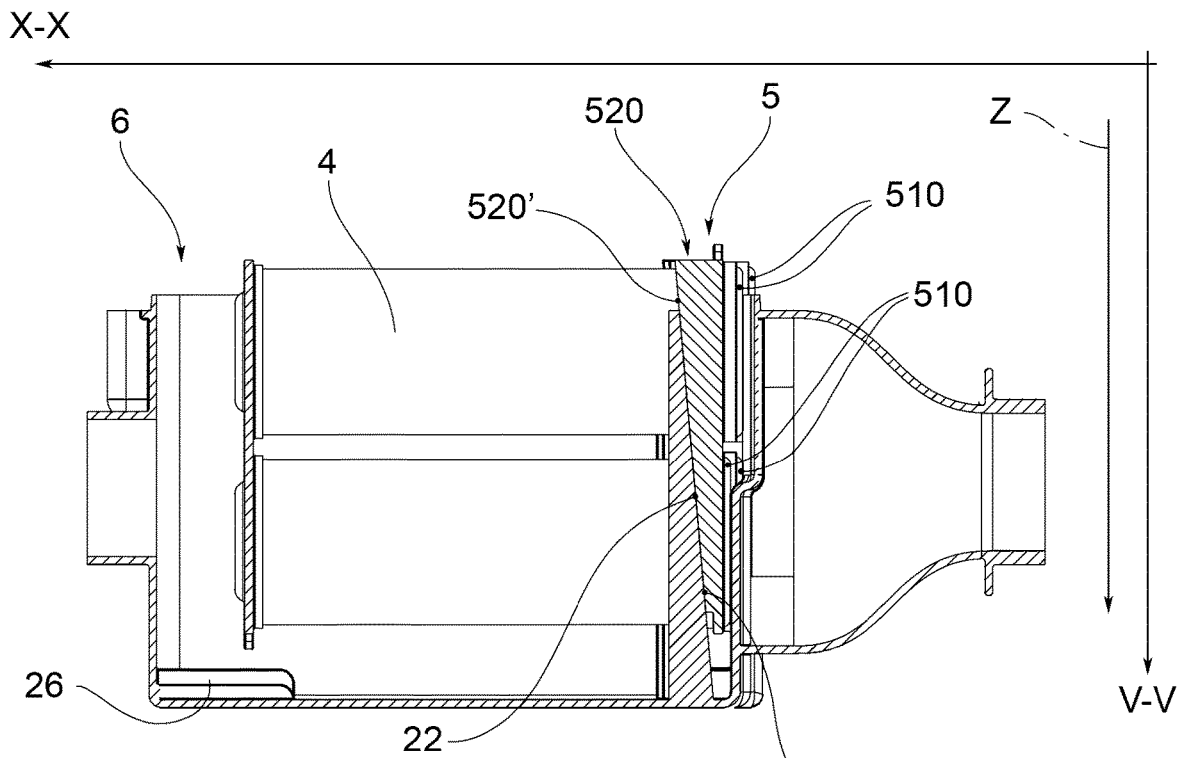
Figure 20D:
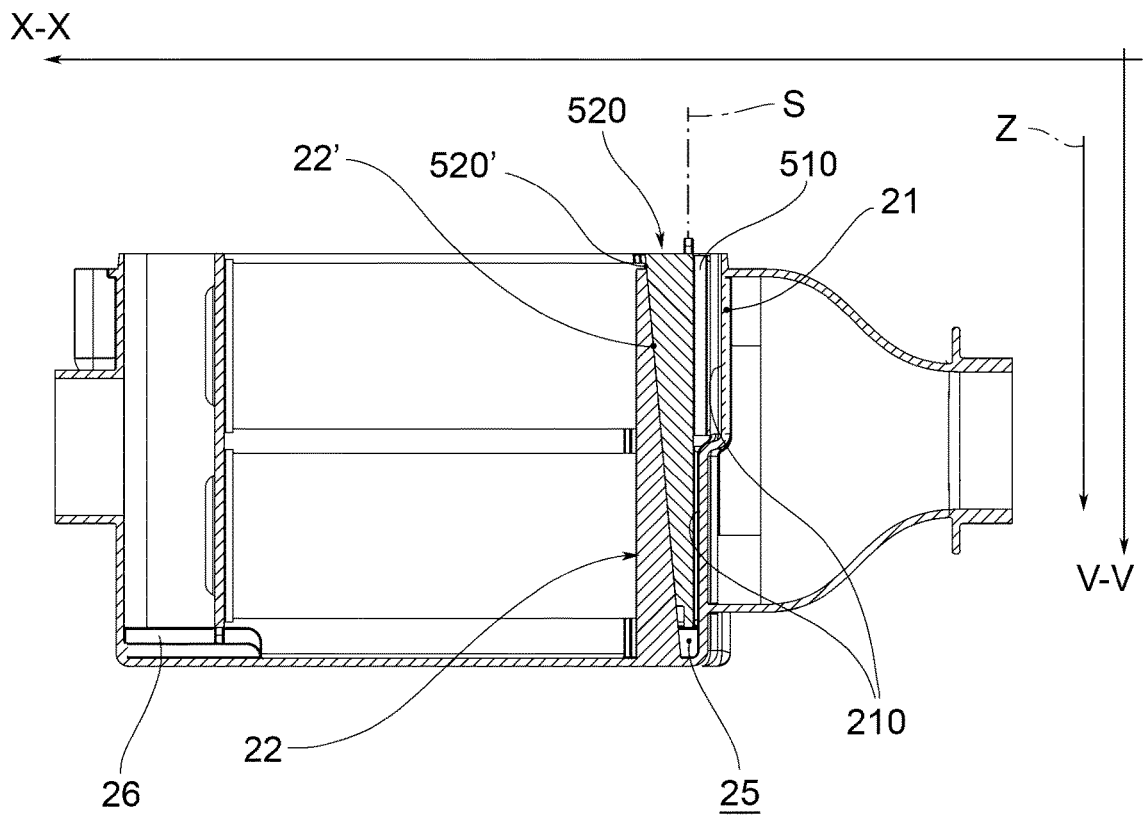
Figure 20E:
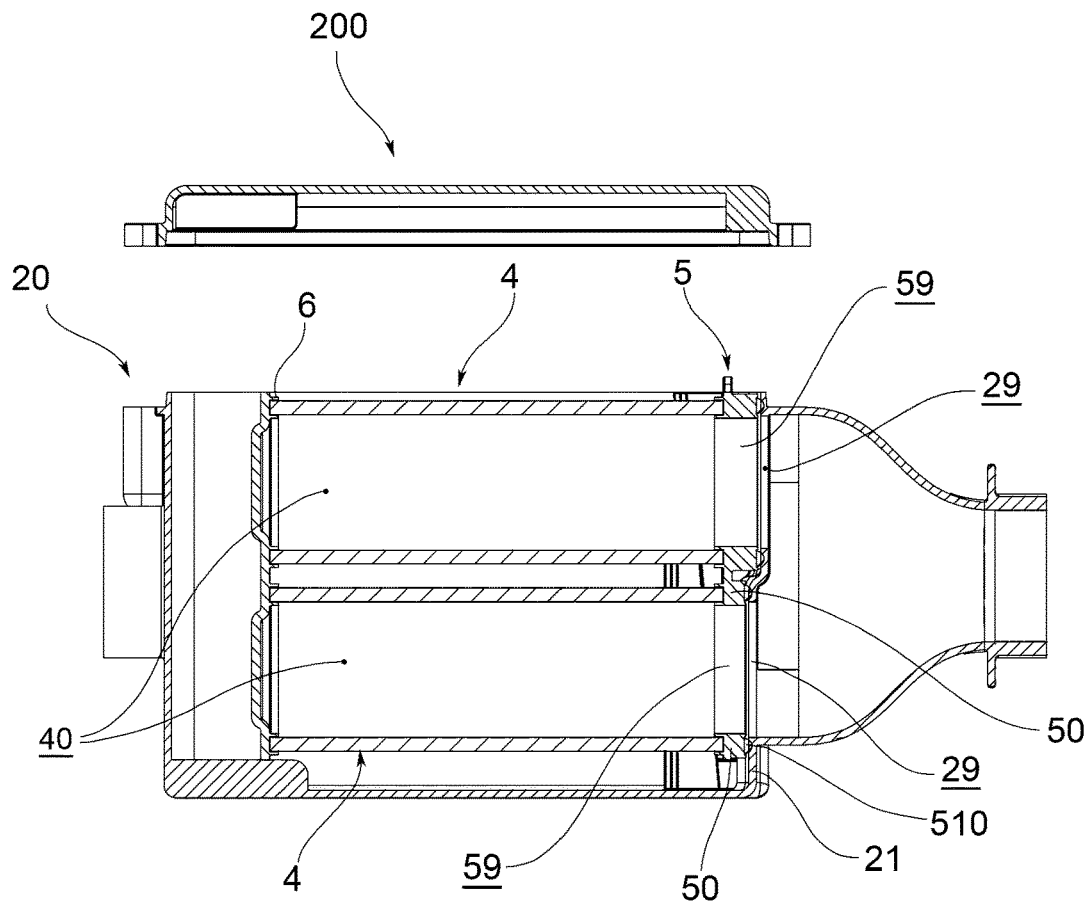
Figure 20F:
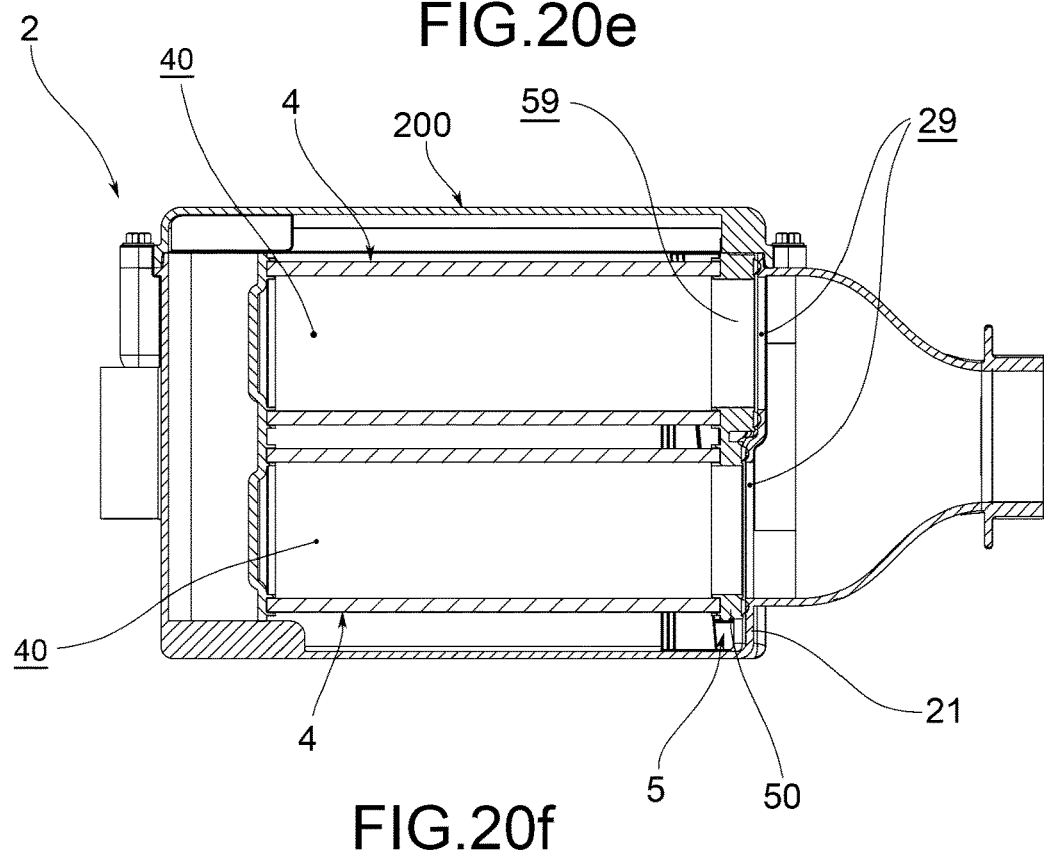
Figure 22A:
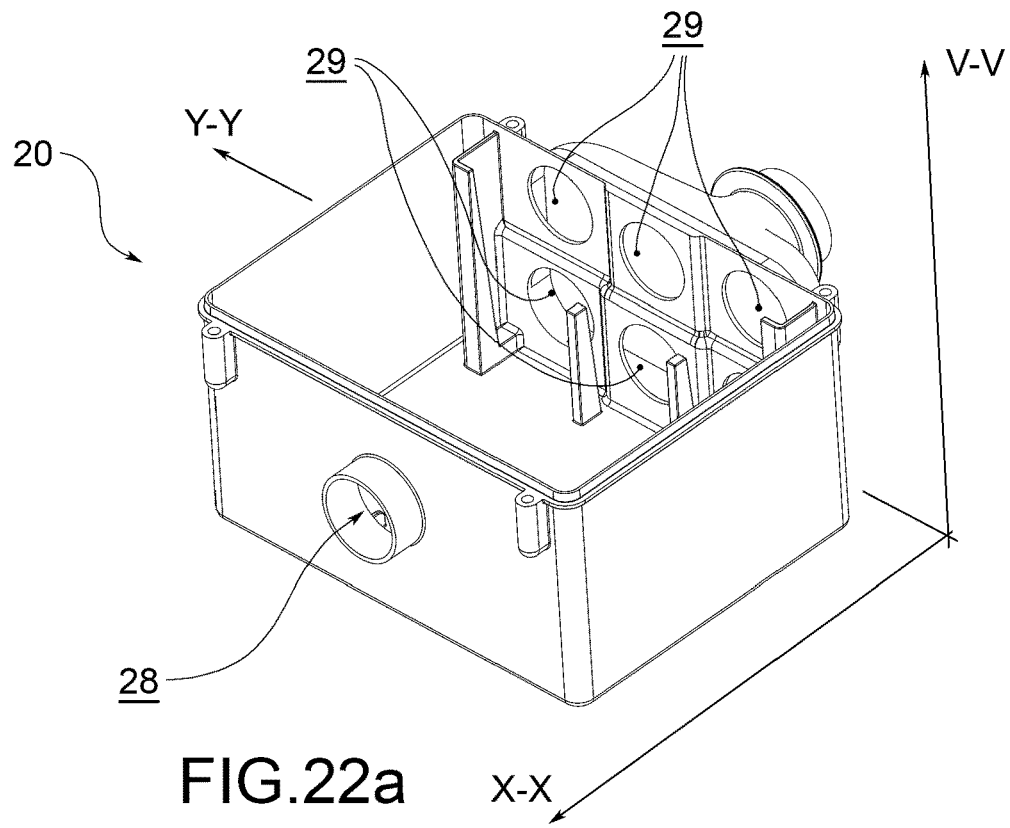
FIGS. 22a and 22b illustrate two perspective views of a box, in particular of a container, comprised in the air filtration assembly as in FIGS. 21a and 21b.
Figure 22B:
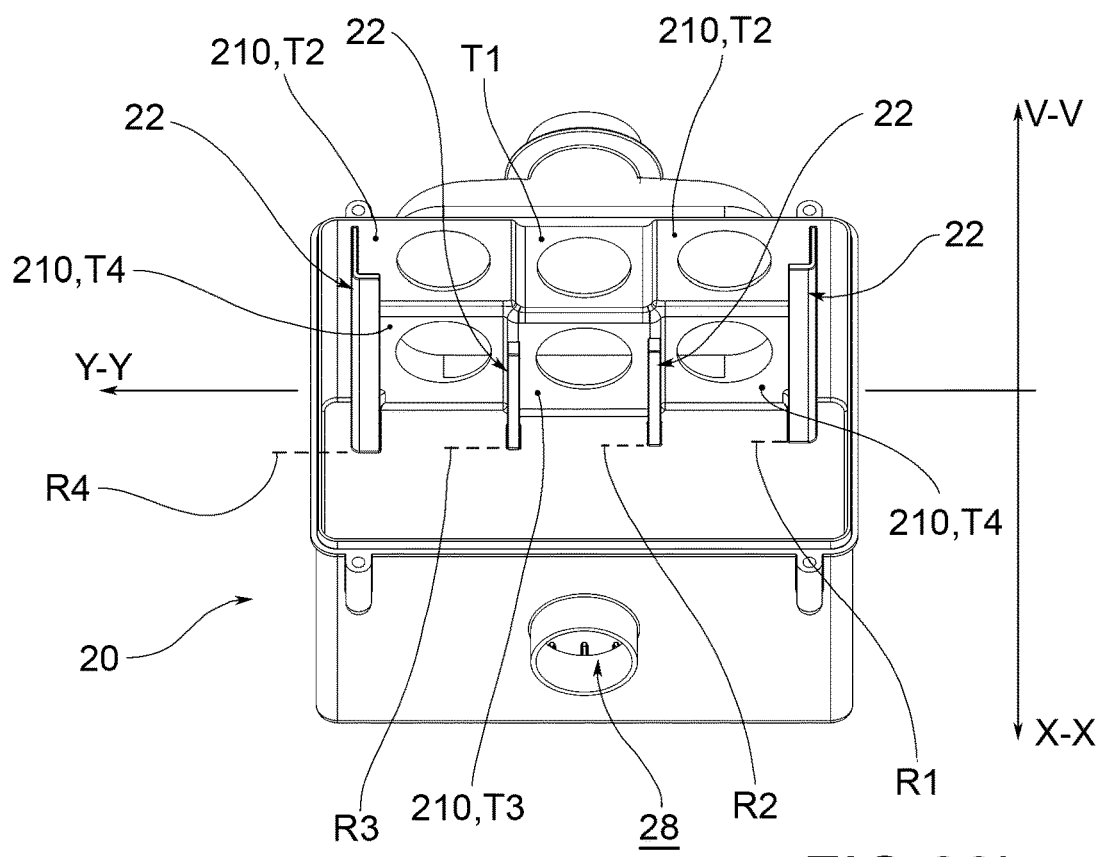
Figure 23A:
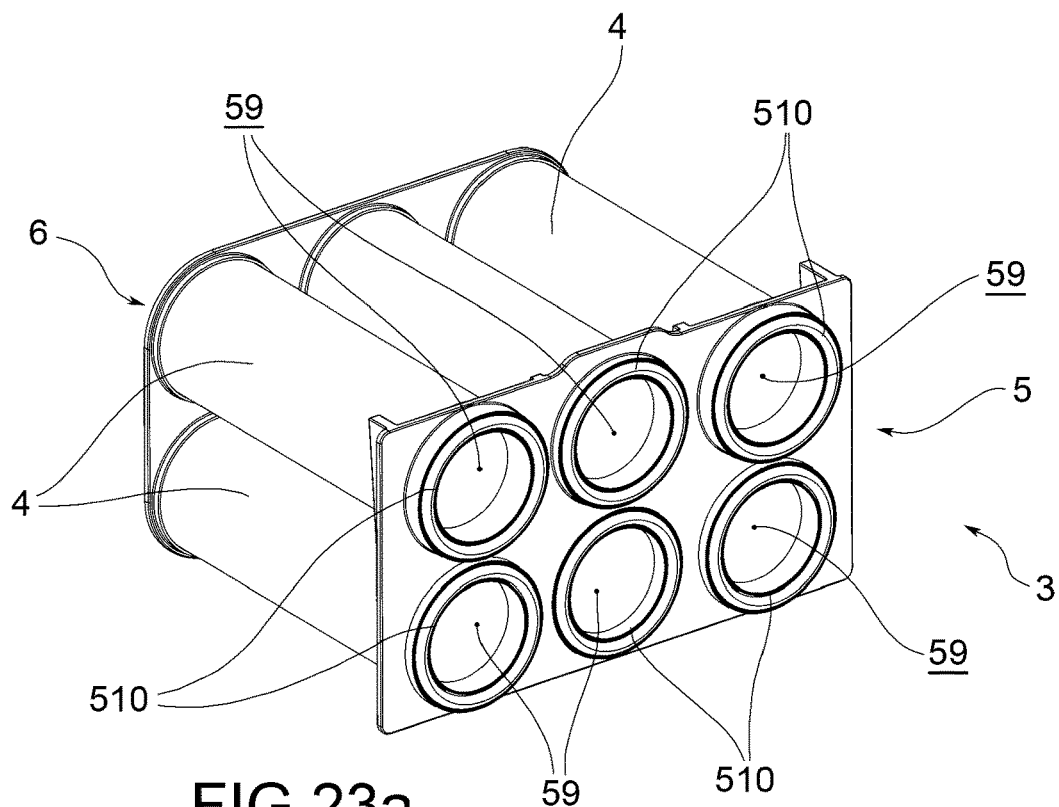
FIGS. 23a and 23b represent two perspective views of a filter cartridge comprised in the air filtration assembly as in FIGS. 21a and 21b, according to a preferred embodiment.
Figure 23B:
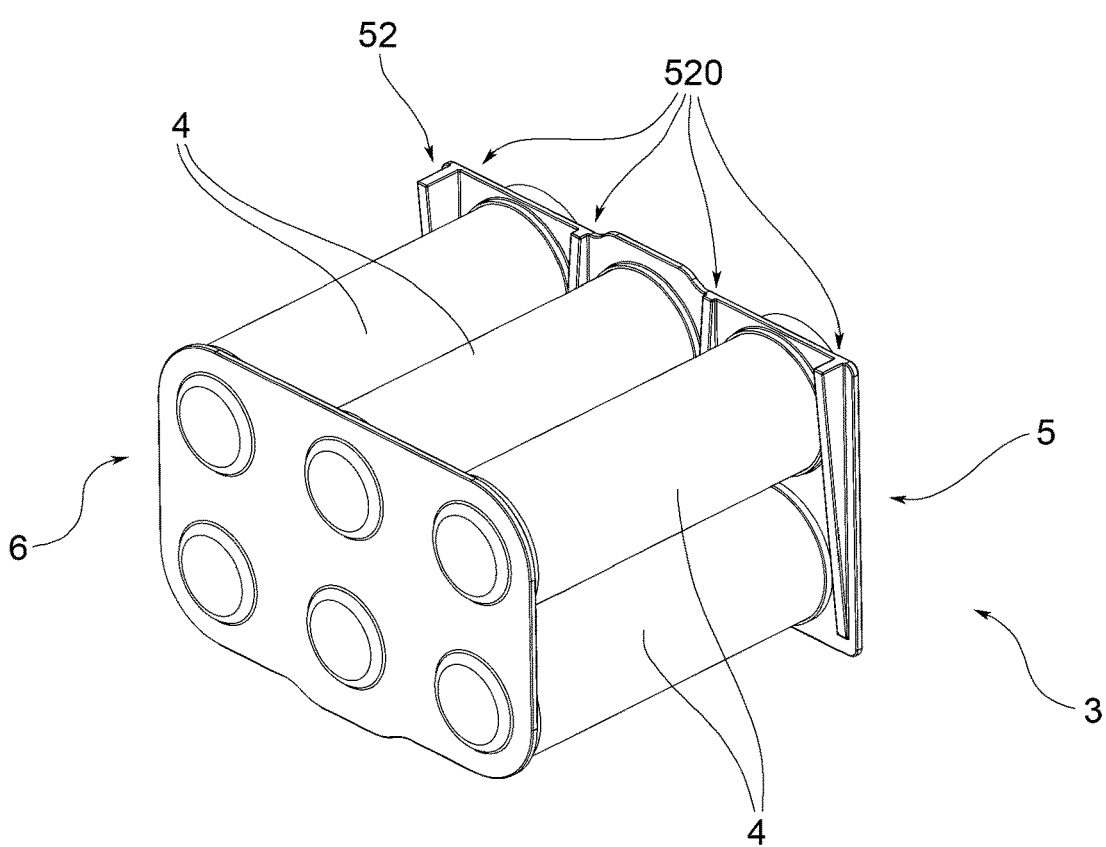

In addition, according to a preferred embodiment, the end contact profiles are at different longitudinal distances from each other, but at the same time at different longitudinal distances from the at least one central contact profile as shown for example in FIGS. 14*b* and 19*b*).

In the appended drawings, some of the preferred embodiment variants are shown as examples. In particular, reference is made to the figures showing the top and side views of the plate group 5 i.e. FIGS. 4*b*, 4*c*, 9*b*, 9*c*, 14*b*, 14*c*, 19*b*, 19*c*, 24*b*, 24*c*, 29*b*, 29*c*, but as amply described, the housing region 25 has a complementary shape, as shown in the specific figures showing the box 2.

These variants show specific preferred embodiments, with specific shapes and/or positioning of the sealing profiles and contact profiles.

In such embodiment variants shown, in the top views, it can be seen how the sealing profiles and/or contact profiles are at variable distances from the imaginary extension plane S. In other words, even if the plate group 5 is sectioned orthogonally to the imaginary extension plane S parallel to the longitudinal axis X-X, orthogonally to the insertion direction Z, the shape and/or position of the sealing profiles and contact profiles is mutually variable in said longitudinal direction.

Figure 4A:
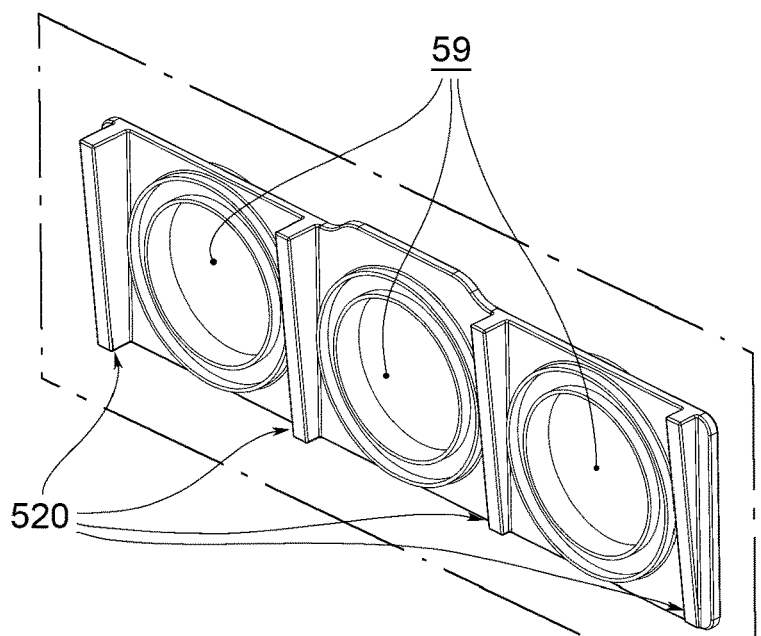
FIGS. 4a, 4b, 4c, show a perspective view, a top view and a side view of a plate group comprised in the filter cartridge in FIGS. 3a and 3b.
Figure 4B:
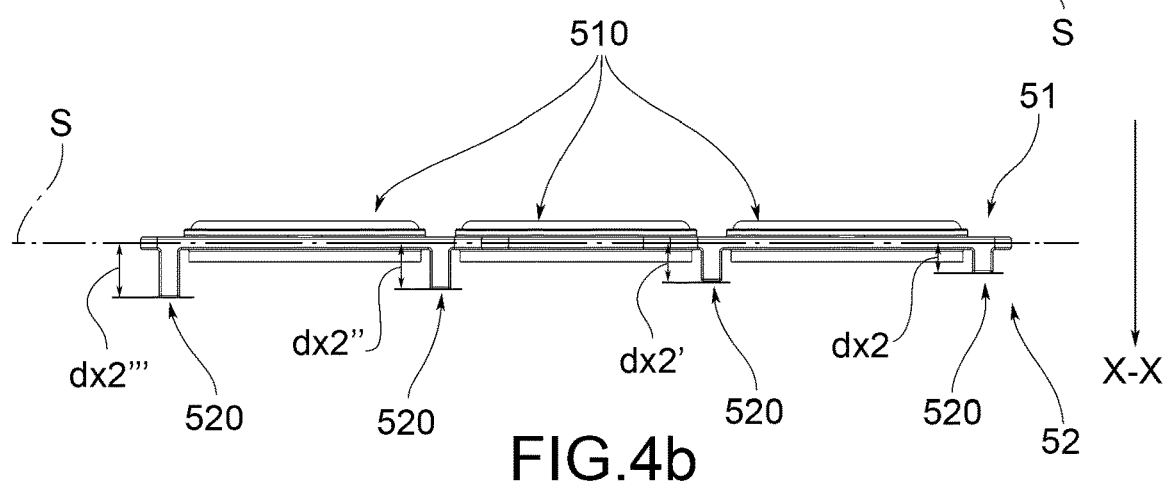

In some of these embodiments, the sealing profiles 510 extend on an imaginary plane planar and parallel to the imaginary extension plane S, while at least two contact elements 520 are reciprocally positioned at different longitudinal distances from the imaginary extension plane (as for example in FIG. 4*b*).

In some of said embodiments, in the side views, it can be seen how the sealing profiles and/or contact profiles are at variable distances from the imaginary extension plane S. In other words, even if the plate group 5 is sectioned orthogonally to the imaginary extension plane S parallel to the longitudinal axis X-X and parallel to the insertion direction Z, the shape and/or position of the sealing profiles and contact profiles is variable in said insertion direction.

Figure 4C:
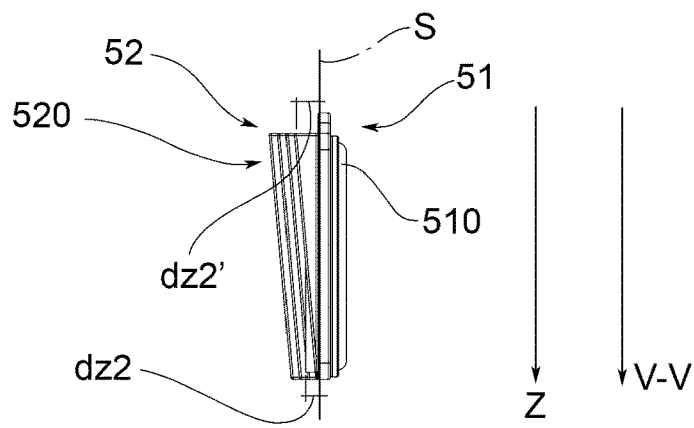
Figure 5A:
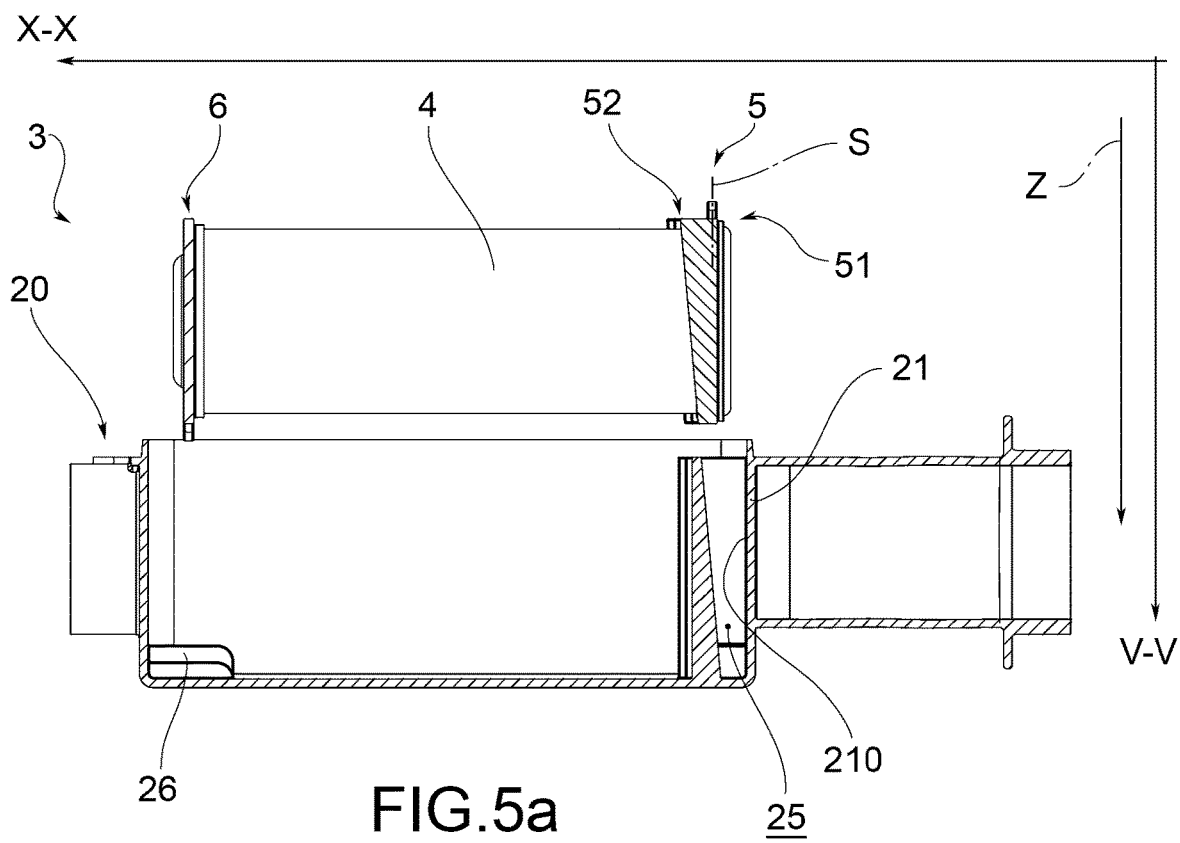
FIGS. 5a, 5b, 5c, 5d, 5e, 5f, represent longitudinal cross-sections of the air filtration assembly, in different stages of assembly.
Figure 5B:
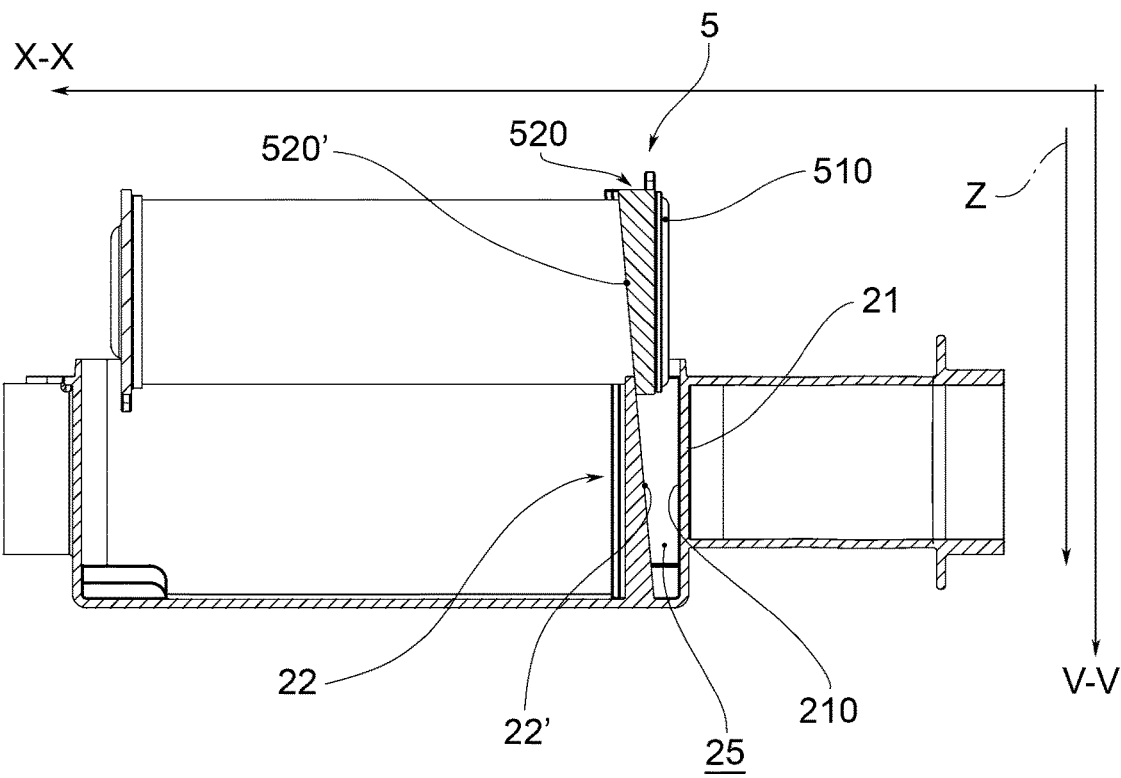
Figure 5C:
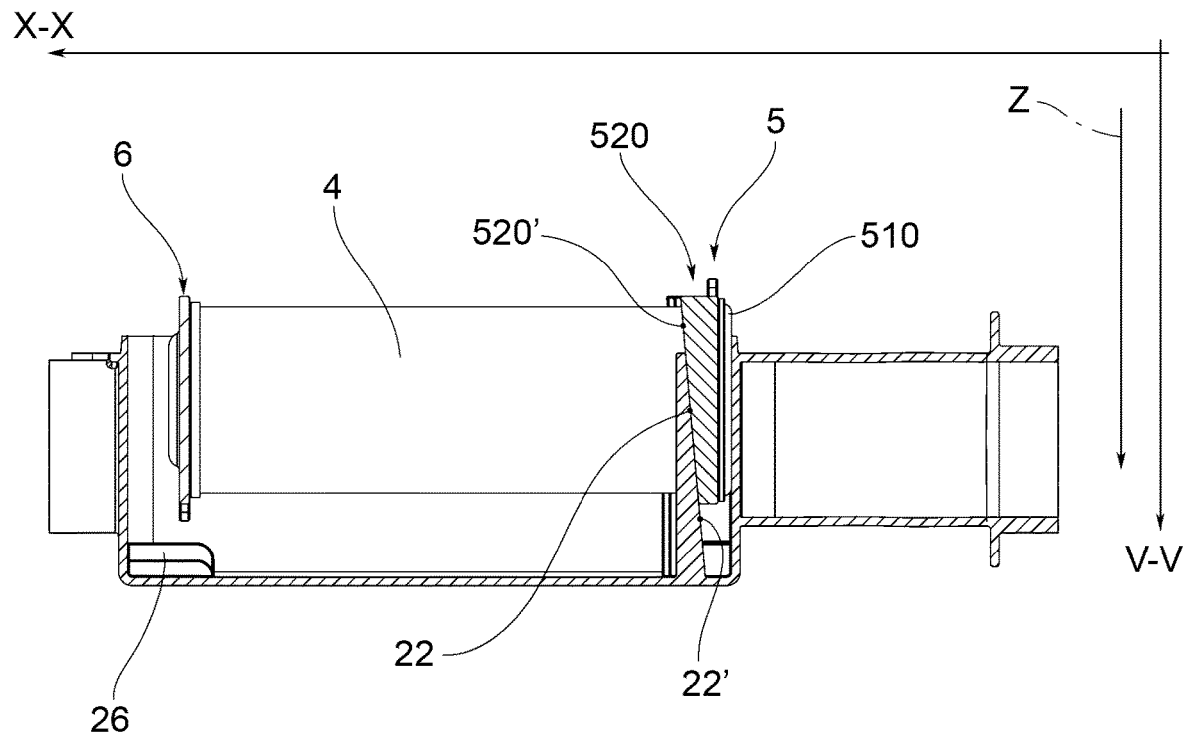
Figure 5D:
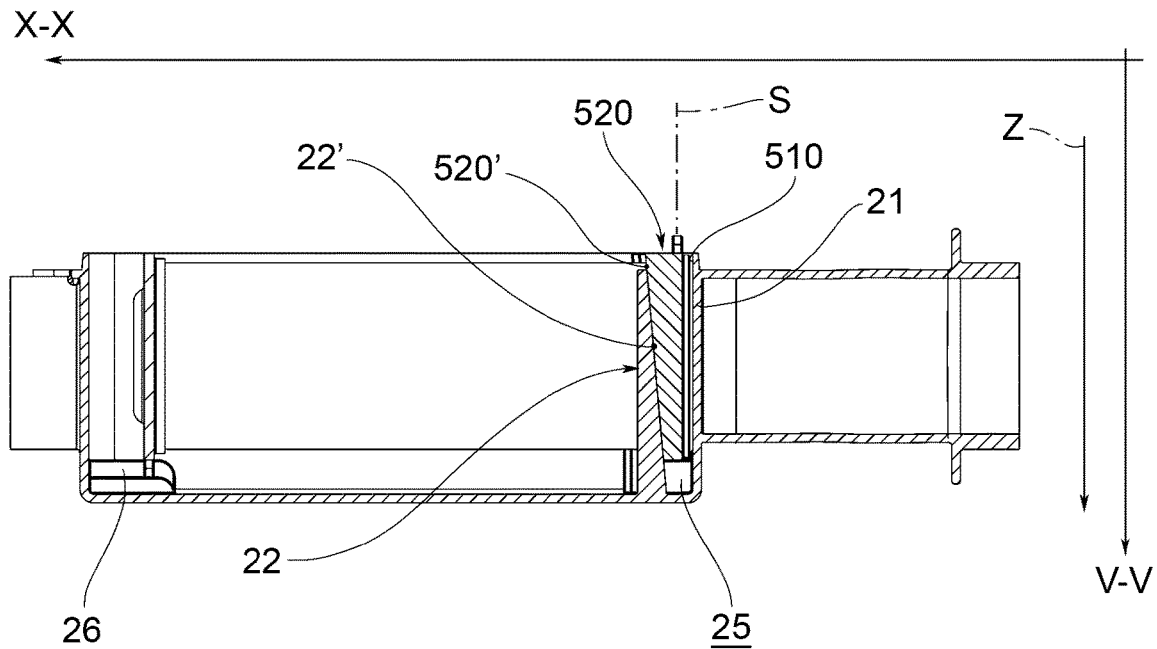
Figure 5E:
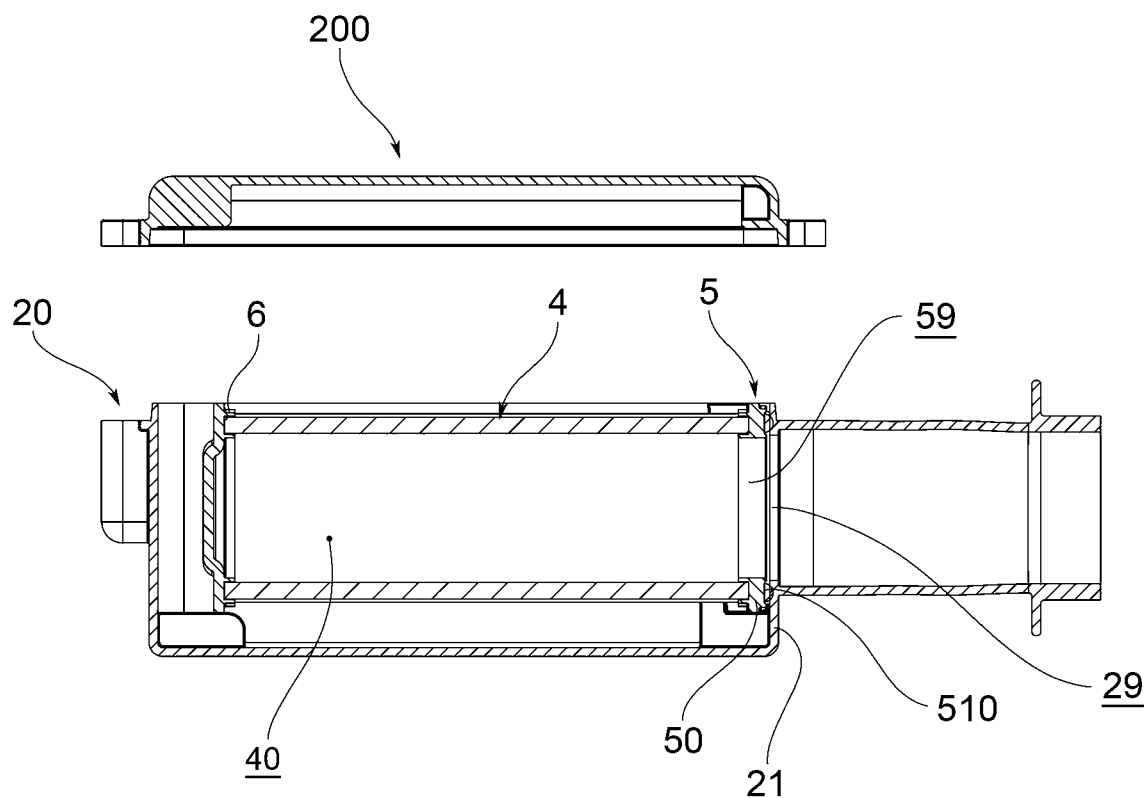
Figure 5F:
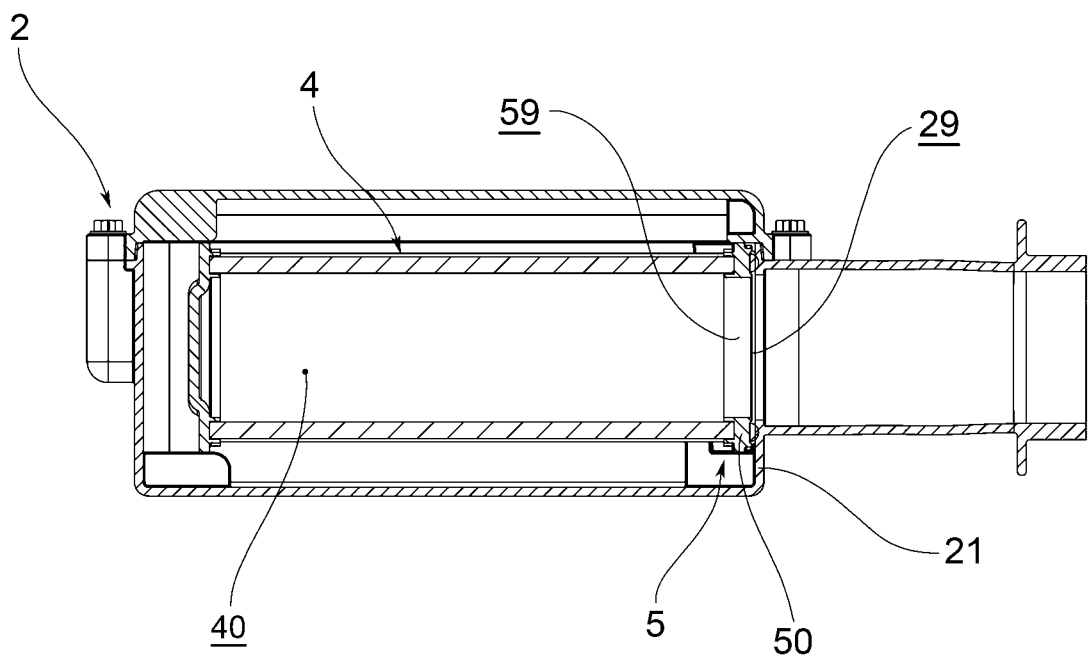
Figure 9A:
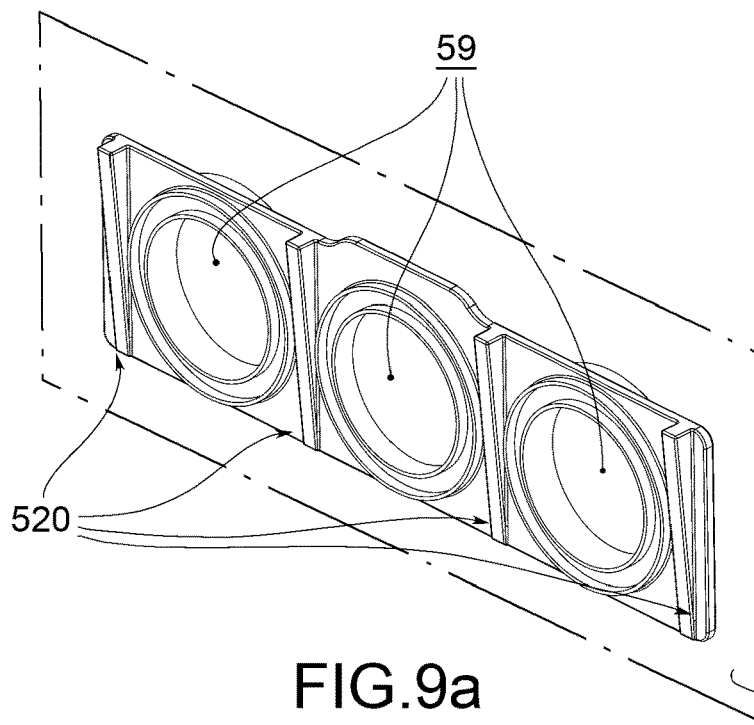
FIGS. 9a, 9b, 9c, show a perspective view, a top view and a side view of a plate group comprised in the filter cartridge in FIGS. 8a and 8b.
Figure 9B:
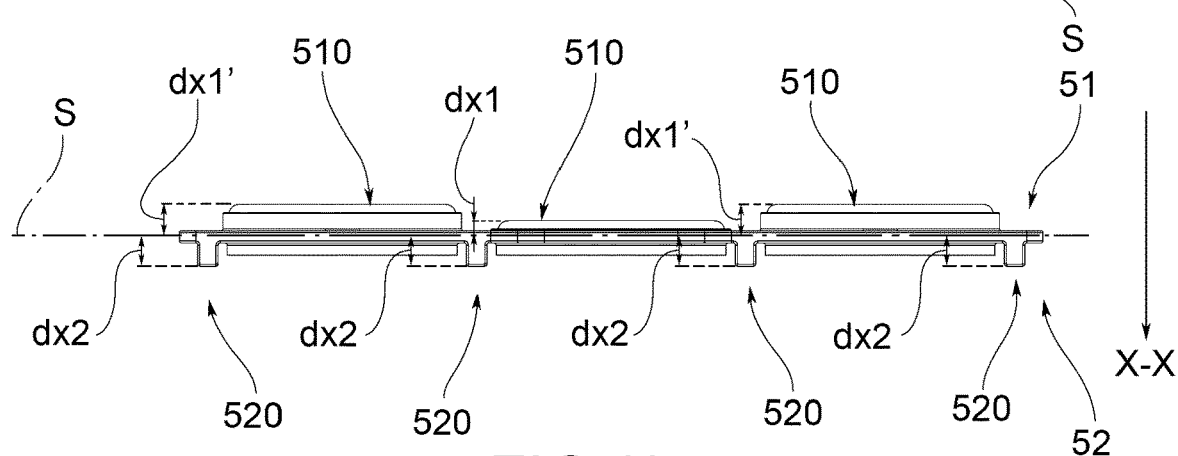
Figure 9C:
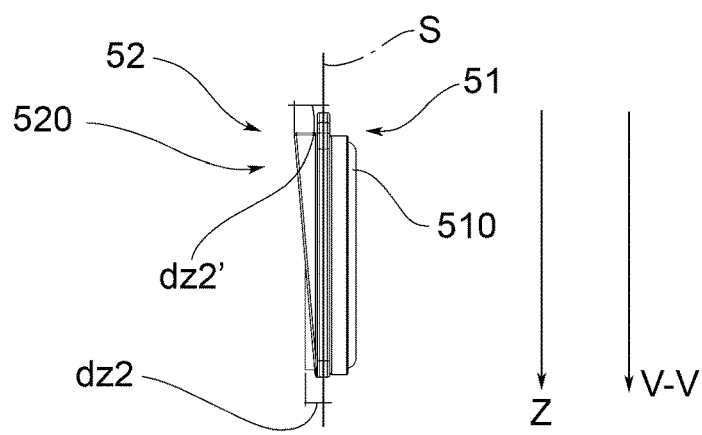
Figure 10C:
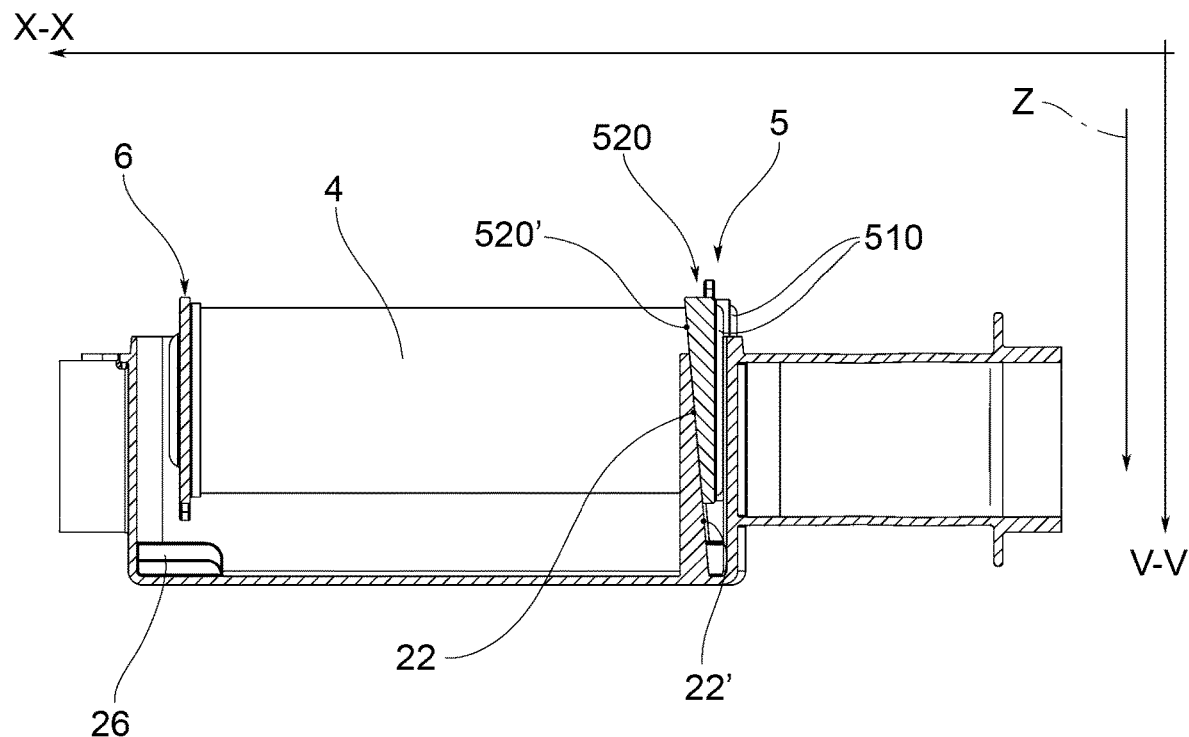
Figure 10D:
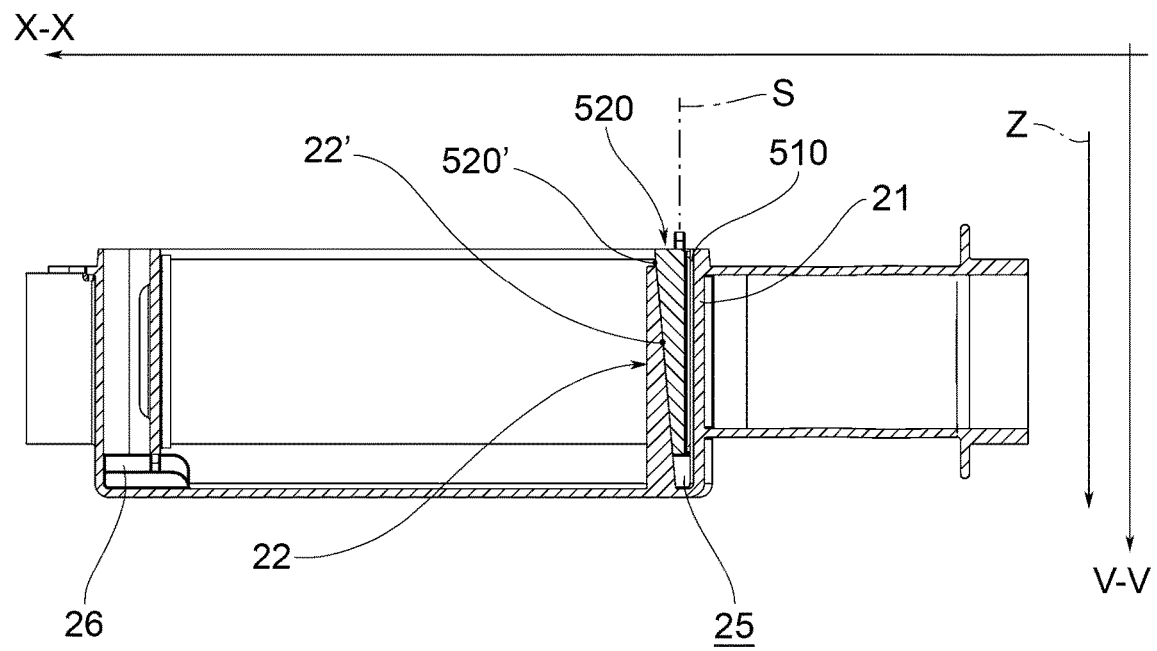
Figure 10E:
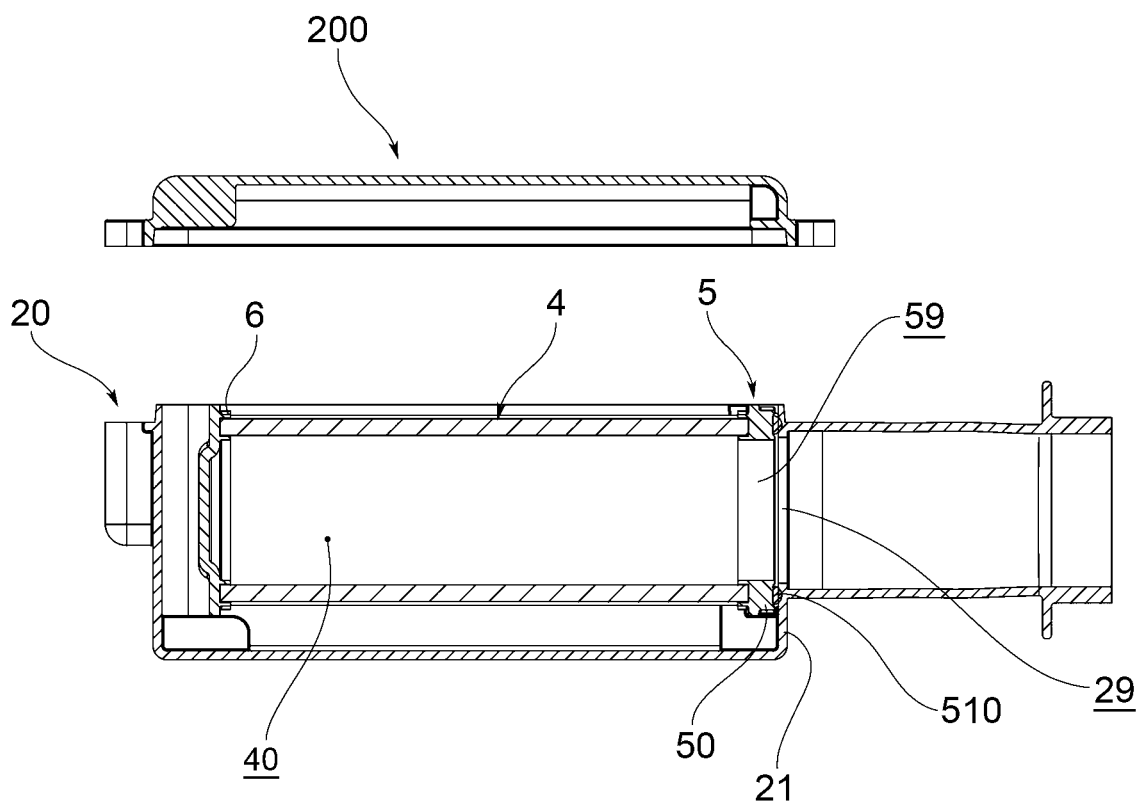
Figure 10F:
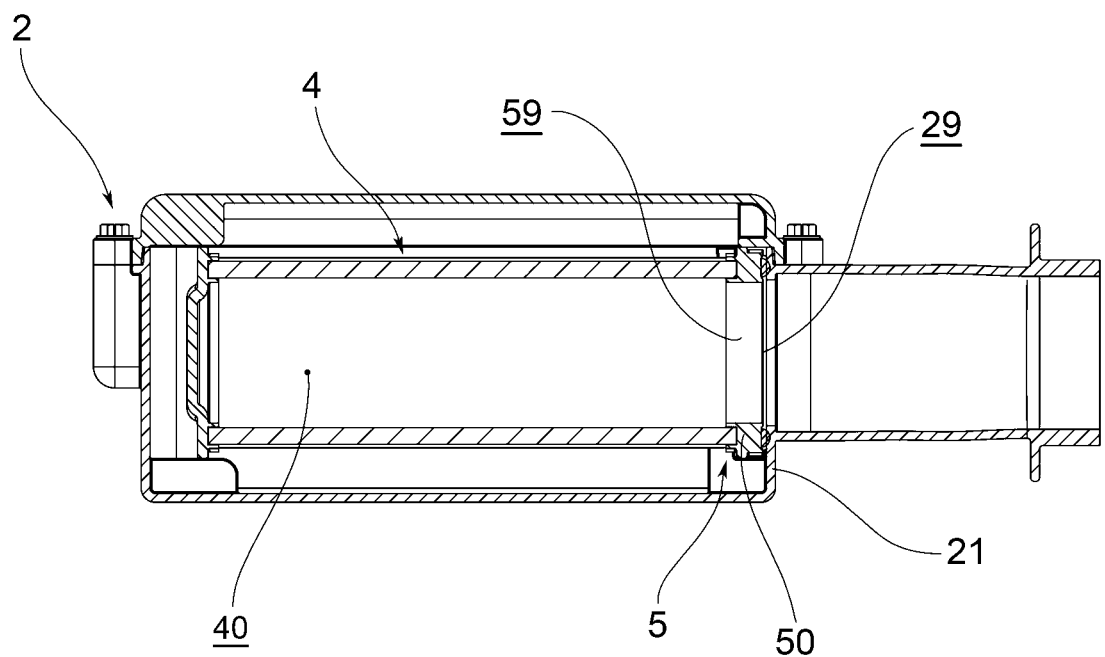

In some embodiment variants, the sealing profiles 510 extend on an imaginary plane planar and parallel to the imaginary extension plane S, while the contact elements 520 are shaped with an inclined profile so as to identify different longitudinal distances from the imaginary extension plane (as for example in FIG. 4*c*).

In other embodiment variants, the sealing profiles 510 lie parallel to the insertion axis and extend over different imaginary planes. Preferably, also in such variants the contact elements 520 are specially shaped.

According to some of the preferred embodiments shown, the transversely spaced contact elements 520 have the same shape, i.e. the same inclination (as shown in the appended drawings).

According to some preferred embodiment variants, the transversely spaced contact elements 520 have different shapes, i.e. different inclinations.

It should be noted that mixed embodiments are also envisaged with respect to those shown in the appended drawings, always in accordance with the aforementioned principles of the present invention, presenting the arrangement of the sealing profiles of one solution and the contact profiles of the other.

Innovatively, the air filtration assembly and the engine air intake system of a vehicle comprising it described above fully absolve the purpose of the present invention overcoming the drawbacks typical of the prior art.

Advantageously, the air filtration assembly guarantees simple and intuitive assembly and disassembly. Advantageously, the assembly and disassembly of the air filtration assembly is guided and foolproof.

Advantageously, the filter cartridge is suitable to be inserted in the box in a single insertion direction only, making the maintenance procedure easier.

Advantageously, the filter cartridge, but in particular its plate group, is suitable to be inserted in a guided manner into the box, in particular in the housing region in such a way as to avoid damage or wear of the sealing profiles, minimizing its friction with the wall and unwanted rubbing.

Advantageously, the maintenance operations are guided and prevent the possibility of unintentional breakage during their execution.

Advantageously, the positioning of the filter cartridge ensures a safe and precise positioning of the sealing profiles and thus a stable, reliable and shock and vibration resistant sealed coupling.

Advantageously, the pushing action of the sealing profiles against the wall is obtained by means of a longitudinal component and a transverse component so that the pushing action is evenly distributed over the plate group.

Advantageously, the contact elements and contact profiles interact with each other in a way as to favour the engagement of the sealing profiles. Advantageously, the contact elements and contact profiles are specially designed to exert uniform thrust/compression of the sealing profiles. Preferably, advantageously, the contact elements and contact profiles perform an effective pushing action even in a central region of the plate group.

Advantageously, the filter cartridge makes effective use of the space available next to the tubular filter media and/or between adjacent tubular media, particularly on the second face of the plate group, to guide the cartridge into the housing region and at the same time create and maintain the thrust of the sealing profiles against the wall. Advantageously, compared to the known filter cartridges belonging to the state of the art, for example comprising panel filter media or cylindrical filter media, the filter cartridge of the present invention is able to realize this function exploiting spaces usually inaccessible and occupied by the filter media.

Advantageously, the cartridge takes advantage of the layout flexibility offered by the tubular media to create an innovative guiding and positioning system.

Advantageously, the contact elements and contact profiles are mutually interacting so as to ensure adequate clamping of the sealing profile(s) throughout the entire extension of the plate group, even in the case of cartridges with multiple tubular media arranged in several rows, and thus larger in size and weight than in the case of cartridges with two tubular filter media.

Advantageously, the filter cartridge is suitable to be installed inside the box by means of a guide/positioning system that can be executed and manoeuvred in small spaces with, for example, vertical or lateral insertion. This effect maximises the use of available space inside the engine compartment and facilitates the installation of the air intake system on the vehicle.

Advantageously, the positioning guide system is very compact allowing an improvement in the exploitation of space inside the box, increasing the usable filtering surface and reducing the pressure drops imposed on the suction circuit by the filtering system.

Advantageously, the filter cartridge keeps the coupling tightly sealed by exploiting the limited chain of tolerances involved, optimising the number of components required and therefore the production costs associated with the filter cartridge.

Advantageously, the filter cartridge is automatically objectified thanks to the particular shape of the plate group making it easier to insert it correctly in the box and offering an immediate visual recognition system to the operator.

Advantageously, the air filtration assembly requires original filter cartridges specially designed to work with the box in order to function effectively, thus also addressing the issue of non-original filter cartridges.

Advantageously, the rigid connection between filter cartridge and box, especially between plate group and housing region, allows a safe and socover engagement as well as a secure and socover seal between the parts. Advantageously, the box inside the vehicle can be positioned in any relative position without affecting the filtration mode.

It is clear that a person skilled in the art may make modifications to the air filtration assembly so as to satisfy contingent requirements, all contained within the scope of protection as defined by the following claims.

LIST OF REFERENCE NUMBERS 1 air filtration assembly
2 box
20 container
21 wall
200 cover
250 contact lugs
250" auxiliary contact and thrust surface
22 contact elements
22' contact and thrust surface
25 housing region
26 support elements
28 inflow mouth
29 outflow mouth
3 filter cartridge
4 tubular filter septum
40 inner cavity
5 plate group
50 assembly body
51 first face, sealing face
510 sealing profile
52 second face, contact face
520 contact profile
520' contact and thrust surface
520" auxiliary contact and thrust surface
59 outflow opening
6 auxiliary plate group X-X longitudinal axis
V-V first axis, vertical axis
Y-Y second axis, transverse axis
Z insertion direction
S imaginary extension plane
T1, T2, T3, T4 imaginary sealing plane
R1, R2, R3, R4 imaginary contact plane
dx1, dx1', dx2, dx2', dx2", dx2''' variable longitudinal distance
dz1, dz1', dz2, dz2' variable vertical distance

The invention claimed is:

1. Air filtration assembly for a vehicle, comprising:
i) a box comprising a wall which extends along a first axis and a second axis and comprises at least one outflow mouth through which air flows, wherein the box also comprises a longitudinal axis incident to the first axis and to the second axis;
ii) a filter cartridge comprising:
at least two tubular filter media which are traversable during filtration;
a plate group to which the at least two tubular filter media are operatively connected, wherein the plate group extends with respect to an imaginary extension plane and, on opposing sides of said imaginary extension plane, comprises a first face comprising at least one sealing profile and a second face comprising at least two contact profiles, wherein the plate group comprises at least one outflow opening for placing the at least two tubular filter media in fluid communication with the at least one outflow mouth;
wherein the filter cartridge is insertable into the box in an insertion direction substantially parallel to the first axis or to the second axis;
wherein the box comprises a housing region between the wall and at least two contact elements which are longitudinally spaced apart from the wall and axially spaced apart from one another,
wherein the plate group is housed in said housing region to have the at least one sealing profile sealingly engaged with the wall and the at least two contact profiles engaged on respective contact elements of the at least two contact elements;
wherein the at least one sealing profile or the at least two contact profiles are shaped or mutually positioned with respect to the imaginary extension plane to have variable vertical distances therefrom, measured in a direction orthogonal to the insertion direction, in said insertion direction; and
wherein the at least one sealing profile or the at least two contact profiles are shaped or mutually positioned with respect to the imaginary extension plane to have variable longitudinal distances therefrom, measured in a direction parallel to the longitudinal axis, along the first axis or the second axis.

2. Air filtration assembly according to claim 1, wherein the at least two tubular filter media are positioned to be aligned in parallel along the first axis or the second axis.

3. Air filtration assembly according to claim 2, wherein the filter cartridge comprises at least two rows of the at least two tubular filter media superimposed along the first axis or along the second axis, wherein each row comprises the at least two tubular filter media.

4. Air filtration assembly according to claim 1, wherein the plate group comprises at least three contact profiles comprising two end contact profiles and at least one central contact profile positioned between the two end contact profiles and between two consecutive tubular filter media of the at least two tubular filter media.

5. Air filtration assembly according to claim 4, wherein the end contact profiles are longitudinally most distant from the at least one central contact profile.

6. Air filtration assembly according to claim 1, wherein the at least two contact profiles and the at least two contact elements comprise respective contact and push surfaces which are mutually slidingly engagable in a process of inserting the cartridge into the box, wherein the contact and push surfaces are shaped, so that the cartridge is pushed and held in position in the longitudinal direction toward the wall.

7. Air filtration assembly according to claim 6, wherein the contact and push surfaces are inclined, such that the cartridge is pushed and held in position in the longitudinal direction toward the wall.

8. Air filtration assembly according to claim 1, wherein the at least two contact profiles, and the at least two contact elements, are positioned on different imaginary contact planes which are longitudinally spaced apart from one another.

9. Air filtration assembly according to claim 1, wherein the plate group comprises a single sealing profile which extends around the at least one outflow opening, identifying a single sealing region during engagement with the wall.

10. Air filtration assembly according to claim 1, wherein the plate group comprises a plurality of outflow openings and comprises respective sealing profiles each extending around the relevant outflow opening, identifying a relevant sealing region during engagement with the wall.

11. Air filtration assembly according to claim 10, wherein the at least one sealing profile and respective sealing planes comprised in the wall, are positioned on different imaginary sealing planes which are longitudinally spaced apart from one another.

12. Air filtration assembly according to claim 10, wherein the at least one sealing profile and respective sealing planes comprised in the wall are positioned on different imaginary sealing planes which are longitudinally spaced apart from one another, each at a relevant longitudinal distance from the imaginary extension plane.

13. Air filtration assembly according to claim 1, wherein the at least one outflow opening is shaped to extend longitudinally between the second face and the first face to fluidically connect the at least two tubular filter media to the at least one outflow mouth.

14. Air filtration assembly according to claim 1, wherein the at least one sealing profile is a yielding element elastically integrated in the plate group or a removable element.

15. Air filtration assembly according to claim 1, wherein the box comprises a container in which the filter cartridge is housable at least in part, and a cover for closing the container, wherein the cover is mountable on the container in parallel with the insertion direction.

16. Air filtration assembly according to claim 15, wherein the cover is configured for engaging the filter cartridge in a direction parallel to the insertion direction.

17. Air filtration assembly according to claim 15, wherein the cover comprises at least one lug for engaging the second face of the plate group to keep the cartridge in a longitudinal position or to keep the cartridge pushed in the longitudinal direction toward the wall.

18. Air filtration assembly according to claim 15, wherein the container and/or the cover comprise directional flanges for guiding air flow outside the at least two tubular filter media.

19. Engine air supply installation for a vehicle, comprising an air filtration assembly according to claim 1, wherein the box is fluidically connected to an air intake manifold, and air is drawn in from an outside environment through the air filtration assembly.

20. Air filtration assembly according to claim 1, wherein the at least two tubular filter media are aligned in parallel along the axis colinear to the insertion direction.

21. Air filtration assembly according to claim 1, wherein the at least two tubular filter media are traversable radially during filtration.

22. Air filtration assembly according to claim 1, wherein the at least two contact profiles, and the at least two contact elements are positioned on different imaginary contact planes which are longitudinally spaced apart from one another at a relevant longitudinal distance from the imaginary extension plane.

* * * * *